United States Patent
Krishnamurthy

(10) Patent No.: US 10,496,749 B2
(45) Date of Patent: Dec. 3, 2019

(54) UNIFIED SEMANTICS-FOCUSED LANGUAGE PROCESSING AND ZERO BASE KNOWLEDGE BUILDING SYSTEM

(71) Applicant: Satyanarayana Krishnamurthy, Bangalore (IN)

(72) Inventor: Satyanarayana Krishnamurthy, Bangalore (IN)

( * ) Notice: Subject to any disclaimer, the term of this patent is extended or adjusted under 35 U.S.C. 154(b) by 479 days.

(21) Appl. No.: 14/825,171

(22) Filed: Aug. 13, 2015

(65) Prior Publication Data

US 2016/0364377 A1 Dec. 15, 2016

(51) Int. Cl.
*G06F 17/27* (2006.01)

(52) U.S. Cl.
CPC ........ *G06F 17/2785* (2013.01); *G06F 17/271* (2013.01); *G06F 17/279* (2013.01)

(58) Field of Classification Search
CPC ... G06F 17/2785; G06F 17/271; G06F 17/279
See application file for complete search history.

(56) References Cited

U.S. PATENT DOCUMENTS

| | | | |
|---|---|---|---|
| 4,887,212 A * | 12/1989 | Zamora | G06F 17/2705 704/8 |
| 5,083,268 A | 1/1992 | Hemphill et al. | |
| 5,386,556 A | 1/1995 | Hedin et al. | |
| 6,278,967 B1 * | 8/2001 | Akers | G06F 17/271 704/2 |
| 7,464,026 B2 | 12/2008 | Calcagno et al. | |
| 7,613,666 B1 * | 11/2009 | Baisley | G06F 8/24 706/20 |
| 7,739,102 B2 | 6/2010 | Bender | |
| 7,823,065 B2 | 10/2010 | Hintz | |
| 7,865,358 B2 * | 1/2011 | Green | G06F 17/2785 704/10 |
| 8,078,450 B2 | 12/2011 | Anisimovich et al. | |
| 8,150,677 B2 * | 4/2012 | Menezes | G06F 17/2872 704/2 |
| 8,234,106 B2 | 7/2012 | Marcu et al. | |

(Continued)

FOREIGN PATENT DOCUMENTS

EP 1589440 A2 10/2005

*Primary Examiner* — Walter Yehl
(74) *Attorney, Agent, or Firm* — Symbus Law Group, LLC; Clifford D. Hyra

(57) ABSTRACT

A method and a language processing and knowledge building system (LPKBS) for processing textual data, receives textual data and a language object; segments the textual data into sentences and each sentence into words; generates a list of one or more natural language phrase objects (NLPOs) for each word by identifying vocabulary classes and vocabulary class features for each word based on vocabulary class feature differentiators; creates sentence phrase lists, each including a combination of one NLPO selected per word from each list of NLPOs; groups two or more NLPOs in each sentence phrase list based on word to word association rules, the vocabulary classes, the vocabulary class features, and a position of each NLPO; replaces each such group of NLPOs with a consolidated NLPO; maps each segmented sentence to a sentence type; identifies a semantic item for each mapped NLPO; and identifies and stores associated attributes and relations.

49 Claims, 17 Drawing Sheets

(56) References Cited

U.S. PATENT DOCUMENTS

| | | | |
|---|---|---|---|
| 8,332,394 B2 * | 12/2012 | Fan | G06N 5/02 |
| | | | 707/723 |
| 8,346,563 B1 | 1/2013 | Hjelm et al. | |
| 8,666,730 B2 | 3/2014 | Todhunter et al. | |
| 2003/0004706 A1 * | 1/2003 | Yale | G06F 17/27 |
| | | | 704/9 |
| 2007/0106493 A1 * | 5/2007 | Sanfilippo | G06F 16/367 |
| | | | 704/9 |
| 2008/0091408 A1 * | 4/2008 | Roulland | G06F 16/3338 |
| | | | 704/9 |
| 2010/0235165 A1 * | 9/2010 | Todhunter | G06F 16/3329 |
| | | | 704/9 |
| 2012/0016678 A1 * | 1/2012 | Gruber | G10L 15/22 |
| | | | 704/275 |
| 2012/0253793 A1 | 10/2012 | Ghannam et al. | |
| 2012/0303356 A1 * | 11/2012 | Boyle | G06F 17/2785 |
| | | | 704/9 |
| 2014/0039879 A1 | 2/2014 | Vadim Berman | |
| 2016/0147736 A1 * | 5/2016 | Danielyan | G06F 17/2785 |
| | | | 704/9 |

\* cited by examiner

UNIFIED SEMANTICS-FOCUSED LANGUAGE PROCESSING AND ZERO BASE KNOWLEDGE BUILDING SYSTEM

CROSS-REFERENCE TO RELATED APPLICATIONS

This application claims priority to and the benefit of non-provisional patent application number 2955/CHE/2015 titled "Language Processing And Knowledge Building System", filed in the Indian Patent Office on Jun. 12, 2015. The specification of the above referenced patent application is incorporated herein by reference in its entirety.

BACKGROUND

Natural languages were developed to document and communicate human experiences and thoughts. Natural languages have both visual and auditory forms. Natural languages have evolved to support physical aspects of human experiences in the external world and conceptual aspects of human thoughts in the internal world of the human mind. Natural languages have also evolved to support rich expressiveness and economy of expression. Rich expressiveness and economy of expression combine to promote high semantic density in communication. Another feature of human communication in the real world is termed as semantic compounding. Semantic compounding emphasizes or highlights the significance of what is conveyed in an utterance. Often such an utterance is compounded with another utterance. The compounding second utterance may relate to conditionality, cause and effect, concurrency, presence of contrary, contradictory or unfavourable circumstances, etc. Natural language utterances involve a combinatorial explosion driven by semantic context. Semantic compounding and combinatorial explosion cannot be adequately captured in grammar representations. Natural languages have also evolved to support an imprecise or impressionistic description where such a description is adequate to implicitly infer a more precise meaning of the description based on knowledge about a population of objects in context of the description. Semantics is the core of natural language utterances and is largely experiential. Therefore, semantics constitute a major reason for the limited success achieved in processing of natural language utterances by computer programs.

Programming languages are domain neutral or domain agnostic. Programming languages per se have no large vocabulary or intrinsic domain semantics but have minimal intrinsic domain semantics at a meta-level. Each computer program or a set of related computer programs in programming languages, introduces a vocabulary specific to the computer program or the set of computer programs, creates semantics, or reflects a domain. Natural languages, however, are not domain neutral or domain agnostic. A natural language incorporates a universal domain. In an example, a computer program may comprise the following steps: Create or retrieve a virtual world of objects with certain state or states; execute certain transactions as permitted on those objects; and handle the new state of that virtual world and display to a user and/or persist the handled new state. Computer programs, typically, create the framework for an orchestration disclosed in the steps above. Therefore, natural language fiction may be comparable to computer programs. Natural language non-fiction, however, describes a commonly shared real world state of the objects, events, actions, transactions, etc.

Programming languages are ontology description languages that facilitate description of classes, or categories, or groups of objects and their behavioural patterns or types of the programming languages. Computer programs written in a programming language create their own ontologies where a specific structure, state, and behaviour are described and prescribed for each class or group of objects. Computer program runs create and maintain populations of objects that constitute the knowledge and semantic repositories known to and usable by the computer programs. The programming language, the computer program, and the population of objects created by the computer program runs, use and live in different and isolated vocabularies, meta-levels, and semantic spheres, and there is no language level facility to document and maintain the behavioural history of the objects. In the case of natural languages, the aforementioned semantic walls collapse to merge the three spheres, that is, the vocabularies, the meta-levels, and the semantics into one common whole sphere and there is a language level support to maintain the behavioural history of objects as part of the knowledge.

Another aspect of programming language communication is that each object in the population of objects has a name at the time at which such an object is active, a name by which a computer program and other objects can identify and work with such an object. In natural language communication, the large number of objects makes it impossible for all the objects to be named or for every object participating in the communication to know the name of every other object in the scene. Humans, while conversing in a natural language, typically talk about unnamed and/or unknown objects and strive to facilitate identification of these objects unambiguously by describing some aspect of such objects. While doing so, humans seek to select that aspect which is significant, meaningful, and relevant in context of the conversation, and also seek to avoid redundancy, verbosity, and awkwardness by combining such a description with the main utterance about the object, which in turn, leads to a combinatorial explosion of probable meanings that can be derived from the conversation by a system that processes the natural language conversation. Another aspect of a natural language is a facility for selective omission of contextually unimportant information, for example, grammar or a syntax support for passive voice. For example, consider the sentence "The guide explained to us the working of the machine." Here, if contextually the guide is unimportant, the sentence can be rephrased into passive voice as follows: "The working of the machine was explained to us." or "We were explained the working of the machine."

Use of grammar in natural languages typically involves syntax which implies a specified sequence or an order in which words are to be used to make up a valid utterance or a valid sentence. However, natural languages typically do not enforce a rigid or an inflexible syntax. For example, Sanskrit, an ancient language from India, is an open syntax or a highly flexible language in that the words in an utterance in Sanskrit can, in most cases, occur in any order, and different utterances obtained by merely changing the order of the words are semantically equivalent. Most other natural languages are hybrid in that the order can be changed in parts of the syntax.

The origin of programming languages can be traced to the need and the desire for automating a repeated execution of the same computation task with different input values each time. Thus, the names in computer programs are symbolic or are merely place holders that hold different values or objects during different runs of the computer program. There are no semantics associated per se with any name in any computer program. When programming evolved to mimic real world processes and the data processed by a computer program mimicked population of objects in the real world, the semantics of real world objects were essentially associated with the objects in off-program persistence. During computer program runs, a symbolic name within the computer program assumes the semantics of the particular object that is loaded in from persistence, that is, a database and bound to the symbolic name. However, in natural languages and natural language utterances describing the real world, names have enduring semantics bound to them. The computer programs with symbolic names are similar to fiction in natural languages, as far as semantic association or binding is concerned.

The number of objects in the real world is substantially large for assigning a name to every object and more so for every human to know the name of every object in every context that the human needs to interact with and communicate in. As a result, natural language utterances abound in references to nameless and unknown objects, but, at the same time, eliminate ambiguity. For example, natural language sentences that refer to nameless objects are typically constructed as "the man in the brown suit", "roads in London", "the show at 7.00 pm", "the painter from Paris", "the book shop on Church Street", "the third boy in the fourth row from the back", etc. The mechanism employed in eliminating ambiguity is the use of semantics, where unique space and time properties associated with different objects, structures of objects, unique values for the attributes of the objects, etc., are all harnessed. Such a description of nameless objects in natural language utterances can be mapped to a programming language syntax, for example, "man{? suit.colour=brown}", rows[4].boys[3], etc.

For ease of learning and ease of use, natural languages have evolved to support a derivation of new words from existing words. Different case, number, gender and tense forms are derived from base words. Adjectives are derived from nouns and nouns from adjectives; nouns and adjectives are derived from verbs; verbs from nouns and adverbs from adjectives, etc. Such a derivation happens, for example, by adding suffixes and prefixes and multiple ways of morphing words. Typically, every natural language has sets of morphing rules. As natural languages originated for oral communication, ease of pronunciation and the need to be not harsh on the ears have played a part in shaping the morphing rules by contributing exceptions and sub rules. Natural languages have also evolved to support multiple communication needs. Natural languages are used to describe a structure and a behaviour of objects and classes of objects, to describe actions and events, and for multiple ways of interpersonal interactions, for example, to command and to prescribe, to prohibit and to permit, to assert and to negate, to challenge and to defy, to forecast and to speculate, etc. Computer program runs or sessions typically involve a large number of short discourses, each of which is largely independent, where a context switch is abrupt and total. Natural language communications, typically, tend to have a small number of extended discourses with a marked level of semantic coherence. If and when a discourse context changes, the context switch is typically slow, gradual, and smooth, and is facilitated by connecting objects.

Processing of natural language text by computer systems has been a field of active research for a few decades. Conventional natural language processing typically results in text that expands due to addition of annotations or tags while processing the text. The main problems that arise in processing text in any natural language are analysis and understanding of sentences in the text, construction of sentences or natural language generation, conversion between visual and auditory forms, that is, speech to text conversion and vice versa, and translation from one natural language to another natural language. Natural language text processing typically involves three approaches, namely, an algorithmic approach, a statistical approach, and an artificial neural network approach. The algorithmic approach is one of the earliest approaches and processes natural languages in a way similar to programming languages. That is, the algorithmic approach considers processing of natural language text as similar to computational problems solved by structured computer programs written in programming languages. The algorithmic approach has remained unexplored in contemporary work involving natural language processing owing to limited success achieved till present date. The reasons for the limited success are, for example, peculiarities of natural languages as compared to programming languages. The algorithmic approach has, in general, been inspired by or based on an approach used in parsing computer programs written in programming languages and uses the concept of a syntax tree or a parsing tree.

The statistical approach comprises building a model of a natural language from on a large corpus of text in the natural language and applying the built model in processing new text being added to the corpus. Although the statistical approach has been quite successful, the statistical approach requires substantial computing resources to be deployed for substantial periods of time to study the large corpus and build an internal model separately for each natural language to be supported. Further, the model built statistically may be large in size, requiring a large runtime memory for processing new text whereas a grammar rule based model is compact and requires a small runtime memory. Moreover, the results of the statistical approach have a large number of errors initially that can improve only with time and usage. Furthermore, the statistical approach may not have an integrated approach to processing and generation, that is, reading and writing of natural languages. Furthermore, the statistical approach per se is not integrated with semantics.

The neural network approach uses artificial neural networks to process text. The neural network approach has been found to be successful in handling errors and omissions, for example, errors in spelling and construction of sentences, omission of words, etc. However, techniques and technology involved in the neural network approach for text generation or natural language generation are less advanced than those for text processing. Technologies and tools available for natural language processing are domain specific.

Hence, there is a long felt but unresolved need for a method and system that processes textual data in multiple natural languages. Moreover, there is a need for a method and system that processes textual data in a domain independent way by targeting semantics of textual data, and that extracts structured information that can be used for disparate computational purposes comprising, for example, business applications, answering questions, translations, etc.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the language processing and knowledge building system (LPKBS) disclosed herein address the above stated need for processing textual data in multiple languages, for example, multiple natural languages, programming languages, etc. Moreover, the method and the LPKBS disclosed herein process textual data in a domain independent way by targeting semantics of textual data, and extract structured information that can be used for disparate computational purposes comprising, for example, business applications, answering questions, translations, etc. The method disclosed herein employs the LPKBS comprising at least one processor configured to execute computer program instructions for processing textual data.

The language processing and knowledge building system (LPKBS) receives textual data and a language object that conforms to a comprehensive template provided. The LPKBS segments the received textual data into one or more sentences based on multiple sentence terminators predefined in the language object. The LPKBS segments each of the sentences into multiple words based on multiple word separators predefined in the language object. The LPKBS generates a list of one or more natural language phrase objects for each of the words by identifying vocabulary classes and vocabulary class features for each of the words based on vocabulary class feature differentiators predefined in the language object. The LPKBS creates one or more sentence phrase lists using the generated lists of one or more natural language phrase objects. Each of the created sentence phrase lists comprises a combination of one natural language phrase object selected for each of the words from each generated list of one or more natural language phrase objects.

The language processing and knowledge building system (LPKBS) groups two or more natural language phrase objects in each of the created sentence phrase lists based on word to word association rules predefined in the language object, the identified vocabulary classes, the identified vocabulary class features, and a position of each of the grouped or ungrouped natural language phrase objects in each of the created sentence phrase lists. The LPKBS replaces each such group of natural language phrase objects in each of the created sentence phrase lists with a consolidated natural language phrase object. The LPKBS maps each natural language phrase object present in each of the created sentence phrase lists at a current point in the processing of the received textual data to a sentence part type in a sentence type or an utterance type selected iteratively from multiple sentence types predefined in the language object, based on word to sentence part type association rules predefined in the language object, using the identified vocabulary classes, the identified vocabulary class features, and the position of each natural language phrase object in each of the created sentence phrase lists at the current point in the processing of the received textual data. Each natural language phrase object at the current point in the processing of the received textual data is either one from the generated list of one or more natural language phrase objects or the consolidated natural language phrase object. The LPKBS identifies the sentence type of each segmented sentence from a sentence type with the highest number of successfully mapped sentence part types. That is, the LPKBS identifies the sentence type of the segmented sentence based on a best fit determined on the basis of each natural language phrase object in the sentence phrase list being mapped to a sentence part type in the sentence type and each sentence part type in the sentence type being mapped to a natural language phrase object in the sentence phrase list.

For each mapped natural language phrase object in each of the created sentence phrase lists mapped successfully to the identified sentence type, the language processing and knowledge building system (LPKBS) identifies one or more semantic items corresponding to a root word of each mapped natural language phrase object in each of the created sentence phrase lists mapped successfully to the identified sentence type, from a discourse context and/or system knowledge. For each mapped natural language phrase object, the LPKBS selects one of the identified semantic items based on semantic disambiguation rules predefined, for example, for action phrases and/or doer phrases. If such semantic items are not present in the system knowledge or the discourse context, for any of the mapped natural language phrase objects, the LPKBS creates appropriate semantic items based on predefined semantic item creation rules and adds such semantic items to the discourse context. The LPKBS identifies attributes of the created semantic items or the selected semantic items, and further identifies relations between the created semantic items or the selected semantic items and other semantic items in the discourse context and/or the system knowledge. The LPKBS then adds the identified attributes to the created semantic items or the selected semantic items and further adds the created semantic items and the identified relations to the discourse context and the system knowledge based on the identified sentence type and semantic consequence rules of the identified sentence type, predefined in the language object.

The language processing and knowledge building system (LPKBS) provides a framework for processing text in any natural language and includes specific language components. The method and the LPKBS disclosed herein enables cost and time-effective development of capability for processing text in any specific natural language or near natural domain specific language as a subset of a natural language. With this support, the LPKBS eliminates the effort and cost involved in design of domain specific languages and in developing specific processor components. The framework harnesses lexicons available in a digital format or can work with lexicons that can be custom handcrafted as per a schema that is provided. Further, the framework avoids dependency on part-of-speech (POS) taggers and therefore can also be used for languages for which such tools are not available.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1A:
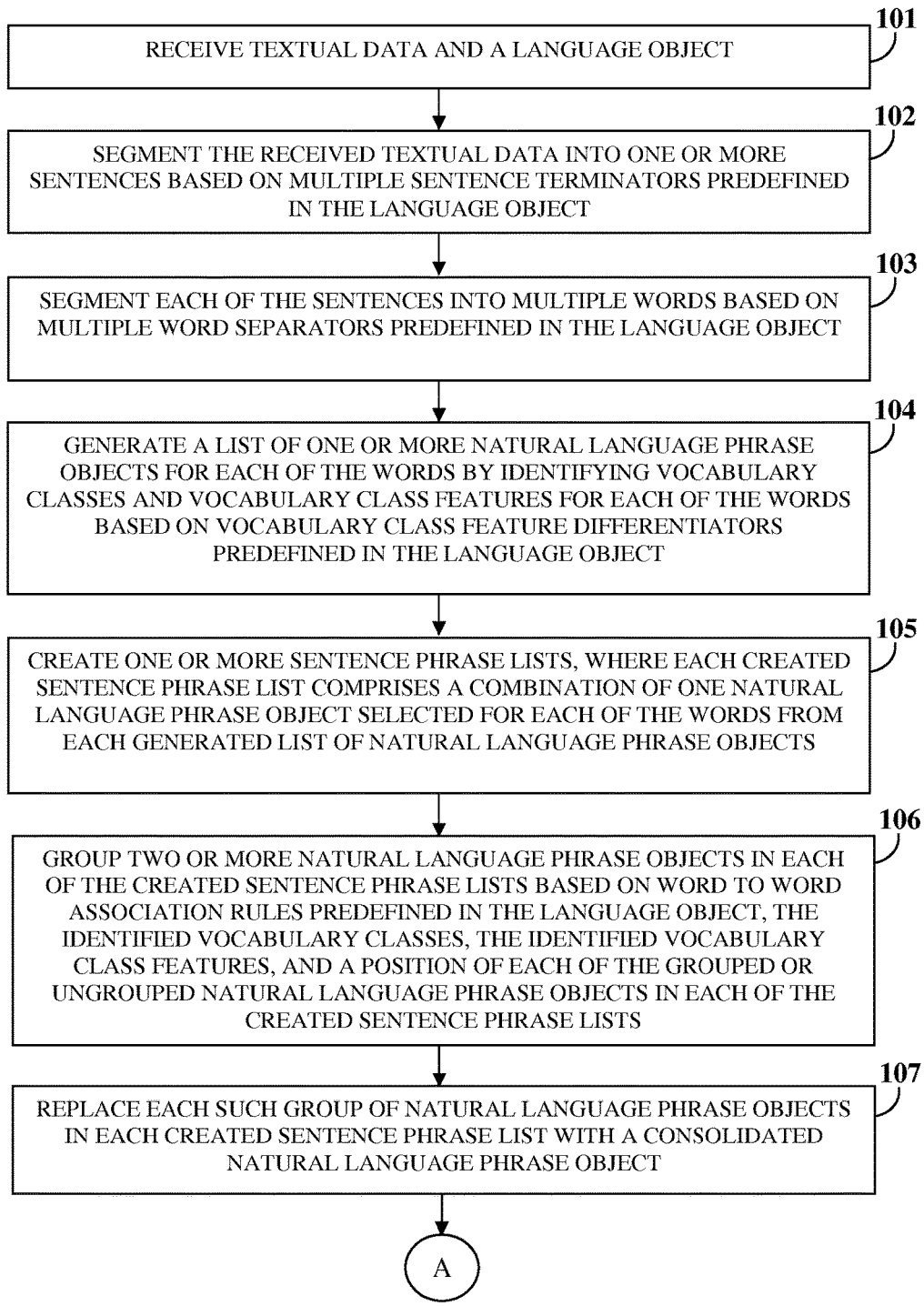
FIGS. 1A-1B exemplarily illustrate a method for processing textual data.
Figure 1B:
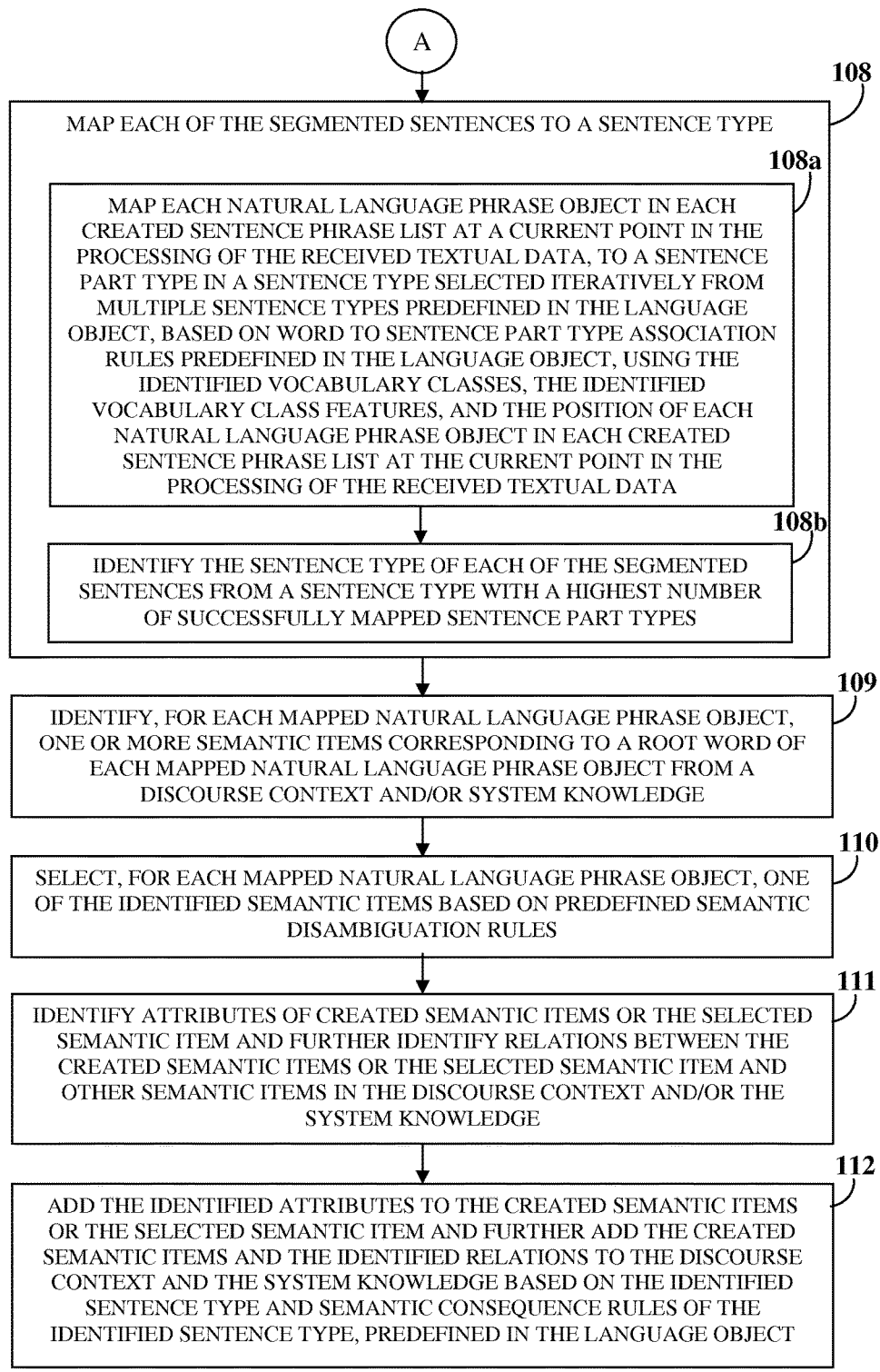

FIGS. 1A-1B exemplarily illustrate a method for processing textual data. As used herein, "textual data" refers to text comprising multiple sentences or utterances in any one of multiple languages comprising, for example, natural languages, domain specific adaptations of natural languages, programming languages, etc. The terms "sentence" and "utterance" are hereafter used equivalently and interchangeably. A sentence is relevant in a visual context and an utterance is relevant in an auditory context. As used herein, "natural language" refers to a language that human beings develop in an unpremeditated manner over a period of time. Natural languages comprise, for example, English, Indian languages such as Hindi, Kannada, Sanskrit, etc. The method disclosed herein employs a language processing and knowledge building system (LPKBS) comprising at least one processor configured to execute computer program instructions for processing textual data. The method disclosed herein integrates a language model to be used with the LPKBS for representing or describing the natural languages and processing algorithms that harness this language model in processing textual data. The language model recognizes that semantics precedes natural language communication. For example, every child builds a semantic model of the world around him/her even before he/she learns a single word in any language. The child first recognizes specific things, then specific actions of things, then specific properties of the specific things and actions, and ultimately, classifications of things and actions. Typically, a discourse in a natural language takes place to communicate semantics. The method disclosed herein provides system knowledge comprising things known to the LPKBS and a discourse context that is similar in structure to the system knowledge and comprises things known to the LPKBS in a particular session of processing of textual data. In an embodiment, the structure of the discourse context is an enhancement of the structure of the system knowledge. The things known to the LPKBS comprise, for example, conceptual or semantic representations of words and word phrases.

In an embodiment, the system knowledge is stored, for example, in an extensible markup language (XML) file on a local system. The system knowledge can be read and rendered as a rich runtime object, for example, in the Java programming language or the programming language used in the embodiment. This system knowledge runtime object is used in processing of the textual data. After processing of input textual data, the system knowledge runtime object in the memory is enhanced and written back to the XML file on the local system. The XML file has its own schema. In an embodiment, the XML file can be optionally manually pre-populated with minimal knowledge before any textual data is read by a particular installation of the language processing and knowledge building system (LPKBS). The installation of the LPKBS starts or can start without any such knowledge pre-populated manually and builds its own knowledge by processing the input textual data. The implementation of the LPKBS supports import and merge of contents of another system knowledge XML file into one system knowledge XML file, as both the system knowledge XML files conform to the same XML schema. Such merge processing logic ensures avoidance of duplication.

In the method disclosed herein, the language processing and knowledge building system (LPKBS) receives 101 textual data, for example, from a user device such as a personal computer, a laptop, a tablet computing device, a mobile phone, etc. A user provides textual data to the LPKBS, for example, using a command line interface. The command line interface is a user interface to an operating system of a user device or to an application in which the user responds to a visual prompt by typing in a command on a specified line, receives a response back from the operating system, and then enters another command. The user can invoke the LPKBS from the command line interface. In an embodiment, the LPKBS provides a graphical user interface (GUI), for example, an online web interface, a web based downloadable application interface, a mobile based downloadable application interface, etc., to allow a user to enter the textual data. The core of the LPKBS processes the textual data that is made available in a runtime memory. There are other components for various input channels such as a file on a local file system. Such components perform the processing needed for a specific input channel, and then invoke the LPKBS and pass the textual data.

The language processing and knowledge building system (LPKBS) also receives 101 a language object, for example, from a language object repository. As used herein, "language object" refers to an instance of the language model and is predefined for a natural language used in the received textual data. The language object is, for example, an English language object, a Sanskrit language object, a Hindi language object, etc. An English language object comprises, for example, alphabets used in the English language such as A-Z, a vocabulary comprising, for example, a dictionary of words in English along with their meanings, punctuation marks such as a period, a comma, a colon, a semicolon, a question mark, etc., sentence types such as negation, sentence part types, word association rules used in the English language, etc. The language object repository is a map of International Organization for Standardization (ISO) codes of natural languages that the LPKBS supports for processing textual data, to relative language objects constructed and available in the LPKBS. In an example, if the textual data received is in English, then the LPKBS receives a language object created for the English language from the language object repository. The LPKBS receives the textual data, for example, a chunk of text in a particular natural language and a character string representing the ISO code for the natural language of that chunk of text. The ISO code, for example, ISO 639 is a set of standards used to classify known languages. The LPKBS initializes the discourse context for the current reading session of the received textual data to update the discourse context as each successive sentence in the received textual data is analysed. The LPKBS queries the language object repository using the input ISO code and obtains the language object represented, for example, as "textLanguageObject". If such a language object is not found or available, the LPKBS aborts or terminates the reading session.

The method disclosed herein provides and uses a set representing all named things. Every member of the set has a name that typically has a single auditory representation and multiple visual text representations, one in each natural language. The language model comprises multiple alphabets, that is, a set of letters for a particular language in terms of visual and auditory representations, a vocabulary for the language comprising a list of words with a meaning, where each word is an ordered sequence of one or more letters in the language having visual and auditory representations depending on and derived from the visual and auditory representations of the constituent letters and can be mapped to one or more vocabulary classes. A vocabulary class is a multivalued mapping from the vocabulary to a vocabulary class set of the language model, is defined for each word in the vocabulary, and can be represented as VocabularyClassOf(vw) for a word "vw". Each vocabulary class "vc" has a name that is a member of the vocabulary and can be represented as nameOf(vc). The meaning of a word is a multivalued mapping from the vocabulary to the system knowledge. The meaning of a word is a subset of the system knowledge to which the word is mapped under a meaning map. The meaning of a word "vw" can be represented as MeaningOf(vw). The meaning for any word may be absent initially, but may be created and added.

The language model further comprises a set of punctuation marks or symbols comprising, for example, sentence terminators, list item separators, sentence clause separators, etc. For a language such as English, sentence terminators comprise, for example, full stops, exclamation marks, question marks, etc. For Indian languages such as Sanskrit and Hindi, a sentence terminator is, for example, "I". Further, for the English language, the list item separators in a language object constructed as an instance of the language model comprise, for example, commas. The sentence clause separators for a language such as English comprise, for example, commas, inverted commas, semicolons, colons, etc. The language model further comprises a meta-word set comparable to a built-in vocabulary of programming languages. The meta-word set (MWS) comprises a set of words for a type (WT), a set of words for attribute (WA), a set of words for composition (WC), a set of words for existence (WE), etc. This last meta-word set, that is, the set of words for existence assists in recognizing utterances that often do not talk about a specific action but merely describes an existence of an object in a certain state, for example, "Rama was the prince of Ayodhya." or "John is jubilant."

The language model comprises the vocabulary class set for the language. The vocabulary class set is a set of vocabulary classes that achieves a classification of the words in the vocabulary, where each word in the vocabulary belongs to at least one vocabulary class. The vocabulary classes comprise, for example, parts of speech comprising a noun, a pronoun, a verb, an adjective, an adverb, and other parts of speech. The vocabulary class for a programming language comprises, for example, "DataType" comprising integer, character, etc., an "AccessibilityIndicator" comprising, for example, private, protected, friend, public, etc. Each vocabulary class has a name which is a member of the vocabulary. A vocabulary class is associated with a set of vocabulary class features. The vocabulary class features comprise, for example, a case, a gender, a number, a tense, etc. A vocabulary class feature (vcf) is possibly multivalued and each vocabulary class feature has a name that is a member of the vocabulary and can be represented as "nameOf(vcf)". For a word "vw" in the vocabulary, if VocabularyClassOf(vw) is "vc" and if a vocabulary class feature "vcf" is defined for "vc", then the value of the vocabulary class feature "vcf" for the word "vw" is non-empty and may be represented as <<nameOf(vcf)>>Of(vw), where <<nameOf(vcf)>> is a place holder. If a "vcf" is not defined for VocabularyClassOf(vw), then "vcf" for "vw" is empty.

The language model further comprises a sentence type set comprising a set of sentence types or utterance types comprising, for example, denial or negation, command, prescription, prohibition, permission, capability, probability, etc. The sentence type set is a formalization of the speech acts concept. The speech acts concept represents communication semantics. A sentence type hierarchy provided in the language processing and knowledge building system (LPKBS) is a formal, rigorous, comprehensive and computable refinement of the basic speech acts concept. The language model further comprises certain qualifications, for example, qualifications on sentence types and qualifications on the set of vocabulary classes to facilitate time and effort economies in the development of specific natural language objects and to facilitate handling of semantic integration for natural language communication. The sentence type set is a semantic classification of sentences or utterances. A sentence type of the sentence type set is not merely a syntax template but is associated with a set of sentence part types. The set of sentence types comprises, inter alia, sentence types that are commonly shared by all natural languages, for example, a sentence type named, for example, as a "ObjectClassDescriptor" that describes a class or a classification of an object, a sentence type named, for example, as a "ClassStructureDescriptor" that describes a structural template of a classification of objects, a sentence type named, for example, as a "ClassBehaviourDescriptor" that describes behavioural or action patterns of a classification of objects, a sentence type named, for example, as an "ObjectStructureDescriptor" that describes a structure of an individual object, a sentence type named, for example, as an "ActionDescriptor" that describes individual actions, that is, manifestations or instances of a behavioural pattern associated with a semantic classification of objects or an object class, sentence types that denote denial or negation, command, etc. For example, a sentence "Amazon is a river" belongs to the sentence type "ObjectClassDescriptor"; "Elephants have broad ears, long trunks and big stomachs." belongs to the sentence type "ClassStructureDescriptor"; "Elephants eat grass, plantains, sugarcane and rice." belongs to the sentence type "ClassBehaviourDescriptor"; "Mary has a round face." belongs to the sentence type "ObjectStructureDescriptor", and "John ran fast." belongs to the sentence type "ActionDescriptor". The sentence type qualification describing individual actions is subdivided into a variant sentence type that describes actions that affect another object and need to be completely described for such another object to be explicitly specified or inferred from context, for example, the sentence "John ran fast", and a variant sentence type that describes actions that affect two other objects and need to be completely described for such other objects to be explicitly specified or inferred from context, for example, the sentence "Mary gave the book to Elizabeth."

The set of sentence types further comprises a class structure query represented as "ClassStructureQuery", a class behaviour query represented as "ClassBehaviourQuery", an action query represented as "ActionQuery", etc. The ClassStructureQuery represents a question about a structure shared by all objects belonging to a particular classification of objects. For example, an English question "Do tigers have tusks?" is a ClassStructureQuery. A ClassBehaviourQuery represents a question about a behavioural pattern shared by all objects belonging to a particular classification of objects. For example, an English question "Do frogs crawl?" is a ClassBehaviourQuery. In another example, an English question "Do snakes hop?" is also a ClassBehaviourQuery. The ActionQuery represents a question about what a specific object did. For example, an English question "What did you do this morning?" is an ActionQuery. The ActionQuery is positioned high in the sentence type hierarchy and has many subtypes, for example, an ActionDoerQuery such as an English question "Who wrote 'Comedy of Errors'?", where an action doer is an unknown; an ActionTargetQuery such as an English question "What did John eat?" where the target of the action is the unknown.

The language model further comprises a sentence part type set comprising sentence part types for a language. A sentence part type identifies a logical part of a sentence or an utterance. The sentence part type is, for example, a doer or an object target of an action captured in the sentence. The sentence part types comprise, for example, a class denoter represented as "ClassDenoter", a doer denoter represented as "DoerDenoter", an action denoter represented as "ActionDenoter", a composition denoter represented as "compositionDenoter", an action attribute denoter represented as "ActionAttributeDenoter", a behaviour denoter represented as "BehaviourDenoter", a part denoter represented as "PartDenoter", a negation denoter represented as "NegationDenoter", a whole denoter represented as "wholeDenoter", an "ActionTarget", etc. ClassDenoter is a name provided to a logical part representing a classification of objects and appears in sentence types such as "ClassStructureDescriptor", "ClassBehaviourDescriptor", "ClassStructureQuery", "ClassBehaviourQuery", etc. ClassDenoter helps communicate information related to which particular object classification has the structure or the behaviour that is being described. For example, in an English sentence "Cars have an engine, a transmission and a brake.", the word "Cars" maps to the sentence part type ClassDenoter. DoerDenoter is a name provided to a logical part representing a doer of an action, that is, who did whatever was done, and appears in sentence types such as "ActionDescriptor", "ActionTargetQuery", etc. In the aforementioned example, "What did John eat?", the word "John" maps to the sentence part type DoerDenoter. ActionDenoter is the name provided to a logical part representing an action or what was done in sentence types such as "ActionDescriptor", "ActionTargetQuery", etc. CompositionDenoter is a name provided to a logical part representing a special type of action that is contained or included in sentence types such as "ClassStructureDescriptor", "ObjectStructureDescriptor", etc. For example, in the sentence "Cars have an engine, a transmission and a brake.", the word "have" is the CompositionDenoter. ActionAttributeDenoter is a logical part in sentence types such as "ActionDescriptor" and "ActionAttributeQuery" that helps convey information about other attributes of an action over and above the objects directly involved in the action. For example, in the sentence "Mary bought 'War and Peace' from a pavement book vendor for just one dollar!", the phrase "just one dollar" communicates the price paid which is an attribute of "buy" actions. BehaviourDenoter is a name provided to a logical part representing behaviour of objects.

A sentence belongs to a particular sentence type if the sentence has parts, that is, phrases, corresponding to or mappable to members of the set of sentence part types associated with the sentence type. Each sentence type has a specific type of a semantic consequence on the underlying knowledge for the discourse. Such a semantic consequence can be described in terms of the associated sentence part types. Values for the attributes of the objects involved in an action may be impacted by the values for action attributes. For example, when "Mary bought 'War and Peace' from a pavement book vendor for just one dollar!", her "cash in hand" was reduced by "one dollar". In terms of the language model, a sentence or an utterance is a set, not necessarily ordered, of sentence words where a sentence word is a member of the vocabulary or named things and is combined, for example, suffixed with a punctuation mark. Each word "vw" in the vocabulary has an associated feature value set "fvs" that can be represented, for example, as fvsOf(vw). The feature value set is a set of ordered pairs that can be represented as fvsOf(vw)=(ftr, ftrvalue), where "ftr" is a vocabulary class feature defined for vocabularyClassOf(vw) and "ftrvalue" is the value for the vocabulary class feature, for example, male for a gender vocabulary class feature. Typically, a word occurring in a sentence or an utterance has an additional feature that is a position in the sentence represented as "position in sentence". The language model supports this position in the sentence. The position in the sentence feature is a contextual feature or a dynamic feature and is distinct from intrinsic or static features defined for a word based on a vocabulary class of the word. The value of this position in the sentence feature for any word "vw" in a sentence is represented, for example, as posOf(vw, inSentence) and is represented either as an absolute value, that is, a small positive integer or a relative value in relation to the value of the same feature for another word in the sentence. A complete feature value set or an extended feature value set of a word occurring in a sentence is a set union of a set represented, for example, by fvsOf(vw) and a set comprising a single pair (position in sentence, posOf(vw, inSentence)). For example, in the sentence "The prince fell in love with the beautiful princess.", for the word "The", the position in the sentence has an absolute value 1 and a relative value represented by a symbol BEFORE_NOUN, and for the word "the", the position in the sentence has an absolute value 7 and a relative value represented by a symbol BEFORE_QUALIFIED_NOUN. Similarly, for the word "beautiful", the position in the sentence has the relative value BEFORE_NOUN. In view of the combinatorial explosion typically encountered in natural language utterances, grammar rules are optimally specified in terms of relative values for the position in the sentence.

The language model further comprises a sentence type to sentence part type map. The sentence type to sentence part type map is a map of a sentence type to a set of sentence part types and map values comprise the sentence part types required in sentences of that sentence type. The language model further comprises an association rule set for the language. The association rule set comprises a set of association rules for the language. An association rule provides guidance about associating a word in a sentence with another word in the sentence or with a logical part of a sentence type. An association rule is either a word to word association rule or a word to sentence part type association rule. The word to word association rules comprise rules for associating one word with another word based on a statically defined vocabulary class and vocabulary class features of the two words, and in an embodiment, on the dynamic feature of relative positions of the words. A word to word association rule is defined as a quartet {wordVC, targetVC, vcfSet, pisValuesRelation}, where "wordVC" is a vocabulary class of a word that can be or is to be associated, "targetVC" is a vocabulary class of the word with which a word in a sentence with the vocabulary class equal to the first member "wordVC" of the quartet can be or is to be associated, "vcfSet" is a set of vocabulary class features for which two words to be associated should have equal or matching or compatible values, and "pisValuesRelation" represents a relation to be satisfied by the "position in sentence" values for the two words to be associated. In accordance with the word to word association rules, values are compulsory for "wordVC" and "targetVC" of the quartet and values are necessary for at least one of "vcfSet" and "pisValuesRelation" of the quartet.

A word to sentence part type association rule is defined as a triplet {spt, wordVC, wordFeatureValueSet}, where "spt" represents a sentence part type for a sentence type, "wordVC" represents a vocabulary class of a word that is to be or can be associated or mapped to the sentence part type represented by the first member "spt" of the triplet, and "wordFeatureValueSet" is a set of ordered pairs represented as wordFeatureValueSet=(wordFeature, featureValue), where "wordFeature" is a feature of a word and is a member of the complete feature value set and "featureValue" is a valid value permissible for that feature. For example, in a natural language that enforces distinct forms for nominative and objective cases, for a sentence type "ClassStructureDescriptor" with associated sentence part types "WholeDenoter", "CompositionDenoter", and "PartDenoter", a word to sentence part type association rule is specified without using the position in the sentence as: {WholeDenoter, Noun, {Case, NOMINATIVE}},{CompositionDenoter, Verb, {Tense, PRESENT}}, and {PartDenoter, Noun, {Case, OBJECTIVE}}. In another example, in a language such as English that does not have distinct forms for nominative and objective cases, for the same sentence type "ClassStructureDescriptor" with associated sentence part types "WholeDenoter", "CompositionDenoter", and "PartDenoter", a word to sentence part type association rule is specified using the position in the sentence as: {WholeDenoter, Noun, {position in sentence, BEGIN}}, {CompositionDenoter, Verb, {{Tense, PRESENT}, {position in sentence, AFTER_WHOLEDENOTER}}}, and {PartDenoter, Noun, {position in sentence, AFTER_COMPOSITIONDENOTER}}.

In another example, in a programming language with vocabulary classes "DataType", "DataItem", and "AccessibilityIndicator", without any vocabulary class features for any of the vocabulary classes, with a sentence type "DataItemDeclarer", a word to sentence part type association rule is specified entirely in terms of the position in the sentence feature as: {AccessibilityDenoter, AccessibilityIndicator, {position in sentence, BEGIN}}, {DataTypeDenoter, DataType, {position in sentence, AFTER_ACCESSIBILITYDENOTER}}, and {variableName, DataItem, {AFTER_DATATYPE}}}. The DataItemDeclarer declares or introduces a data item that is used or manipulated in a computer program. The DataTypeDenoter communicates the data type of such a data item. The AccessibilityDenoter communicates whether the data item can be seen or accessed by other parts of the computer program. A statement such as "private int sharePrice;" in a Java program belongs to the sentence type "DataItemDeclarer" and communicates that sharePrice is a data item that can be given integer values and can be seen or accessed by other code only if such a code is within the same source code file.

Although a language object that is an instance of the language model comprises specific values for each of the alphabets, vocabulary, vocabulary classes, punctuation marks, etc., parts of the above association rules may be common across all natural languages. For example, for the sentence type "ClassBehaviourDescriptor" comprising sentence part types "ClassDenoter" and "BehaviourDenoter", a common rule is that a word or a phrase of a noun vocabulary class, plural in number, subjective in case, without an article mark-up can be mapped to the sentence part type "ClassDenoter" and a word or a phrase of a verb vocabulary class with a value "present" for a vocabulary class feature "tense" can be mapped to the sentence part type "BehaviourDenoter". Other parts of the rules may be different for different languages. For example, in English, for the sentence type "ClassBehaviourDescriptor" comprising sentence part types "ClassDenoter" and "BehaviourDenoter", the mapping rule states that the sentence part type "ClassDenoter" should be first in the sentence and the sentence part type "BehaviourDenoter" should be the immediate next. In another example, in Sanskrit, the mapping rule states that the phrases for these should have same values for number and gender. The language model further comprises a semantic compounding mechanism for a language in the form of a map of a semantic compounding type to mechanism. Thus, the language object is a specific instance of the language model.

The language model is generic enough to fit multiple natural languages and support new languages or domain specific languages as subsets of natural languages. For example, a domain specific language for describing a structure of complex hierarchical composite types can omit past tense and adverbs. In an embodiment, the language model also describes programming languages. For example, for a programming language, the vocabulary of the programming language is a set of key words used by the programming language. Although currently programming languages do not have an explicitly defined vocabulary class set, the vocabulary class set for the programming language can comprise "DataType" comprising, for example, int, float, double, char, etc., and "AccessibilityIndicator" comprising, for example, private, protected, friend, public, etc. Data elements declared in computer programs can be likened to pronouns that are bound to specific values or objects through explicit assignment, whereas pronouns in a natural language text are bound implicitly in a contextual manner. Current programming languages use only a sentence type "Command" in common with natural languages, if a computer program is viewed as a sequence of commands to be executed by a computer. Programming languages have sentence types comprising, for example, a "DataElementDeclarer", a "DataOperationSpecifier", a "GroupedOperationSpecifier", a "ConditionalGroupedOperationSpecifier", an "IterativeGroupedOperationSpecifier", a "ComputationalProcedureDeclarer", and/or a "ComputationalProcedureDefiner". These sentence types are compound words that can be broken down into multiple words, the meanings of which would be clear to a computer programmer in a programming context. For example, ConditionalGroupedOperationSpecifier is a group of multiple program statements that are all to be executed or skipped as a whole only if a specified condition is satisfied, which involves semantic compounding. IterativeGroupedOperationSpecifier is a group of multiple statements that are all to be executed as a whole iteratively while a specified condition is evaluated as true. It is possible to recast production rules for a programming language grammar in terms of vocabulary classes.

A programming language, for example, the structured query language (SQL) can be enhanced, for example, to include support for program defined or program definable adjectives on specific attributes of specific types of objects handled by computer programs to reduce size of queries against databases and achieve economy of expression. For example, an SQL query such as "select * from employee where rating >5 and rating <7" can be compressed to "select * from average employee" if the SQL permitted the user to define the adjective "average" on the attribute rating as having a value range from 5 to 7. Similarly, although all programming languages may not use the set of named things, programming languages can be enhanced to use the set of named things in a semantic web where names are universal identifier (ID) values and can be used directly as words in program statements. Thus, the use of a set of named things in programming languages allows different computer programs to share semantics easily.

The set of vocabulary classes for which the language model comprises qualifications, comprises, inter alia, vocabulary classes that are commonly shared by all natural languages, for example, a noun vocabulary class with vocabulary class features "case", "gender", and "number", that represents classifications of all objects experienced and thought of by humans, for example, experiential objects such as space, time, and tangible physical objects; a verb vocabulary class that represents behaviour or action patterns of classifications of objects and has a vocabulary class feature, for example, "tense" to accommodate a description of actions at various points in time, that is, the past, the present, and the future; an adjective vocabulary class that represents, in an imprecise or impressionistic manner and with economy of expression, values that individual objects have for properties applicable to their classification; an adverb vocabulary class that represents, in an imprecise or impressionistic manner and with economy of expression, values that individual actions have for properties applicable to their classification; and a pronoun vocabulary class that represents references to named or unnamed entities earlier encountered in the discourse to facilitate economy of expression. Furthermore, word to word association rules commonly shared across multiple natural languages comprise, for example, a word denoting an object can be associated with a word imprecisely or impressionistically describing a value the object has, for a property applicable to the object's classification, that is, nouns can be associated with adjectives, and a word denoting an action can be associated with a word imprecisely or impressionistically describing the value the action has, for a property applicable to the action's classification, that is, verbs can be associated with adverbs.

In an embodiment, an implementation of the language processing and knowledge building system (LPKBS) comprises text processing components based only on the generic language model, and to be practically demonstrable and useful, comprises one or more specific language objects for other natural languages that can be supported. The language object components are constructed to conform to the language model disclosed above. The LPKBS is implemented, for example, in an object oriented programming language such as Java to have a class "Language" as a base class which comprises various constituent members that may not be completely populated, and to have an initialization method (initialize( ) for which subclasses, for example, "NaturalLanguage" and "ProgrammingLanguage" can provide overriding implementations and/or supplemental implementations. On initialization, various subclasses thereof, for example, "NaturalLanguage" and "ProgrammingLanguage" perform different functions, where members of the class "Language" are created and/or completely populated. In the subclass "NaturalLanguage", in an overriding implementation of the initialization method, the member for vocabulary classes is populated with objects representing the parts of speech shared by multiple natural languages; a vocabulary class features case, a gender, and a number are created and added to the noun vocabulary class; a vocabulary class feature tense is created and added to the verb vocabulary class; the member for the sentence type set is populated with the sentence types "ClassStructureDescriptor", "ClassBehaviourDescriptor", "ActionDescriptor", etc.; and the member for the sentence part type set is populated with sentence part types "ClassDenoter", "BehaviourDenoter", etc.; and the word to sentence part type association rule set is partly populated to include rules that hold valid across all natural languages, for example, specifying that the sentence part type "ClassDenoter" is an unspecified plural noun represented as "UnspecifiedPluralNoun", the BehaviourDenoter is a present tense verb represented as "PresentTenseVerb", the ObjectDenoter is a specified noun represented as "SpecifiedNoun", the ActionDenoter is a past tense verb represented as "PastTenseVerb", etc. "EnglishLanguage", "HindiLanguage", and "KannadaLanguage" representing the natural languages English, Hindi, and Kannada respectively can be implemented as singleton subclasses of the class "NaturalLanguage", with an overriding implementation of the initialization method that sets up the vocabulary or lexicon, populates the word to word association rules, and completes populating for word to sentence part type association rule sets. The LPKBS communicates with the language object repository and facilitates construction of a specific language object for a specific language and storing of the constructed language object in the language object repository. Thus, the method disclosed herein provides a framework that works for multiple languages, abstracts out and incorporates the commonalities among multiple languages, provides a template for developing specific language components or objects, and facilitates development and plug in of such specific language components or objects in a way that is economical in terms of time, effort, and cost.

In the method disclosed herein, after receiving the textual data and the language object, the language processing and knowledge building system (LPKBS) segments 102 the received textual data into one or more sentences based on multiple sentence terminators predefined in the language object. The LPKBS segments, that is, breaks up the received textual data into sentences or utterances or other communication units, for example, based on sentence terminators for the language by querying the language object for a sentence terminator set and tokenizing the received textual data. The sentence terminator set comprises, for example, full stops, colons, etc. The LPKBS identifies, for each sentence, an initial or base sentence type based on question terminators predefined in the language object. The identified sentence type is, for example, a proposition or a question. The LPKBS queries the language object for a query terminator set comprising the question terminators, for example, punctuation marks defined in a particular language that indicate a question sentence type. For example, a question terminator is a question mark in the English language. If the LPKBS identifies a sentence ends with a character from the question terminators, the LPKBS marks or flags the sentence as a query or question. In an embodiment, the LPKBS updates the last question attribute in the discourse context when the identified sentence type is a question, to facilitate processing of a possible answer in a subsequent sentence even if the subsequent sentence omits one or more logical parts. That is, the LPKBS updates the discourse context by setting a last question attribute in the discourse context when the identified sentence type is a question to facilitate a proper analysis and understanding of the following sentence if the following sentence is brief and does not contain words or phrases for all sentence part types. For example, the textual data may contain the question "Who ate the apple?" followed by "Elizabeth." The discourse context is configured as a data structure comprising semantic items, attributes of the semantic items, and relations between the semantic items, that are associated or to be associated with each of the words of the received textual data under process by the LPKBS. A semantic item is, for example, a semantic classification of things experienced by humans, an action category, a specific object, a symbolic object, or an attribute of a classification of the things.

The language processing and knowledge building system (LPKBS) maintains the discourse context that comprises multiple attributes, in addition to the system knowledge, to facilitate pronoun resolution and proper analysis of answers to questions, when such answers, as a result of practicing economy of expression, do not contain words for all needed sentence part types. These attributes comprise, for example, a last encountered masculine singular noun phrase represented as "lastMasculineSingularNounPhrase", a last encountered feminine singular noun phrase represented as "lastFeminineSingularNounPhrase", a last encountered neuter singular noun phrase represented as "lastNeuterSingularNounPhrase", a last encountered masculine plural noun phrase represented as "lastMasculinePluralNounPhrase", a last encountered feminine plural noun phrase represented as "lastFemininePluralNounPhrase", a last encountered neuter plural noun phrase represented as "lastNeuterPluralNounPhrase", a last encountered question represented as "lastQuestion", etc. The language processing and knowledge building system (LPKBS) updates the last encountered question attribute with the sentence when the sentence is of a question type.

In the method disclosed herein, after segmenting the received textual data into one or more sentences, the language processing and knowledge building system (LPKBS) processes each of the sentences by first segmenting 103 each of the sentences into multiple words based on multiple word separators, for example, white spaces predefined in the language object. The LPKBS segments, that is, breaks each sentence into an array of words. For example, in a sentence "John ran towards Mary", the array of words comprises {John, ran, towards, Mary}. The LPKBS generates 104 a list of one or more natural language phrase objects for each of the words by identifying vocabulary classes and vocabulary class features for each of the words based on vocabulary class feature differentiators predefined in the language object. A natural language phrase object encapsulates the word, its identified vocabulary class, and vocabulary class feature values, and the root word, which may be different from the word itself, if morphing is involved. As used herein, "natural language phrase objects" refer to structured objects that replace each of the words and comprise the identified vocabulary classes, the identified vocabulary class features, and a root word of each of the words. For example, a natural language phrase object for a word "countries" comprises a root word "country", a vocabulary class "noun", vocabulary class features, that is, a case, a gender, a number, and/or a tense, for example, "plural" number for "countries", etc. In an embodiment, the natural language phrase object further comprises the word "countries". Thus, the natural language phrase object for the word "countries" is represented, for example, as {"countries", "country", "noun", "plural"}. The natural language phrase object for each word comprises a root word. The LPKBS obtains a vocabulary object of the language object and vocabulary class feature differentiation mechanisms by querying the language object. The vocabulary class feature differentiation mechanisms used by natural languages comprise, for example, (a) use of connector words, and (b) use of morphed forms per predefined morphing rules. The LPKBS uses the obtained vocabulary object to identify the vocabulary classes, and then implements processing logic based on the vocabulary class feature differentiation mechanisms to identify vocabulary class feature values for each of the words.

In an embodiment, the language processing and knowledge building system (LPKBS) identifies one or more root words and semantic variations for each of the words based on connector word rules and morphed word rules predefined in the language object for vocabulary class feature differentiation and sense differentiation. To identify the root words, the LPKBS determines whether a word is a connector word by querying the language object to first know the vocabulary class feature differentiation mechanism used for the purpose, and if the vocabulary class feature differentiation mechanism is "use of connector words", to obtain a list of connector words used by the language for the particular purpose, whether the purpose is, for example, to differentiate a case or a gender or a number or a tense or a sense variation. For example, in the English language, preposition words such as "by", "to", "of", "in", etc., are connector words used for case differentiation. On application of the connector word rules, if the LPKBS identifies that the word is not a connector word but is accompanied by a connector word, that is, the word is adjacent to the connector word, the LPKBS queries the vocabulary object to identify the vocabulary classes to which the connected word belongs, eliminates the vocabulary classes for which the accompanying connected word may not belong, retrieves the relative vocabulary class feature values and/or the semantic variations such as negation, prescription, prohibition, etc., and builds a list of natural language phrase objects or subclass instances of the word. This built list of natural language phrase objects or subclass instances of the word is referred to as a "word-vocabulary class list". On each such natural language phrase object, for each word, the LPKBS sets values for the vocabulary class features.

If the vocabulary class feature differentiation mechanism used is "use of morphed forms per predefined morphing rules", the language processing and knowledge building system (LPKBS) queries the language object to obtain morphed word rules. The LPKBS, for each word, derives a root word by reverse application of the morphed word rules for various vocabulary class feature differentiations and sense variations. A morphed word rule comprises, for example, multiple steps and each step may require a word form at that stage to have particular characteristics. If the derived word at any step does not have any specified characteristics, the LPKBS aborts the reverse application of the morphed word rule. In an example where the word is "countries", the morphed word rules for the reverse application comprise replacement of the "ies" suffix by "y" to obtain the root word. Thus, the LPKBS obtains the root word "country" from "countries". Similarly, the morphed word rule for a past tense of a verb root ending in "y" comprises two steps: first remove the last letter "y" and then add the suffix "ied". If the actual word did not end with "ied", then the LPKBS does not apply the morphed word rule. If the LPKBS successfully completes all the reverse application steps, the LPKBS remembers the vocabulary class and the vocabulary class feature values and/or sense variations associated with the successful morphed word rule and verifies whether the vocabulary object contains the root word under the identified vocabulary class. If the vocabulary object does not contain the root word under the identified vocabulary class, the LPKBS discards the remembered vocabulary class and the vocabulary class feature values and/or sense variations. If the vocabulary object contains the root word under the identified vocabulary class, the LPKBS retains the relative vocabulary class feature values and semantic variations such as negation, prescription, prohibition, etc. The vocabulary class feature values are values for case identifiers, gender identifiers, number identifiers, and tense identifiers. The LPKBS supports and implements identification of the vocabulary class feature components using a chain of responsibility design patterns to process a word for all mechanisms that are typically used in natural languages for deriving case, gender, number, tense and variants using suffixes and/or prefixes, morphed forms, connector words such as prepositions, etc.

The language processing and knowledge building system (LPKBS) applies each rule defined in the connector word rules and the morphed word rules to identify the root word and the semantic variations. If more than one rule matches with the word, the LPKBS retains each of the resulting root words and generates, that is, builds a list of natural language phrase objects or subclass instances for the root word. The LPKBS, on each such natural language phrase object for the root word, sets the relative values for the vocabulary class features. The LPKBS validates the identified vocabulary classes and each of the root words for each of the words by querying the vocabulary object predefined in the language object. Consider an example where the LPKBS, on reverse application of the plural morphed word rule for a noun ending in "y", identifies a root word of a word "pantries" as "pantry" with the noun vocabulary class and a value "plural" for the vocabulary class feature number, and, to validate the identified root word, the LPKBS queries the vocabulary object for the word "pantry" with the noun vocabulary class, and as the vocabulary object returns true, the LPKBS retains the identified noun root word, vocabulary class, and vocabulary class feature; subsequently, on reverse application of the present tense singular morphed word rule for verbs ending in "y", the LPKBS identifies a root word of the word "pantries" as "pantry" with the verb vocabulary class and the value "present" for the vocabulary class feature "tense", and to validate the identified root word, the LPKBS queries the vocabulary object for the word "pantry" with the verb vocabulary class, and as the vocabulary object returns false, the LPKBS retains the identified root word, vocabulary class, and vocabulary class feature.

In the method disclosed herein, the language processing and knowledge building system (LPKBS) creates 105 one or more sentence phrase lists using the generated lists of one or more natural language phrase objects. As used herein, "sentence phrase list" refers to a list of natural language phrase objects representing each of the words in a sentence. Each of the created sentence phrase lists comprises a combination of one natural language phrase object selected for each of the words from each generated list of one or more natural language phrase objects. The LPKBS applies combinations to all the natural language phrase objects. The LPKBS, from the generated lists of the natural language phrase objects, builds multiple lists of all possible combinations, each combination drawing one member from the list for each word and each combination applicable for the sentence as a whole. Such a combination, that is, a sentence phrase list is also referred to as a "sentence-vocabulary class list".

In the method disclosed herein, the language processing and knowledge building system (LPKBS) groups 106 two or more natural language phrase objects in each of the created sentence phrase lists based on word to word association rules predefined in the language object, the identified vocabulary classes, the identified vocabulary class features, and a position of each of the grouped or ungrouped natural language phrase objects in each of the created sentence phrase lists. The LPKBS takes into account the ungrouped natural language phrase objects also because for the first grouping and at any stage, there may be one or more ungrouped natural language phrase objects. The word to word association rules comprise rules for associating, for example, a word of an adjective vocabulary class with a word of a noun vocabulary class, a word of an adverb vocabulary class with a word of a verb vocabulary class, and a word of an adverb vocabulary class with a word of an adjective vocabulary class. The LPKBS queries the language object to obtain the word to word association rules defined for the particular language. For each combination, that is, for each sentence phrase list, the LPKBS uses positions of the natural language phrase objects or phrases in the sentence phrase list to compute a value for a dynamic position feature or a position in the sentence feature. For example, for the sentence "Countries have capitals." in English, the sentence phrase list is: {("Countries", "country", Noun,{{Number, PLURAL},{position in sentence, 1}}), ("have", "have", Verb,{{Tense, PRESENT},{position in sentence, 2}}), ("capitals", "capital", Noun,{{Number, PLURAL},{position in sentence, 3}})}; and for the sentence "He likes rainy days." in English, the sentence phrase list is: {("He", "he", Pronoun,{{Number, SINGULAR},{Case, NOMINATIVE},{position in sentence, 1}}), ("likes", "like",Verb,{{Tense, PRESENT},{position in sentence, 2}}), ("rainy","rainy", Adjective,{{Degree, SIMPLE},{position in sentence, 3}}), ("days", "day", Noun, {{Number, PLURAL},{position in sentence, 4}})}.

The language processing and knowledge building system (LPKBS) associates the words in each of the natural language phrase objects in each of the sentence phrase lists based on the word to word association rules using the values for statically defined vocabulary class features and the dynamic position feature. For example, since English does not use case and gender for adjectives and relies on position for associating adjectives to nouns, the word to word association rule is: {Adjective, Noun, { }, {positionOfAdjective=positionOfNoun−1}}, and therefore, in the example sentence, "He likes rainy days.", the word to word association rule is satisfied by "rainy" and "days", and therefore "rainy" is associated with "days". In the word to word association rule above, the third member of the quartet, that is, the "vcfSet" or the set of matching or compatible vocabulary class features is empty. In another example, the Indian language, Sanskrit, has zero word order but has distinct case, gender and number forms for adjectives and has the word to word association rule: {Adjective, Noun, {AdjectiveWordCase=NounWordCase, AdjectiveWordNumber=NounWordNumber, AdjectiveWordGender=NounWordGender}} and therefore, in each of the transliterated Sanskrit sentences: "sundarim baalakah apashyat sundarah baalikam", "sundarim baalakah sundarah baalikam apashyat", "sundarah baalakah baalikam sundarim apashyat" and "sundarah baalakah apashyat baalikam sundarim" translated as "The cute boy saw the pretty girl", the adjective word "sundarim" is associated with the noun word "baalikam" and the adjective word "sundarah" is associated with the noun word "baalakah".

The language processing and knowledge building system (LPKBS) then processes word lists if they are present in the sentence, that is, the LPKBS groups the grouped or ungrouped natural language phrase objects in each of the created sentence phrase lists based on the identified vocabulary classes, the identified vocabulary class features, the list item separators such as commas, and the list terminators such as "and" in English, predefined in the language object. The LPKBS groups the grouped or ungrouped natural language phrase objects with the same vocabulary class and the same values for all the vocabulary class features involved in each of the sentence phrase lists based on the list item separators and the list terminators predefined in the language object. For example, the sentence "John, Rama and Philip elaborately discussed and objectively evaluated the various alternatives." in English yields MultiPhrase objects or instances: one instance with a NounPhrase as a base for {John, Rama, Philip} having a noun vocabulary class, and another instance with a QualifiedVerbPhrase as a base for {discussed[elaborately], evaluated[objectively]} having a verb vocabulary class. Here, each QualifiedVerbPhrase has a verb phrase as a base phrase and hence has a verb vocabulary class. The LPKBS associates the natural language phrase objects having a noun vocabulary class with natural language phrase objects having a verb vocabulary class based on noun to verb association rules that are a subset of the word to word association rules. In an embodiment, if the language object supports noun and noun collocations, the LPKBS groups the natural language phrase objects with a noun vocabulary class, that occur in sequential positions without list item separators. For example, in the English sentence "Our school has a modern tennis court.", the words "tennis" and "court" are grouped into a single "NounCollocationPhrase" and the adjective "modern" is later associated with that phrase.

The language processing and knowledge building system (LPKBS) replaces 107 each such group of natural language phrase objects in each of the created sentence phrase lists with a consolidated natural language phrase object. The LPKBS constructs a single consolidated natural language phrase object for the grouped natural language phrase objects that were associated. The LPKBS, in each of the sentence phrase lists, replaces the associated natural language phrase objects with the constructed single consolidated natural language phrase object. For example, in English, the word to word association rule for a noun and an adjective is the adjective immediately precedes the noun and the word to word association rule for a verb and an adverb is the adverb may immediately precede or follow the verb. For example, consider the sentence "The tall boy quickly ran to me." This sentence in English results in a qualified noun phrase (QualifiedNounPhrase) "tall boy" replacing the noun phrase (NounPhrase) "boy" and the adjective phrase (AdjectivePhrase) "tall" and a qualified verb phrase (QualifiedVerbPhrase) "quickly ran" replacing the verb phrase (VerbPhrase) "ran" and the adverb phrase (AdverbPhrase) "quickly". In another example, consider a sentence with a long phrase "The exceptionally beautiful, singularly and unassumingly graceful and cultured princess and the ruggedly and uniquely handsome, exceptionally valiant and highly educated prince". In this example, the LPKBS replaces this entire long phrase containing twenty two words with one single natural language phrase object. This single natural language phrase object is a MultiPhrase object identified, for example, as mp1={(omp1), (omp2)}. In the MultiPhrase object mp1, "omp1" is an ObjectMarkedPhrase and omp1=(theMarker=(theWord="the", rootWord="the", vocabularyClass=ARTICLE), basePhrase=qnp1), where "qnp1" is a QualifiedNounPhrase and qnp1=(baseNounPhrase=(theWord="princess", rootWord="princess", vocabularyClass=NOUN, case=NOMINATIVE, gender=FEMALE, number=SINGULAR), qualifierPhrase=mp2), where "mp2" is a MultiPhrase object and mp2={qap1, qap2, qap3}, where "qap1" is a QualifiedAdjectivePhrase and qap1=(basePhrase= (theWord="beautiful", rootWord="beautiful", vocabularyClass=ADJECTIVE), qualifierPhrase= (theWord="exceptionally", rootWord="exceptionally", vocabularyClass=ADVERB)), and "qap2" is a QualifiedAdjectivePhrase and qap2=(basePhrase=(theWord="graceful", rootWord="graceful", vocabularyClass=ADJECTIVE), qualifierPhrase=mp3), where "mp3" is a MultiPhrase object and mp3={(theWord="singularly", rootWord="singularly", vocabularyClass=ADVERB), (theWord="unassumingly", rootWord="unassumingly", vocabularyClass=ADVERB)}, and "qap3" is an AdjectivePhrase and qap3=(basePhrase= (theWord="cultured", rootWord="beautiful", vocabularyClass=ADJECTIVE)).

Further, in the MultiPhrase object mp1, "omp2" is an ObjectMarkedPhrase and omp2=(theMarker= (theWord="the", rootWord="the", vocabularyClass=ARTICLE), basePhrase=qnp2), where qnp2 is a QualifiedNounPhrase and qnp2=(baseNounPhrase=(theWord="prince", rootWord="prince", vocabularyClass=NOUN, case=NOMINATIVE, gender=MALE, number=SINGULAR), qualifierPhrase=mp4), where mp4 is a MultiPhrase object and mp4={qap21, qap22, qap23}, where "qap21" is a QualifiedAdjectivePhrase and qap21=(basePhrase= (theWord="handsome", rootWord="handsome", vocabularyClass=ADJECTIVE), qualifierPhrase=mp5), where "mp5" is a MultiPhrase object and mp5={ (theWord="ruggedly", rootWord="ruggedly", vocabularyClass=ADVERB), (theWord="uniquely", rootWord="uniquely", vocabularyClass=ADVERB)}, and "qap22" is a QualifiedAdjectivePhrase and qap22=(basePhrase=(theWord="valiant", rootWord="valiant", vocabularyClass=ADJECTIVE), qualifierPhrase= (theWord="exceptionally", rootWord="exceptionally", vocabularyClass=ADVERB)), and "qap23" is a QualifiedAdjectivePhrase and qap23=(basePhrase= (theWord="educated", rootWord="educated", vocabularyClass=ADJECTIVE), qualifierPhrase= (theWord="highly", rootWord="highly", vocabularyClass=ADVERB)).

In another example, in the Sanskrit language that has zero word order but has distinct case, gender and number forms, the word to word association rule for a noun and an adjective is the noun and the adjective should have the same case, number and gender. For each of the transliterated Sanskrit sentences "sundarim baalakah apashyat sundarah baalikam", "sundarim baalakah sundarah baalikam apashyat", "sundarah baalakah baalikam sundarim apashyat", and "sundarah baalakah apashyat baalikam sundarim" translated as "The cute boy saw the pretty girl", the language processing and knowledge building system (LPKBS) creates a first QualifiedNounPhrase "sundarah baalakah" to replace the NounPhrase "baalakah" and the AdjectivePhrase "sundarah" because both are masculine, singular, and subjective, and creates a second QualifiedNounPhrase "sundarim baalikam" to replace the NounPhrase "baalikam" and the AdjectivePhrase "sundarim" because both are feminine, singular, and objective. The LPKBS updates the discourse context with the grouped natural language phrase objects to facilitate dereferencing of a word of a pronoun vocabulary class in subsequent sentences. That is, the LPKBS updates the value for corresponding applicable attributes of the discourse context comprising, for example, the LastEncounteredMasculineSingularNounPhrase, the LastEncounteredFeminineSingularNounPhrase, etc.

In the method disclosed herein, the language processing and knowledge building system (LPKBS) maps 108 each of the segmented sentences to a sentence type within the sentence type set. The sentence type set comprises, for example, an action descriptor represented as "ActionDescriptor", a class structure descriptor represented as "ClassStructureDescriptor", a class behaviour descriptor represented as "ClassBehaviourDescriptor", an object structure descriptor represented as "ObjectStructureDescriptor", a negation, a prohibition, etc., or a class structure query represented as "ClassStructureQuery", a class behaviour query represented as "ClassBehaviourQuery", an action query represented as "ActionQuery", etc., as disclosed above. Each sentence type comprises sentence part types specific to the sentence type. The sentence part types comprise, for example, an action denoter represented as "ActionDenoter", a doer denoter represented as "DoerDenoter", a class denoter represented as "ClassDenoter", a behaviour denoter represented as "BehaviourDenoter", a part denoter represented as "PartDenoter", an action attribute denoter represented as "ActionAttributeDenoter", a negation denoter represented as "NegationDenoter", etc., as disclosed above.

For mapping each of the segmented sentences to a sentence type, the LPKBS first limits the set of sentence types to be considered based on whether the segmented sentence was initially identified to be a query or a question. The LPKBS then maps 108a each natural language phrase object as present in each created sentence phrase list at a current point in the processing of the received textual data, to a sentence part type in a sentence type selected iteratively from multiple sentence types predefined in the language object, based on word to sentence part type association rules predefined in the language object, using the identified vocabulary classes, the identified vocabulary class features, and the position of each of the grouped or ungrouped natural language phrase objects in each created sentence phrase list at the current point in the processing of the received textual data. Each natural language phrase object at the current point in the processing of the received textual data is either one from the generated list of one or more natural language phrase objects, that is, one of the raw natural language phrase objects as created at the beginning of processing, or the consolidated natural language phrase object created and inserted in the place of other natural language phrase objects in the course of processing.

The word to sentence part type association rules comprise, for example, rules specifying a mapping of a natural language phrase object to a sentence part type in a sentence type based on the vocabulary classes, the vocabulary class features in the natural language phrase object, and the position of each of the natural language phrase objects in each created sentence phrase list. The language processing and knowledge building system (LPKBS) performs bidirectional mapping that comprises mapping each of the natural language phrase objects in each of the sentence phrase lists to sentence part types in a sentence type, and mapping each of the sentence part types of a sentence type to one or more natural language phrase objects. The mapping between the sentence part types and the natural language phrase objects of the sentence phrase list facilitates identification of a sentence type for the segmented sentence. In an example, in the sentence "Countries have cities.", for a sentence type "ClassStructureDescriptor" with sentence part types {ClassDenoter, CompositionDenoter, PartDenoter}, the LPKBS maps the natural language phrase object based on "countries" to the sentence part type "ClassDenoter", the natural language phrase object based on "have" to the sentence part type "CompositionDenoter", and the natural language phrase object based on "cities" to the "PartDenoter".

Further, for mapping each of the segmented sentences to a sentence type, the LPKBS identifies 108b the sentence type of each segmented sentence from the sentence type with a highest number of successfully mapped sentence part types. For example, for the sentence "Countries have cities", (1) for a sentence type "ClassStructureDescriptor" with sentence part types {ClassDenoter, CompositionDenoter, PartDenoter}, the LPKBS performs mapping for all sentence part types; (2) for a sentence type "ActionDescriptor" with sentence part types {DoerDenoter, ActionDenoter, ObjectDenoter}, the LPKBS performs mapping only for the "DoerDenoter" and the "ObjectDenoter", but not for the "ActionDenoter" because the word to sentence part type association rule for the "ActionDenoter" requires the verb to be in the past tense and the verb in the sentence is in the present tense, and therefore the sentence "Countries have cities." is mapped to the sentence type "ClassStructureDescriptor". At the end of phrase object processing, each member in the sentence phrase list is either a raw natural language phrase object as created initially for each word, or a consolidated natural language phrase object created in the course of processing that has a rich structure and comprises one or more attributes each of which is another natural language phrase object which may itself be a raw natural language phrase object or a consolidated natural language phrase object.

The language processing and knowledge building system (LPKBS) queries the language object to obtain the word to sentence part type association rules for each sentence type. For each sentence type defined in the language object, the LPKBS initializes an association map and for each rule defined under the word to sentence part type association rules for a sentence part type, the LPKBS attempts to identify a natural language phrase object from the natural language phrase objects present in the sentence phrase list at this current point in the processing. Such a natural language phrase object may be merely a raw natural language phrase object as constructed in the beginning of processing or may be a consolidated natural language phrase object constructed on the basis of the grouping performed. Using these word to sentence part type association rules, the LPKBS associates the words or phrases of each segmented sentence to sentence part types using the values for the statically defined vocabulary class features and the dynamic position feature. If a match is found, the LPKBS adds the sentence part type as a key and the identified natural language phrase object as a value in the association map. In making the above associations, multiple associations may be possible. The LPKBS considers multiple associations that are possible.

If every word to sentence part type association rule is found to be satisfied, then the sentence phrase list representing the segmented sentence is a match for the sentence type; otherwise, the association map is treated as valid-in-interim and the language processing and knowledge building system (LPKBS) implements additional processing logic using the discourse context. The LPKBS identifies the natural language phrase objects for each unmapped sentence part type using the discourse context and valid-in-interim association rules. For example, if there is a question pending an answer in the discourse context, the LPKBS identifies if the mapped natural language phrase objects in the sentence phrase list can be mapped to the unknown part in the pending question and if the known part of the pending question can be mapped to an unmapped sentence part type.

The valid-in-interim associations are typically a result of practising economy of expression, that is, omitting some words from a sentence to avoid verbosity in the communication. The language processing and knowledge building system (LPKBS) validates such associations with the discourse context and adds the inferred associations, drawing from the context. As the LPKBS updates the last encountered question attribute in the discourse context with a sentence previously processed, when the sentence is of a question type, the LPKBS can retrieve the question type sentence from the discourse context and identify a question target. If a natural language phrase object in a valid-in-interim association map contains a word or a phrase to match the identified question target, the LPKBS completes or validates the valid-in-interim natural language phrase object using the question and removes the question from the discourse context. For example, if the question is of a type "ActionDoerQuery", the natural language phrase object in a valid-in-interim association map of the sentence may provide an action doer value, or if the question is of a type "ActionTargetQuery", the natural language phrase object in the valid-in-interim association map of the sentence may provide the action target, or if the question is of a type "ActionQuery", the natural language phrase object in the valid-in-interim association map of the sentence may provide the action. Consider an example where the textual data comprises the sentences "Who ate the apple? John. Whom did you meet? Elizabeth. What did you do this afternoon? Just relaxed!". In this example, the sentence "John." is effectively "John ate the apple.", the sentence "Elizabeth." is effectively "I met Elizabeth.", and the sentence "Just relaxed!" is effectively "I just relaxed!." If there is no pending question in the discourse context, the valid-in-interim association map is discarded.

After making the word to sentence part type associations under a sentence type, the sentence phrase list may have some unmapped natural language phrase objects even after matches have been identified for all the sentence part types in the sentence type. This may be a result of practising semantic compounding in the textual data, where two or more utterances are combined into a single utterance. The language processing and knowledge building system (LPKBS) identifies a sentence part type for each of the unmapped natural language phrase objects based on the semantic compounding mechanism predefined in the language object. The semantic compounding mechanism comprises rules for associating sentence part types with the natural language phrase objects based on one or more of multiple semantic compounding types comprising, for example, a concurrency, a cause effect relationship, a condition, and a shared object between two sentences or utterances. For the sentence phrase lists that permitted only incomplete word to sentence part type associations, that is, associations not exhausting each of the natural language phrase objects but exhausting each of the sentence part types in a sentence type, and therefore resulting in one or more unmapped or unassociated natural language phrase objects, the LPKBS attempts to validate the remnant natural language phrase objects as semantically valid optional parts. Optional unmapped parts of sentences arise since sentences in actuality may have additional optional parts, in addition to parts for the sentence part types as prescribed for any one sentence type, as a result of practising rich expressiveness, economy of expression, or semantic compounding. That is, the LPKBS identifies use or presence of a semantic compounding mechanism in the sentence and the compounded sentences or utterances. For example, consider the following sentence in the English language: "I met a friend who came from Mumbai that had heavy rains through the week." This sentence results in three action phrases based on the verbs "met", "came", and "had", but only one subject phrase based on "I". The three verb phrases "met", "came", and "had" do not form a list or a collocation as a list separator is absent and the three verb phrases are not sequential. The first verb phrase "met" and the pronoun phrase "I" together form a valid proposition, that is, an "ActionDescriptor", whereas the other verb phrases "came" and "had" and phrases "who" and "that" are remnant phrases that remain unassociated.

When the sentence phrase list comprises natural language phrase objects that are unmapped to any sentence part type in the sentence type being considered, the language processing and knowledge building system (LPKBS) identifies if the sentence phrase list incorporates two or more sentences compounded semantically, based on semantic compounding types comprising, for example, a concurrency, a cause-effect relationship, a condition, a contrariness, a shared object between two sentence, etc., and the corresponding semantic compounding mechanism predefined in the language object. The semantic compounding mechanism is a compounding connector word mechanism or a compounding verb mechanism. The LPKBS identifies such compounding connector words and identifies the compounding verbs. The LPKBS uses the relative rules predefined in the language object for morphing compounding verbs and creates a map of the unmapped natural language phrase objects in the sentence phrase list to the compounding sentence parts based on the word to sentence part type association rules for compounding sentences. The word to sentence part type association rules for compounding sentences are specified in terms of the compounding connector word and the compounding verb in addition to the vocabulary class, vocabulary class features, and relative position feature.

The language processing and knowledge building system (LPKBS) queries the language object for obtaining the semantic compounding mechanisms. The semantic compounding mechanism comprises a map with a semantic compounding type as a key and the corresponding mechanism to be used as a value. The semantic compounding mechanism is, for example, a connector word mechanism or a morphed verb mechanism. If the LPKBS identifies use of a semantic compounding type with a connector mechanism, for example, in the English language, the Hindi language, and the Sanskrit language, the LPKBS queries the language object to obtain one or more connector words and identifies a match with the remnant phrases or words. If the LPKBS identifies use of a semantic compounding type with a morphed verb mechanism, for example, in the Kannada language, the LPKBS queries the language object to obtain the morphing rules and verifies whether any of the verb phrases match the obtained morphed forms.

The language processing and knowledge building system (LPKBS) then queries the language object for the word to sentence part type association rules for a compounding utterance of the identified semantic compounding type. Typically, these word to sentence part type association rules are specified around the connector words and/or the morphed verbs. Also, the compounding utterance may have a sentence type from a subset of the set of sentence types predefined in the language object. A question or a command, for example, cannot be a compounding utterance. The LPKBS then associates the remnant phrases or words to the relative sentence part types. For a complete association, the LPKBS integrates the remnant phrases or words with the compounded utterance by using a semantic relationship such as a cause-effect relationship or by using shared objects, for example, a subject object or a verb target object may be common between compounded and compounding utterances, or the subject object in one of the compounded and compounding utterances may be a verb target object in the other. Therefore, in the association maps for the compounded and compounding utterances, the LPKBS inserts the same natural language phrase object for the relative sentence part type. The LPKBS repeats the step of mapping unmapped natural language phrase objects till each of the remnant phrases are mapped to a sentence part type to handle nested compounding utterances or additional compounding utterances.

In an example, "I will employ Mary who lacks experience if you train her within a week.", the main utterance or the compounded utterance is: "I will employ Mary." The association map for this part of the compounded utterance is built first in a normal course and the other natural language phrase objects are the remnants. In this example, there are two compounding utterances: (1) an object sharing utterance "Mary lacks experience", and (2) a condition utterance "You train her within a week."; the verb object in the compounded utterance is shared as the subject of the first compounding utterance. English uses a connector word mechanism for all types of semantic compounding. The EnglishLanguage language object for English, in conformance with the language model, provides the actual connector words for various semantic compounding types and also provides the following word to sentence part type association rules for the aforementioned types of compounding utterances: (1). {{VerbObjectAsSubjectConnector, Pronoun-Interrogative, {{Case, NOMINATIVE},{position in sentence, BEGIN}}}, {ActionPart, Verb, {position in sentence, AFTER_CONNECTOR}}}, and (2) {{ConditionConnectorPart, Conjunction, {position in sentence, BEGIN}},{DoerPart, Noun or Pronoun, {position in sentence, AFTER_BEGIN}}, {ActionPart,Verb, {position in sentence, AFTER_DOER}}}. After identifying the natural language phrase object corresponding to the BEGIN position based on the prescribed vocabulary class and prescribed vocabulary class feature values, the language processing and knowledge building system (LPKBS) notes and uses the actual location of the natural language phrase object in the sentence phrase list along with the prescribed relative locations to compute the needed actual locations of the natural language phrase objects for each of the other sentence part types. The LPKBS then evaluates the natural language phrase objects at these positions in the sentence phrase list for matching with the respective sentence part types. If the natural language phrase objects are all matched, the LPKBS creates an instance of a "PropositionPhrase" class for the utterance. If the utterance is a compounding utterance, the LPKBS performs integration of the utterance with the compounded utterance. The mechanics of integration depend on the semantic compounding type. For the condition compounding type, for the compounded utterance, the LPKBS creates an instance of a "QualifiedPropositionPhrase", which is a subclass of the "PropositionPhrase", and on this natural language phrase object, sets an attribute "qualifierPhrase" to the instance of the PropositionPhrase that was created for the condition compounding utterance. For the semantic compounding type "ActionTargetAsDoer", also referred to as "VerbObjectAsSubject", the LPKBS uses the natural language phrase object identified as the action target or verb object in the compounded utterance as a map value for the "DoerPart" in the compounding utterance, then creates an instance of the "PropositionPhrase" for the compounding utterance, and then uses this "PropositionPhrase" instance for the "VerbObjectPart" in the compounded utterance. For the semantic compounding type "DoerAsDoer", the LPKBS uses the natural language phrase object identified as the "doer" in the compounded utterance as a map value for the "DoerPart" in the compounding utterance. For the semantic compounding type "DoerAsVerbObject", the LPKBS uses the natural language phrase object identified as the "doer" in the compounded utterance as a map value for the "VerbObjectPart" in the compounding utterance. Every result of this analysis for a given sentence or utterance, when duly completed, is, for a sentence type, a map of all word phrases to sentence part types with matches found for each related sentence part type.

Additional examples of semantic relations between compounding and compounded utterances or sentences in English with the connector words being "while", "because", and "but" are provided as follows: (1) The sentence: "I wrote this letter while you were having that long conversation with your friend" has a concurrency relationship characterised by two different actions performed during the same time interval; (2) The sentence: "John sold the car because he needed money urgently" has a cause-effect relationship, and (3) The sentence: "It was raining heavily but Mary walked on." has a contrariness relationship.

When a natural language phrase object in a sentence phrase list that has been successfully mapped to a sentence type is a consolidated natural language phrase object, the language processing and knowledge building system (LPKBS) creates or selects of one or more semantic items for one or more root words for each constituent of the consolidated natural language phrase object in a recursive manner. That is, if such a constituent natural language phrase object is itself a consolidated natural language phrase object, the LPKBS takes up the constituents of such a constituent natural language phrase object for consideration. When the natural language phrase object is a raw natural language phrase object, the LPKBS creates or selects the semantic item for the root word. While traversing back up the consolidation chain, the LPKBS connects the created or selected semantic items. For example, a symbolic object corresponding to an adjective may be set as a value for a relative attribute on an object semantic item corresponding to a noun that has been qualified by such an adjective. Enhancement of the system knowledge this way makes the system knowledge useful in other disparate computations.

In the method disclosed herein, for each mapped natural language phrase object in each of the created sentence phrase lists mapped successfully to the identified sentence type, the language processing and knowledge building system (LPKBS) identifies 109 one or more semantic items comprising, for example, a semantic classification of things experienced by humans, an action category, a specific object, a symbolic object, an attribute of a classification of the things, etc., corresponding to a root word of the mapped natural language phrase object in each of the created sentence phrase lists mapped successfully to the identified sentence type, from the discourse context and/or the system knowledge. The system knowledge is configured as a data structure comprising zero or more semantic items, attributes of the semantic items, and relations between the semantic items. The semantic items are associated or to be associated with each of the words of the textual data previously processed by the LPKBS. In an embodiment, the LPKBS adds the semantic items to the system knowledge at the end of processing of the textual data by merging the discourse context. The relations between the semantic items are typically the result of reading and understanding multiword phrases and full sentences. The LPKBS, by using, the specific phrases mapped to the sentence part types, identifies, in the discourse context, the semantic items that are pointed to by the specific phrases. If the LPKBS does not find such semantic items existing in the discourse context, the LPKBS identifies the semantic items from the system knowledge or from the set of named things predefined and maintained by the LPKBS. If the LPKBS does not find such semantic items even in the system knowledge, then the LPKBS creates an appropriate semantic item based on predefined semantic item creation rules and adds the semantic item to the discourse context.

For each mapped natural language phrase object, the language processing and knowledge building system (LPKBS) selects 110 one of the identified semantic items based on predefined semantic disambiguation rules. The semantic disambiguation rules are defined for a phrase category, for example, an action phrase represented as "ActionPhrase", an object phrase represented as "ObjectPhrase", and a doer phrase represented as "DoerPhrase". The DoerPhrase is used as a place holder for natural language phrase objects mapped to the "ClassDenoter" and the "ObjectDenoter" sentence part types, and the ActionPhrase is used as a place holder for natural language phrase objects mapped to the "ActionDenoter" and the "BehaviourDenoter" sentence part types. Similarly, the ObjectPhrase is used as a place holder for natural language phrase objects mapped to the "ActionTarget" sentence part type. The LPKBS disambiguates the phrase or the word pointing to the identified semantic item as the phrase or the word may be mapped to more than one semantic item. The LPKBS uses semantic disambiguation rules to identify a single semantic item from multiple semantic items, which is relevant or makes sense in the discourse context and the sentence. These semantic disambiguation rules verify that the semantic item is consistent with the word to word associations created for the sentence. The accuracy of semantic disambiguation increases with the richness of the system knowledge. For example, within an action phrase, if the "ActionPhrase" is a "QualifiedVerbPhrase", the semantic disambiguation rule is: whether the attribute instance value for "forAttribute" in the "SymbolicObject" for the "QualifierPhrase" is present as an action attribute for the action category pointed to by a "BaseVerbPhrase", and if a verb object phrase is a QualifiedNounPhrase, the semantic disambiguation rule is: whether the attribute instance value for "forAttribute" in the "SymbolicObject" for the "QualifierPhrase" is present as an attribute for the semantic class of the object pointed to by a "BaseNounPhrase". Within the doer phrase, if the "DoerPhrase" is a "QualifiedNounPhrase", the semantic disambiguation rule is: whether the attribute instance value for the "forAttribute" in the "SymbolicObject" for the "QualifierPhrase" is present as an attribute for the semantic class of the object pointed to by the "BaseNounPhrase". Across the action phrase and the doer phrase, the "classBehaviours" attribute, which is a map data structure, for the semantic class of the object pointed to by the "DoerPhrase" if the doer phrase is for the sentence part type "ClassDenoter", or for the semantic class of the object pointed to by the "DoerPhrase" if the doer phrase is for the sentence part type "ObjectDenoter", in case of active voice, should have an entry for the action category pointed to by the "ActionPhrase" as a key, and the map item value should include the semantic class of the action object or the action target identified for the "ObjectPhrase". Examples to illustrate the application of the above semantic disambiguation rules are provided below: The system knowledge comprises the following items:

1. ATR-en-periodicity=(expressions={"en", {"periodicity"}})
2. SO-en-monthly=(expressions={"en", {"monthly"}}, forAttribute=ATR-en-periodicity)
3. CLS-en-rent=(expressions={"en", {"rent"}}, classAttributes={ATR-en-periodicity}, meaningExpression="periodic payment for use of property")
4. CLS-en-opening=(expressions={"en", {"opening", "rent", "fissure"}}, meaningExpression="an opening made by rending")
5. CLS-en-fruit=(expressions={"en", {"fruit"}}, meaningExpression=" ")
6. CLS-en-plantain=(expressions={"en", {"plantain"},}, meaningExpression="a coarse banana", parentClass=CLS-en-fruit)
7. CLS-en-plant=(expressions={"en",{"plant"}}, meaningExpression="a vegetable organism")
8. CLS-en-plantain-2=(expressions={"en", "plant"}, meaningExpression="a roadside plant of genus Plantago", parentClass=CLS-en-plant)
9. AC-en-eat=(expressions={"en", {"eat"}}, meaningExpression="to take into the body by mouth as food")
10. CLS-en-elephant=(expressions={"en", {"elephant"}}, meaningExpression="land mammal having thick skin, a trunk and ivory tusks", classBehaviours={{AC-en-eat, {CLS-en-plantain}}})

Consider an example where a phrase "monthly rent" exists in a sentence, leading to a QualifiedNounPhrase qvp1=(basePhrase=(theWord="rent"), qualifierPhrase=(theWord="monthly")). In this example, the system knowledge outputs two semantic items CLS-en-rent and CLS-en-opening for the word "rent" in the QualifiedNounPhrase qvp1. However, while the CLS-en-opening does not have an attribute matching "monthly", the CLS-en-rent does. The language processing and knowledge building system (LPKBS) therefore selects CLS-en-rent. In another example, on processing the sentence "The elephant ate twenty plantains.", the LPKBS yields:

1. A doer phrase DP=(theMarker=(theWord="the", rootWord="the"), basePhrase=(theWord="elephant", rootWord="elephant", number="SINGULAR"))
2. An action phrase AP=(theWord="ate", rootWord="eat", tense="PAST")
3. An object phrase OP=(basePhrase=(theWord="plantains", rootWord="plantain", number="PLURAL"), qualifierPhrase=(theWord="twenty", rootWord="twenty"))

For the above example, the system knowledge outputs two semantic items CLS-en-plantain and CLS-en-plantain-2 for the root word "plantain" in the object phrase, CLS-en-elephant for the root word "elephant" in the doer phrase, and AC-en-eat for the root word "eat" in the action phrase. To resolve the ambiguity in the meaning for the object phrase, the class behaviours of CLS-en-elephant are considered. The class behaviours of the CLS-en-elephant have the action category AC-en-eat, and the associated target class for that behaviour is CLS-en-plantain. The language processing and knowledge building system (LPKBS) therefore selects CLS-en-plantain and discards CLS-en-plantain-2.

In an embodiment, the language processing and knowledge building system (LPKBS) creates a semantic item, or an attribute of the semantic item, or a relation of the semantic item with other semantic items and stores the created semantic item, or the attribute, or the relation in the discourse context and the system knowledge, when the semantic item, or the attribute, or the relation for a root word under the natural language phrase object mapped to a sentence part type is not found in the discourse context and/or the system knowledge. Such a creation of a semantic item is based on predefined semantic item creation rules. When the LPKBS does not find the semantic items already existing in the system knowledge for each mapped natural language phrase object, and if the LPKBS is in a learning mode and not in a validating mode, then the LPKBS creates such semantic items and adds the created semantic items to the system knowledge and the discourse context. A distinction is made with regard to the mode the LPKBS is in. In an embodiment, there are two possible modes of operation of the LPKBS, for example, a learning mode and a validation mode. The different modes of operation are motivated by human learning. A system that is always in the validation mode cannot learn from reading and will have to be first provided with an all-inclusive knowledge base. A substantial knowledge base can be developed ab-initio using the reading and understanding processes disclosed herein. For this development of the knowledge base, the LPKBS has to be in the learning mode. To process textual data in the validation mode, all the semantic items present in the lexical definitions are used, processed, and understood in the learning mode to keep building and enhancing an existing knowledge base. The lexical meaning definitions are often not complete sentences, but merely word sequences or word sets in a language such as Sanskrit with zero word order. The association map building approach at two levels, that is, word to word association and word to sentence part type association followed by the LPKBS enables harvesting knowledge from lexical meaning definitions. In an embodiment, if the lexical meaning definitions include complete sentences in compounding utterances, then the complete sentence processing capability of the LPKBS will be put to use.

The semantic item creation rules comprise, for example: for a natural language phrase object representing a verb, the language processing and knowledge building system (LPKBS) creates an action category; and for a natural language phrase object representing an adjective or an adverb, the LPKBS creates a symbolic object. As common noun words can stand for a semantic classification or a class attribute or a symbolic object, for a mapped natural language phrase object with a common noun root word, the LPKBS determines whether to create a semantic classification or a class attribute or a symbolic object using heuristic rules on the context and by processing lexical meaning definition text data for the common noun root word obtained from the vocabulary object predefined in the language object. For a natural language phrase object with a common noun root word, the LPKBS creates one of: a SymbolicObject, an object class which is a semantic classification of objects, a role under a relation, and an attribute of an object class. To make the determination as to which one of the four is to be created, the LPKBS first applies heuristic rules based on the context: if the noun word is the root word of a base phrase in a QualifiedNounPhrase, then the noun word is unlikely to be an Attribute semantic item or a SymbolicObject and likely to be an object class semantic item; if the noun word is the root word of a doer phrase or an object phrase, the noun word is unlikely to be an attribute or a SymbolicObject and likely to be an object class semantic item. The LPKBS saves this conclusion, and then the LPKBS obtains lexical meaning definition texts corresponding to the common noun vocabulary class for the root word from the vocabulary object contained in the language object.

The language processing and knowledge building system (LPKBS) processes each lexical meaning definition text as described in the foregoing paragraphs. Noting that lexicon meaning definitions for nouns commence typically with an article, for each meaning definition of a noun word, the result of processing is, for example, an instance of an "ObjectMarkedPhrase", that is, a subtype of a natural language phrase object which has two attributes: "theMarker" attribute and a "basePhrase" attribute, both duly populated by the processing. The LPKBS checks whether the value for "theMarker" attribute is a definite article. If the value for "theMarker attribute" is a definite article, the LPKBS analyses the value for the "basePhrase" attribute; if that value for the "basePhrase" attribute is an instance of a "PossessionPhrase" which has two attributes, for example, a "possessedPart" and a "possessorPart", the values for these attributes would have been set by the processing. The LPKBS creates a SymbolicObject semantic item for the root word. If this creation does not clash with the conclusion of the heuristic analysis step, the LPKBS creates an Attribute semantic item for the "possessedPart" and sets that Attribute semantic item as the value for the "forAttribute" attribute on the SymbolicObject semantic item for the root word. If the value for "theMarker" attribute is not a definite article, the LPKBS analyses the value for the "basePhrase" attribute; if that value for the "basePhrase" attribute is a "QualifiedNounPhrase", which has two attributes, for example, a "baseNounPhrase" and a "qualifierPhrase", values for which would have been set by the processing, the LPKBS creates an object class semantic item for the word or phrase underlying the "baseNounPhrase" if such a semantic item is not already created, creates an object class semantic item for the root word if the creation does not clash with the conclusion of the heuristic analysis step, and sets up this latter object class as a subclass of the former object class. If the value for the "basePhrase" attribute is a simple "NounPhrase", the LPKBS treats the current root word under processing and the root word in the simple NounPhrase basePhrase as being semantically equivalent, and if needed, processes the lexical meaning definitions for the root word in the simple NounPhrase basePhrase to identify the semantic item. In an example, a meaning definition such as "an outdoor game" for the word "cricket" yields, on processing, an ObjectMarkedPhrase (theMarker=(rootWord="an", theWord="an"), basePhrase=((baseNounPhrase= (rootWord="game", theWord="game")), (qualifierPhrase= (rootWord="outdoor", theWord="outdoor")))) leading to an object class semantic item identified as 'CLS-en-cricket'= (expressions={{"en", {"cricket"}}}, parentClass=CLS-engame) set up as a subclass of the object class semantic item identified as 'CLS-en-game'=(expressions={{"en", {"game"}}}). In another example, a meaning definition such as "the colour of sky" for the word "blue" yields, on analysis, an ObjectMarkedPhrase (theMarker= (theWord="the"), basePhrase=(possessedPart= (theWord="colour"), posses sorPart=(theWord="sky"))) leading to an Attribute semantic item identified as 'ATR-en-colour'=(expressions={{"en", {"colour"}}}) and a SymbolicObject semantic item identified as 'SO-en-blue'= (expressions={{"en", {"blue"}}}, forAttribute=ATR-en-colour).

In the method disclosed herein, the language processing and knowledge building system (LPKBS) identifies 111 attributes comprising, for example, behavioural attributes such as "grazing" for a semantic class "cow", structural attributes such as "blue" for a semantic class "ocean", etc., of the created semantic items or the selected semantic items and further identifies relations between the created semantic items or the selected semantic items and other semantic items in the discourse text and/or the system knowledge. The identified relations may be between existing and existing semantic items, new and new semantic items, new and existing semantic items. The LPKBS then adds 112 identified attributes to the created semantic items or the selected semantic items, and further adds the created semantic items and the identified relations to the discourse context and the system knowledge based on the identified sentence type and the semantic consequence rules of the identified sentence type, predefined in the language object.

The semantic consequence rules comprise, for example, for a sentence type "ClassBehaviourDescriptor" with sentence part types, for example, "ClassDenoter", "BehaviourDenoter", etc., the semantic consequence rules specify that "ActionCategory" instances identified or created for the natural language phrase object mapped to the sentence part type "BehaviourDenoter" should be added to a "ClassBehaviour" attribute as an expandable set, a collection, or a list, within the object class or semantic classification identified or created for the natural language phrase object mapped to the sentence part type "ClassDenoter"; for a sentence type "ClassStructureDescriptor" with sentence part types "ClassDenoter" and "PartDenoter", the semantic consequence rules specify that "SemanticClassification" instances identified or created for the natural language phrase object mapped to the sentence part type "PartDenoter" should be added to a "ClassStructure" attribute as an expandable set, a collection, or a list, within the semantic classification identified or created for the natural language phrase object mapped to the sentence part type "ClassDenoter". Thus, using the semantic consequence associated with the sentence type, the LPKBS draws inferences as permitted by the semantic consequence rules and updates the system knowledge using the updated discourse context and persists the updated system knowledge. "ActionCategory" instances or "ActionCategory" objects in the system knowledge or the discourse context are instances of a meta-class "ActionCategory" and are classifications of actions as distinguished from the classifications of objects. Every verb denotes an ActionCategory. Actions under any action category share common attributes. Every action category can have its own attributes. Location in space and time are fundamental attributes of every action category and hence of every action. Parent-child relations are possible between action categories. For example, for the English verb word "walk", the LPKBS creates an action category identified, for example, by AC-en-walk and this would be a sub-category of the action category identified, for example, by AC-en-move created for the English verb word "move".

Thus, the language processing and knowledge building system (LPKBS) supports processing and understanding of arbitrarily complex sentences in any language, for example, a natural language such as English, Hindi, Kannada, Sanskrit, etc., a programming language such as C, C++, etc., to facilitate automated knowledge building based on textual data read by the LPKBS. The method disclosed herein uses the algorithmic approach to an extent that grammar rules are employed for processing textual data. The method disclosed herein addresses the conventional shortcomings of the algorithmic approach by recognizing the peculiarities of natural languages, programming languages, etc., and constructing models and algorithms to address those peculiarities. The method disclosed herein does not use syntax trees and is driven by an intuitive approach inspired by human learning of communication and languages.

The method disclosed herein considers semantics and communication at the core for processing textual data. The method disclosed herein, for example, mimics the way children learn natural language communication and the way natural language communication evolved, that is, by building a knowledge base by first merely referring to or describing things, then making full-fledged utterances, and finally graduating to a wide range of communication utterance types. The method disclosed herein is driven by an intuitive belief that if the core experiential semantics relating to time and space are handcrafted and made available in a computable format, then the remaining semantics can be built on top of such core semantics through reading, analysing, and understanding text and that such built semantics can be used in other computations by other software. The method disclosed herein facilitates implementation of open ontology systems in contrast to other software which are closed ontology systems with integrated ontology. In an embodiment, the method disclosed herein realizes an open ontology system in practice by combining natural language processing capability with reading of the needed unstructured or semi structured textual data in one or more natural languages in a gradual manner or a graded manner. Such an open ontology system aids self-learning and guided learning by generating questions in one or more natural languages, answers for which can be provided in the natural languages as unstructured or semi structured text. The method disclosed herein reduces the need for developing custom domain, business and enterprise specific application software, by acquiring the domain, business and enterprise knowledge by reading unstructured natural language text and then effectively being extended as a business application. The method disclosed herein delivers a generalized approach that works for multiple natural languages with diverse and disparate grammar structures, for example, Sanskrit which does not prescribe word order, and also integrates semantics and facilitates continuous learning. The method disclosed herein does not depend on specialized lexicons or large and complex semantic repositories that are handcrafted, but can build a semantic repository using a common lexicon.

The method disclosed herein addresses the problem of analysis of any sentence in a text in a natural language as a problem of association, that is, associating words of a sentence with either other words within the sentence or with logical parts of a sentence or an utterance, in the evolving context of the discourse. The language processing and knowledge building system (LPKBS) recognizes that making such word associations is one of the earliest steps in learning a natural language, even before the capability to produce or recognize complete utterances is achieved. The need for and the power of the association based approach vis-à-vis word order syntax based approach becomes apparent when it is noted that even in languages with strictly position based grammar rules, poems deviate from such rules to meet metrical needs or to achieve rhyming. The possibility of making progress towards software understanding poems is suggested. The LPKBS tackles the complexity posed by combinatorial explosion and long utterances created due to the practice of economy of expression and rich expressiveness. The LPKBS facilitates retrieving or reaping semantically significant information about objects and actions in the utterance even when a complete association to logical parts of a complete sentence cannot be achieved. The LPKBS also processes text from semi structured documents that do not or may not always contain complete sentences, for example, from tabulated data, bullet lists where each bullet may be a short phrase and contributes semantic context for sub bullets, forms with labels, sections with headings that imply a switch in a semantic item in focus, within the evolving discourse context, in the context of questions and answers, for example, in interviews and also in the context of modern day short communications, for example, text messages on mobile phones and crisp electronic mail (email) messages, and in the absence of complete sentences or verbs where the conventional syntactic parse tree approach may fail.

The language processing and knowledge building system (LPKBS) addresses the problem of understanding of the sentences in a text related to one of semantic identification, validation, disambiguation, and integration. The LPKBS executes processing algorithms that are conceived, represented, and implemented in terms of the language model disclosed above and hence, are language independent. To achieve such language independent processing, the LPKBS facilitates construction of language objects by considering different constructs and mechanisms used in different natural languages that have been identified and abstracted. Two such mechanisms are use of connector words in languages such as English, Sanskrit and Hindi, and use of morphed forms as in the Kannada language. Such constructs and mechanisms are used for multiple purposes for constructing word forms for different vocabulary class features, for communication needs such as prescription, prohibition, negation, and denial, and for compounding utterances. For example, in English, the dative case for a noun is realized by using a pre-connector "to" as in "to Mary", while in Kannada, the dative case form is realized by morphing or adding a suffix such as "ge", "nige", and "lige" depending on gender in a transliterated form. Similarly, for example, in English, to create compound sentences from two semantically related or sharing sentences, words such as "if" to specify necessary condition, "as" or "because" to specify cause-effect, words such as "who", "whom", "which", and "that" are used when things that are action doers, action objects, action targets, etc., are common to multiple sentences and there is a contextual need to compound the two sentences to achieve an economy of expression or semantic highlighting, or to work around namelessness. In the Kannada language, morphed forms of verbs are used, for example, for the word "baa" in a transliterated form for "come", the morphed forms are: "bandare" to specify necessary condition, "ban-diddarinda" for cause-effect, and "banda" for action doer. Similarly, for negation and denial, the English language uses the connector word "not", but the Kannada language uses morphing based on the suffix "illa". For prescription and prohibition, the English language uses the connectors "should" and "should not", but the Kannada language uses morphing based on the suffixes "beku" and "baaradu". The foregoing examples are only illustrative and are not exhaustive.

The language processing and knowledge building system (LPKBS) executes processing algorithms in terms of the language model, facilitates implementation of the LPKBS in a single framework or as a generic system that can at once work for multiple languages, and helps in realizing economy in terms of time, effort, and cost for developing language processing software. To enable the LPKBS to work for a new language, the LPKBS facilitates construction of a relative language object for the new language and adds the created language object to the language object repository. The LPKBS disclosed herein is implemented, for example, in the Java programming language using an object oriented analysis and design methodology and the principles of object oriented programming such as inheritance, polymorphism, etc. The LPKBS disclosed herein can be extended and implemented for applications comprising, for example, reading and understanding semi structured text, text generation, semantic indexing of web pages and websites such as semantic search, teaching systems, virtual assistants, conversation agents, etc., automated translation and question answering systems, development of domain specific languages, and open ontology systems.

Figure 2:
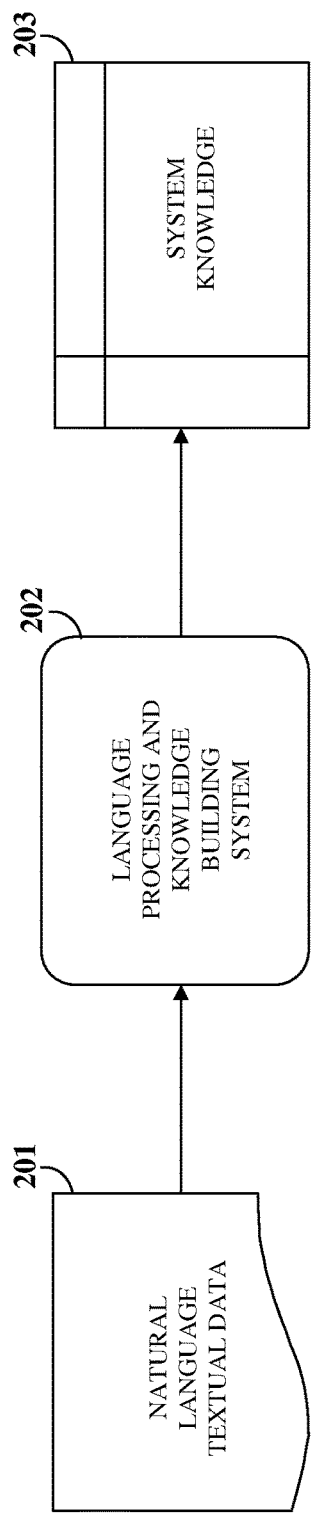
FIG. 2 exemplarily illustrates a context level process diagram of a language processing and knowledge building system for processing textual data.

FIG. 2 exemplarily illustrates a context level process diagram of the language processing and knowledge building system (LPKBS) 202 for processing textual data. The LPKBS 202 receives textual data in one of multiple natural languages, that is, natural language textual data 201 and processes the received natural language textual data 201 as disclosed in the detailed description of FIG. 1 to parse and analyse the natural language textual data 201 and understand a semantic meaning of each of the sentences in the natural language textual data 201. The LPKBS 202 then stores the semantic meanings derived from analysing the natural language textual data 201 into the system knowledge 203.

The system knowledge 203 is a data structure configured to meet the requirements of natural languages, where the natural languages have no explicit barriers between the meta-levels and need to seamlessly keep moving between meta-levels. The design of the system knowledge 203 recognizes the domain for natural language communication includes multiple meta-levels. The system knowledge 203 comprises, for example, a first meta-level of objects, links between objects, and actions of objects, a second meta-level of object classes, action categories, and associations between object classes, and a third meta-level of a meta-model for describing the object classes, associations, and action categories. In an embodiment, the system knowledge 203 is configured based on the MetaObject Facility (MOF) standard which is an Object Management Group (OMG) of the Object Management Group, Inc. The system knowledge 203 comprises a BaseItem that is a base class for every other class. The BaseItem has a property called "expressions" which is a map, in which the keys are natural language International Organization for Standardization (ISO) codes and the values are lists of words or phrases denoting the item in those respective natural languages. The BaseItem has another property called "semanticConnections" which is a list of semantic connections comprising connections of a particular semantic item with other semantic items in the system knowledge 203. The system knowledge 203 further comprises a class of objects represented as "ClassOfObjects", where every known thing or object is an instance of this class of objects; a class of links represented as "ClassOfLinks", where every relation between two specific things, for example, semantic items, is an instance of this class of links; a class of actions represented as "ClassOfActions", where every instance of this class is an action, with specific properties, performed by a specific object, where the specific properties comprise, for example, a location in space and time; a class of classes represented as "ClassOfClasses", where every instance of this class represents an object class or a classification of objects and such an instance describes the properties common to the objects belonging to the classification, where an object has a property called an "objectClass" for which the value is an instance of this class and where this class of classes supports a sub classing mechanism. Under the sub classing mechanism, a semantic classification may be marked as a subtype of another higher level or a more inclusive semantic classification. For example, for the word "horse" in English, the semantic classification CLS-en-horse is a subtype of the semantic classification CLS-en-animal, for the word "animal" in English, and for the value, CLS-en-animal is set for the attribute "parentClass" on CLS-en-horse. The sub classing mechanism permits inferences about the structure and behaviour of a subclass. The subclass inherits structure and behaviour from a parent class.

The system knowledge 203 further comprises a class of action categories represented as "ClassOfActionCategories", where every instance of this class represents a classification of actions. This instance describes the properties common to actions belonging to the classification. The system knowledge 203 further comprises a class of attributes represented as "ClassOfAttributes", where every instance of this class represents an attribute that can be attached to a semantic classification, that is, an object class or an instance of a class of classes, or an action category, that is, an instance of a class of action categories. The system knowledge 203 further comprises a class of relations represented as "ClassOfRelations", which abstracts the relations between things or objects to relations between object classes. The actions performed by an object fall under two groups, for example, behavioural actions and relation creating actions. The behavioural actions are actions performed by an object regularly and consistently, that are also performed by other objects belonging to the semantic classification to which the performing object belongs, that can be abstracted as a behaviour pattern to the level of the semantic classification to which the object may belong, and that may or may not involve another object, where the other object involved, if any, would not retain its existence and identity after the action is performed. The relation creating actions are actions that are not performed by the object regularly or consistently, that may not be also performed by other objects belonging to the semantic classification to which the performing object belongs, that cannot be abstracted as a behaviour pattern to the level of the semantic classification to which the object may belong, and that necessarily involves one or more other objects where such other one or more objects retain their existence and identity but with a change in state, after the action is performed, where in such created relations, each participating object is assigned a role.

The system knowledge 203 further comprises a class of symbolic objects represented as "ClassOfSymbolicObjects", where a "SymbolicObject" represents a value or a range of values for an attribute and facilitates impressionistic and imprecise but meaningful communication about the object concerned. The system knowledge 203 further comprises semantic connections represented as "SemanticConnections", that may be of different types. The "SemanticConnections" comprise, for example, (a) between two semantic classes "isParentOf" and "isChildOf" to facilitate type hierarchies, from a parent to a child and from a child to a parent, where the two connections are reciprocal; (b) between a semantic class and an object, for example, "isTypeOf" from a semantic class to an object and "isInstanceOf" from an object to a semantic class, where the two connections are reciprocal; (c) between two semantic classes to facilitate a composition relation comprising "consistsOf" from a whole class or a composite class to a part class and "isPartOf" from a part class or a constituent class to a whole class, where the two connections are reciprocal; (d) between two objects comprising "contains" from a whole object or a composite object to a part or a constituent object and "isContainedIn" from a part or a constituent object to a whole or a composite object, where the two connections are reciprocal; (e) between a semantic class and an attribute, for example, "hasAttribute" from a semantic class to an attribute and "isAttributeOf" from an attribute to a semantic class, where the two connections are reciprocal.

The system knowledge 203 further comprises a set of rules to map the semantics of words. For example, every word that belongs to a vocabulary class represented by common nouns maps to an instance of the "ClassOfClasses", if the text that has been read supports the conclusion that such a semantic item has a structure and a behaviour, or maps to an instance of the "ClassOfAttributes", if the text that has been read supports the conclusion that such a semantic item does not have a structure and a behaviour, or maps to a symbolic object or to a role under a relation. Other rules to map the semantics of words comprise, for example, every verb root maps to an instance of the "ClassOfActionCategories"; and every adjective and every adverb maps to a "SymbolicObject", that is, an object that encodes a probably imprecise and impressionistic value for an attribute that is understood adequately with respect to a population of objects in context.

The system knowledge 203 further comprises a set of rules to derive the semantics of phrases comprising multiple words. For example, the collocation of nouns "cricket stadium" refers to a subclass of the class represented by "stadium"; "Lords Cricket Stadium" refers to a specific object whose object class is represented by "cricket stadium"; "Lords Cricket Stadium capacity" represents the seating capacity of Lords Cricket Stadium, that is, the value that the object Lords Cricket Stadium has for the attribute "capacity", because "capacity", inter alia, represents an attribute of the class represented by "stadium". The language processing and knowledge building system (LPKBS) 202 defines a set of rules to derive the semantics of natural language utterances. For example, an utterance or a sentence that yields, as an analysis result, an action phrase represented as "ActionPhrase" that has a verb in the past tense and does not include negation, and a doer phrase represented as "DoerPhrase" that indicates one or more specific objects, is an "ActionDescriptor" whose semantic effect or semantic consequence is to produce a change in the state or states of the action doers represented by the "DoerPhrase" and, possibly, in the state or states of the action objects also referred to as action targets, and such effects may be indicated or specified in terms of the attributes of the "ActionPhrase". In another example, an utterance or a sentence which yields, as an analysis result, an "ActionPhrase" that has a verb in the present tense and does not include negation, and a "DoerPhrase" that indicates an unspecified large number of unspecified objects of a specific object type or a specific object class is a "ClassBehaviourDescriptor" whose specific semantic effect is to add to the list of behaviours of the object class.

A "DoerPhrase" with a proper noun or a common noun with an article indicates a specific object as a doer. A "DoerPhrase" with a noun in plural, without any article, indicates an object class. Such a sentence can also indicate a "ClassStructureDescriptor" if the verb involved is a member of the list returned by the language object for "verbsForComposition", and in this case, the objects for the verb denote the structural parts for the class denoted by the "DoerPhrase". For example, a sentence such as "Elephants eat grass and plantains" yields, on reading and analysis, a "ClassBehaviourDescriptor" utterance which yields, on understanding, a semantic class identified as CLS_en_GRASS with a meaning expression such as "a plant with long, narrow leaves and tubular stem" and a parent class identified as CLS_en_PLANT; a semantic class identified as CLS_en_PLANTAIN with a meaning expression such as "a coarse banana"; an action category named AC_en_EAT with a meaning expression such as "to take into the body by mouth as food"; another semantic class identified as CLS_en_ELEPHANT with a meaning expression such as "a large herbivorous mammal" and a parent class identified as en_MAMMAL with an entry in a classBehaviours map containing {AC_en_EAT, {CLS_en_GRASS, CLS_en_PLANTAIN}}. In another example, the sentence: "The man walked ten miles." yields, on reading and analysis, an ActionDescriptor utterance which yields on understanding, provided a preparatory knowledge base has been built, an update in the location of "The man" and the new location can, theoretically, be computed if the present location before starting to walk and the direction of walking are known from context and if space related core semantics are in place.

Figure 3:
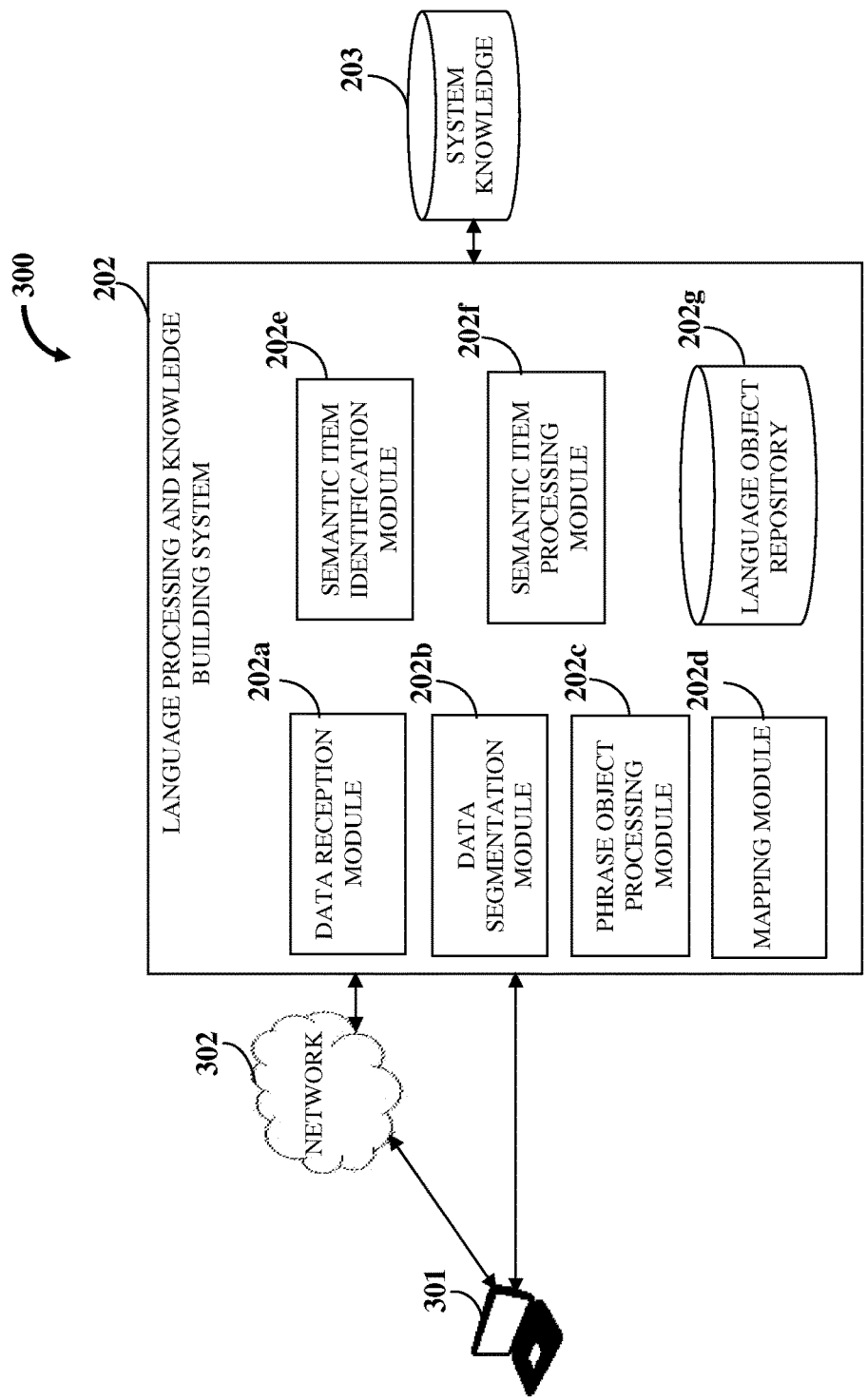
FIG. 3 exemplarily illustrates a system for processing textual data.

FIG. 3 exemplarily illustrates a system 300 for processing textual data. The system 300 disclosed herein comprises the language processing and knowledge building system (LPKBS) 202 accessible by a user device 301 either directly or via a network 302. The LPKBS 202 is implemented as a standalone software application on the user device 301, for example, a desktop computer, a laptop, a tablet computing device, etc. In an embodiment, the LPKBS 202 can be installed and run on a web based server or a cloud based server. In another embodiment, the LPKBS 202 is configured as a web based platform, for example, a website hosted on a server or a network of servers. In another embodiment, the LPKBS 202 is configured to operate as a software as a service (SaaS). In another embodiment, the LPKBS 202 is configured to operate, for example, as a platform as a service (PaaS) implemented in a cloud computing environment. As used herein, "cloud computing environment" refers to a processing environment comprising configurable computing physical and logical resources, for example, networks, servers, storage, applications, services, etc., and data distributed over the network 302, for example, the internet. The cloud computing environment provides on demand network access to a shared pool of the configurable computing physical and logical resources. In an embodiment, the LPKBS 202 is implemented on a cloud computing based platform implemented as a service for processing textual data. In an embodiment, the LPKBS 202 is implemented, for example, using the Google App engine cloud infrastructure of Google Inc., Amazon Web Services® of Amazon Technologies, Inc., the Amazon Elastic Compute Cloud EC2® web service of Amazon Technologies, Inc., the Google® Cloud platform of Google Inc., the Microsoft® Cloud platform of Microsoft Corporation, etc.

In an embodiment, the language processing and knowledge building system (LPKBS) 202 is installed on the user device 301. In another embodiment, the LPKBS 202 is accessible by the user device 301 via the network 302. The user device 301 is an electronic device, for example, a personal computer, a portable computing device, a laptop, a touch centric device, a workstation, a server, a client device, a portable electronic device, a network enabled computing device, an interactive network enabled communication device, any other suitable computing equipment, combinations of multiple pieces of computing equipment, etc. Computing equipment, for example, one or more servers may be associated with one or more online services. The network 302 is, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks. The LPKBS 202 is accessible to users, for example, through a broad spectrum of technologies and devices such as personal computers with access to the internet.

The language processing and knowledge building system (LPKBS) 202 disclosed herein comprises a non-transitory computer readable storage medium such as a memory unit, and at least one processor communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium stores computer program instructions defined by modules, for example, 202a, 202b, 202c, 202d, 202e, 202f, etc., of the LPKBS 202. The processor is configured to execute the defined computer program instructions.

The language processing and knowledge building system (LPKBS) 202 further comprises a data reception module 202a, a data segmentation module 202b, a phrase object processing module 202c, a mapping module 202d, a semantic item identification module 202e, a semantic item processing module 202f, and a language object repository 202g. The data reception module 202a receives textual data, for example, from the user device 301, and a language object, for example, from the language object repository 202g. The language object repository 202g is a code base that stores the language objects of different languages. The data segmentation module 202b segments the received textual data into one or more sentences based on multiple sentence terminators, for example, punctuation marks predefined in the language object. The data segmentation module 202b segments each of the sentences into multiple words based on multiple word separators, for example, white spaces predefined in the language object. The phrase object processing module 202c generates a list of one or more natural language phrase objects for each of the words by identifying vocabulary classes and vocabulary class features for each of the words based on vocabulary class feature differentiators predefined in the language object. In an embodiment, the phrase object processing module 202c identifies one or more root words and semantic variations for each of the words based on connector word rules and morphed word rules predefined in the language object for vocabulary class feature differentiation and sense differentiation. In an embodiment, the phrase object processing module 202c validates the identified vocabulary classes and each of the identified root words for each of the words by querying a vocabulary object predefined in the language object.

The phrase object processing module 202c creates one or more sentence phrase lists using the generated lists of one or more natural language phrase objects. Each of the created sentence phrase lists comprises a combination of one natural language phrase object selected for each of the words from each generated list of one or more natural language phrase objects. The phrase object processing module 202c groups two or more natural language phrase objects in each of the created sentence phrase lists based on word to word association rules predefined in the language object, the identified vocabulary classes, the identified vocabulary class features, and a position of each natural language phrase object in each of the created sentence phrase lists. The phrase object processing module 202c replaces each such group of natural language phrase objects in each of the created sentence phrase lists with a consolidated natural language phrase object.

The phrase object processing module 202c identifies, for each sentence, a sentence type based on question terminators predefined in the language object. In an embodiment, the sentence type comprises a proposition or a question. The phrase object processing module 202c updates the discourse context, for example, with a last question attribute, when the identified sentence type is a question, to facilitate a proper analysis and understanding of the following sentence if such a sentence happens to be brief and not contain words or phrases for all sentence part types. The phrase object processing module 202c updates the last question attribute in the discourse context when the identified sentence type is a question, to facilitate processing of a possible answer in a subsequent sentence even if the subsequent sentence omits one or more logical parts. The phrase object processing module 202c groups the grouped or ungrouped natural language phrase objects in each of the created sentence phrase lists based on the identified vocabulary classes, the identified vocabulary class features, list item separators, and list terminators predefined in the language object. In an embodiment, the phrase object processing module 202c updates the discourse context with the grouped natural language phrase objects to facilitate dereferencing of a word of a pronoun vocabulary class in subsequent sentences.

The mapping module 202d maps each of the segmented sentences to a sentence type as follows: The mapping module 202d maps each natural language phrase object present in each of the created sentence phrase lists at a current point in the processing of the received textual data to a sentence part type in a sentence type selected iteratively from multiple sentence types predefined in the language object, based on word to sentence part type association rules predefined in the language object, using the identified vocabulary classes, the identified vocabulary class features, and the position of each natural language phrase object in each of the created sentence phrase lists at the current point in the processing of the received textual data. Further, the mapping module 202d identifies a sentence type of each segmented sentence from the sentence type with a highest number of successfully mapped sentence part types. The phrase object processing module 202c identifies the natural language phrase objects for each unmapped sentence part type using the discourse context and valid-in-interim association rules. The phrase object processing module 202c also identifies a sentence part type for each of the unmapped natural language phrase objects based on a semantic compounding mechanism predefined in the language object.

The semantic item identification module 202e identifies, for each mapped natural language phrase object in each of the created sentence phrase lists mapped successfully to the identified sentence type, one or more semantic items corresponding to a root word of the mapped natural language phrase object in each of the created sentence phrase lists mapped successfully to the identified sentence type, from the discourse context and/or the system knowledge 203. The semantic item processing module 202f selects, for each mapped natural language phrase object, a semantic item from the identified semantic items based on semantic disambiguation rules predefined for action phrases and/or doer phrases. The semantic item processing module 202f identifies attributes of the created semantic items or the selected sematic items, and further identifies relations between the created semantic items or the selected semantic items and other semantic items in the discourse context and/or the system knowledge 203. The semantic item processing module 202f adds the identified attributes to the created semantic items or the selected semantic items and further adds the created semantic items and the identified relations to the discourse context and the system knowledge 203 based on the identified sentence type and the semantic consequence rules of the identified sentence type predefined in the language object.

In an embodiment, the semantic item processing module 202f creates a semantic item, or an attribute of the semantic item, or a relation of the semantic item with other semantic items and stores the created semantic item, or the attribute, or the relation in the discourse context and the system knowledge 203 when the semantic item, the attribute, or the relation for a root word under a natural language phrase object mapped to a sentence part type is not found in the discourse context and/or the system knowledge 203. The semantic item processing module 202f creates a semantic item based on predefined semantic item creation rules. For a mapped natural language phrase object with a common noun root word of the natural language phrase object, the semantic item processing module 202f determines whether to create a semantic classification, a class attribute, a role under a relation, or a symbolic object using heuristic rules on context and by processing the lexical meaning definition text for the common noun root word obtained from the vocabulary object predefined in the language object.

In an embodiment, the system knowledge 203 is any storage area or medium that can be used for storing data comprising, for example, the semantic items. The system knowledge 203 can be, for example, any of a structured query language (SQL) data store or an extensible markup language (XML) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In an embodiment, the system knowledge 203 can also be a location on a file system. In another embodiment, the system knowledge 203 can be remotely accessed by the language processing and knowledge building system (LPKBS) 202 via the network 302. In another embodiment, the system knowledge 203 is configured as a cloud based database implemented in a cloud computing environment, where computing resources are delivered as a service over the network 302.

Figure 4:
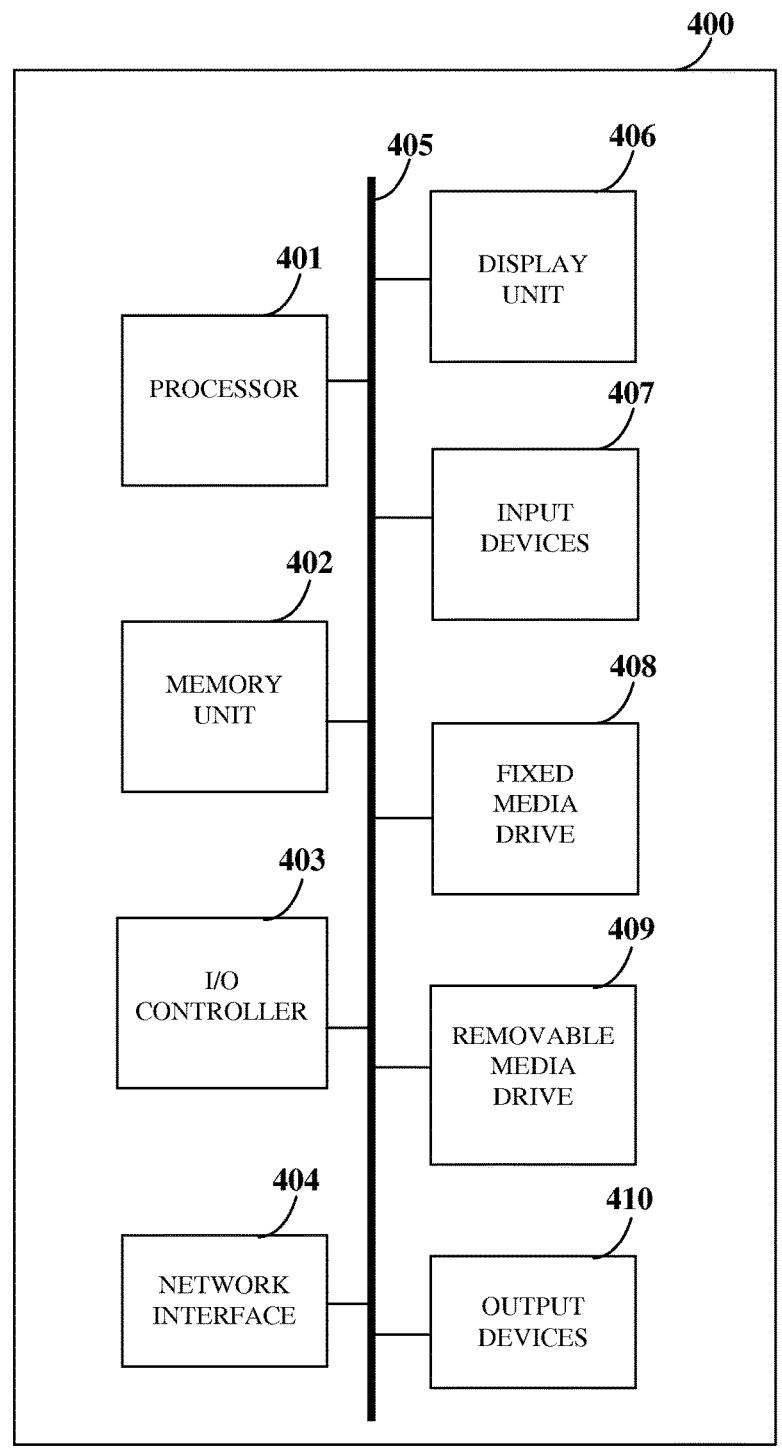
FIG. 4 exemplarily illustrates the hardware architecture of the language processing and knowledge building system employed for processing textual data.

FIG. 4 exemplarily illustrates the hardware architecture 400 of the language processing and knowledge building system (LPKBS) 202, exemplarily illustrated in FIGS. 2-3, employed for processing textual data. The LPKBS 202 is a computer system that is programmable using a high level computer programming language. The LPKBS 202 may be implemented using programmed and purposeful hardware. The LPKBS 202 communicates with user devices 301 of users, for example, language analysts, language students, users of applications that require processing of natural languages, etc., registered with the LPKBS 202 via a network 302 exemplarily illustrated in FIG. 3, for example, a short range network or a long range network.

As exemplarily illustrated in FIG. 4, the hardware architecture 400 of the language processing and knowledge building system (LPKBS) 202 comprises a processor 401, a non-transitory computer readable storage medium such as a memory unit 402 for storing computer programs and data, an input/output (I/O) controller 403, a network interface 404, a data bus 405, a display unit 406, input devices 407, a fixed media drive 408 such as a hard drive, a removable media drive 409 for receiving removable media, output devices 410, etc. The processor 401 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 401 may also be implemented as a processor set comprising, for example, a programmed microprocessor and a math or graphics co-processor. The processor 401 is selected, for example, from the Intel® processors such as the Itanium® microprocessor or the Pentium® processors, Advanced Micro Devices (AMD®) processors such as the Athlon® processor, UltraSPARC® processors, microSPARC processors, hp processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The LPKBS 202 disclosed herein is not limited to employing a processor 401. The LPKBS 202 may also employ a controller or a microcontroller. The processor 401 executes the modules, for example, 202a, 202b, 202c, 202d, 202e, 202f, etc., of the LPKBS 202 exemplarily illustrated in FIG. 3.

The memory unit 402 is used for storing computer programs, applications, and data. For example, the data reception module 202a, the data segmentation module 202b, the phrase object processing module 202c, the mapping module 202d, the semantic item identification module 202e, the semantic item processing module 202f, etc., exemplarily illustrated in FIG. 3, are stored in the memory unit 402 of the language processing and knowledge building system (LPKBS) 202. The memory unit 402 is, for example, a random access memory (RAM) or another type of dynamic storage device that stores information and instructions for execution by the processor 401. The memory unit 402 also stores temporary variables and other intermediate information used during execution of the instructions by the processor 401. The LPKBS 202 further comprises a read only memory (ROM) or another type of static storage device that stores static information and instructions for the processor 401. The I/O controller 403 controls input actions and output actions performed by the LPKBS 202.

The network interface 404 enables connection of the language processing and knowledge building system (LPKBS) 202 to the network 302. In an embodiment, the network interface 404 is provided as an interface card also referred to as a line card. The network interface 404 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 405 permits communications between the modules, for example, 202a, 202b, 202c, 202d, 202e, 202f, 202g, etc., of the LPKBS 202, and between the modules, for example, 202e, 202f, etc., and the system knowledge 203 exemplarily illustrated in FIG. 3.

The display unit 406, via a command line interface, or in an embodiment, via a graphical user interface (GUI), displays information, display interfaces, user interface elements such as text fields, etc., for allowing a user of the language processing and knowledge building system (LPKBS) 202 to view analysis results for example, natural language phrase objects mapped to sentence part types. The display unit 406 comprises, for example, a liquid crystal display, a plasma display, an organic light emitting diode (OLED) based display, etc. The input devices 407 are used for inputting data into the LPKBS 202. The users of the LPKBS 202 use the input devices 407 to provide inputs to the LPKBS 202. For example, a user may enter textual data using the input devices 407. The input devices 407 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and computer programs are used for operating the language processing and knowledge building system (LPKBS) 202. The computer programs are loaded onto the fixed media drive 408 and into the memory unit 402 of the LPKBS 202 via the removable media drive 409. In an embodiment, the computer applications and computer programs may be loaded directly via the network 302. Computer applications and computer programs are executed by double clicking a related icon displayed on the display unit 406 using one of the input devices 407. The output devices 410 output the results of operations performed by the LPKBS 202. For example, the LPKBS 202 provides customized reports to users using the output devices 410. The LPKBS 202 displays the processing and analysis results using the output devices 410.

The processor 401 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., Palm OS®, the Solaris operating system developed by Sun Microsystems, Inc., the Android operating system, the Windows Phone® operating system of Microsoft Corporation, the BlackBerry® operating system of BlackBerry Limited, the iOS operating system of Apple Inc., the Symbian™ operating system of Symbian Foundation Limited, etc. The language processing and knowledge building system (LPKBS) 202 employs the operating system for performing multiple tasks. The operating system is responsible for management and coordination of activities and sharing of resources of the LPKBS 202. The operating system further manages security of the LPKBS 202, peripheral devices connected to the LPKBS 202, and network connections. The operating system employed on the LPKBS 202 recognizes, for example, inputs provided by the users using one of the input devices 407, the output display, files, and directories stored locally on the fixed media drive 408. The operating system on the LPKBS 202 executes different computer programs using the processor 401. The processor 401 and the operating system together define a computer system for which application programs in high level programming languages are written.

The processor 401 of the language processing and knowledge building system (LPKBS) 202 retrieves instructions defined by the data reception module 202a, the data segmentation module 202b, the phrase object processing module 202c, the mapping module 202d, the semantic item identification module 202e, the semantic item processing module 202f, etc., for performing respective functions disclosed in the detailed description of FIG. 3. The processor 401 retrieves instructions for executing the modules, for example, 202a, 202b, 202c, 202d, 202e, 202f, etc., of the LPKBS 202 from the memory unit 402. A program counter determines the location of the instructions in the memory unit 402. The program counter stores a number that identifies the current position in the computer program of each of the modules, for example, 202a, 202b, 202c, 202d, 202e, 202f, etc., of the LPKBS 202. The instructions fetched by the processor 401 from the memory unit 402 after being processed are decoded. The instructions are stored in an instruction register in the processor 401. After processing and decoding, the processor 401 executes the instructions, thereby performing one or more processes defined by those instructions.

At the time of execution, the instructions stored in the instruction register are examined to determine the operations to be performed. The processor 401 then performs the specified operations. The operations comprise arithmetic operations and logic operations. The operating system performs multiple routines for performing a number of tasks required to assign the input devices 407, the output devices 410, and memory for execution of the modules, for example, 202a, 202b, 202c, 202d, 202e, 202f, etc., of the language processing and knowledge building system (LPKBS) 202. The tasks performed by the operating system comprise, for example, assigning memory to the modules, for example, 202a, 202b, 202c, 202d, 202e, 202f, etc., of the LPKBS 202, and to data used by the LPKBS 202, moving data between the memory unit 402 and disk units, and handling input/output operations. The operating system performs the tasks on request by the operations and after performing the tasks, the operating system transfers the execution control back to the processor 401. The processor 401 continues the execution to obtain one or more outputs. The outputs of the execution of the modules, for example, 202a, 202b, 202c, 202d, 202e, 202f, etc., of the LPKBS 202 are displayed to the user on the display unit 406.

For purposes of illustration, the detailed description refers to the language processing and knowledge building system (LPKBS) 202 being run locally as a single computer system; however the scope of the method and the system 300 disclosed herein is not limited to the LPKBS 202 being run locally as a single computer system via the operating system and the processor 401, but may be extended to run remotely over the network 302 by employing a web browser and a remote server, or other electronic devices. One or more portions of the LPKBS 202 may be distributed across one or more computer systems (not shown) coupled to the network 302. In an embodiment, a cluster of two or more computers implementing the Map-Reduce algorithm can also be configured to run the LPKBS 202. The modules 202a, 202b, 202c, and 202d, under multiple instances of the LPKBS 202 running simultaneously on multiple machines within the cluster, can concurrently process different parts of the input textual data. The results are then organized in the segmented sentence order for further processing by the modules 202e and 202f.

Disclosed herein is also a computer program product comprising a non-transitory computer readable storage medium that stores computer program codes comprising instructions executable by at least one processor 401 for processing textual data. The computer program product comprises a first computer program code for receiving textual data and a language object; a second computer program code for segmenting the received textual data into one or more sentences based on multiple sentence terminators predefined in the language object; a third computer program code for segmenting each of the sentences into multiple words based on multiple word separators predefined in the language object; a fourth computer program code for generating a list of one or more natural language phrase objects for each of the words by identifying vocabulary classes and vocabulary class features for each of the words based on vocabulary class feature differentiators predefined in the language object; a fifth computer program code for creating one or more sentence phrase lists using the generated lists of one or more natural language phrase objects; a sixth computer program code for grouping two or more natural language phrase objects in each of the created sentence phrase lists based on word to word association rules predefined in the language object, the identified vocabulary classes, the identified vocabulary class features, and a position of each of the natural language phrase objects in each of the created sentence phrase lists; a seventh computer program code for replacing each such group of natural language phrase objects in each of the created sentence phrase lists with a consolidated natural language phrase object; an eighth computer program code for mapping each natural language phrase object present in each of the created sentence phrase lists at a current point in the processing of the received textual data to a sentence part type in a sentence type selected iteratively from multiple sentence types predefined in the language object, based on word to sentence part type association rules predefined in the language object, using the identified vocabulary classes, the identified vocabulary class features, and the position of each of the natural language phrase objects in each of the created sentence phrase lists at the current point in the processing of the received textual data; and a ninth computer program code for identifying a sentence type of the segmented sentence from the sentence type with a highest number of successfully mapped sentence part types.

The computer program product disclosed herein further comprises a tenth computer program code for identifying, for each mapped natural language phrase object in each of the created sentence phrase lists mapped successfully to the identified sentence type, one or more semantic items corresponding to a root word of the mapped natural language phrase object in each of the created sentence phrase lists mapped successfully to the identified sentence type, from the discourse context and/or the system knowledge 203; an eleventh computer program code for selecting, for each mapped natural language phrase object, one of the identified semantic items based on predefined semantic disambiguation rules; a twelfth computer program code for identifying attributes of the created semantic items or the selected semantic items and for further identifying relations between the created semantic items or the selected semantic items and other semantic items; a thirteenth computer program code for adding the identified attributes to the created sematic items or the selected semantic items and further adding the created semantic items and the identified relations to the discourse context and the system knowledge 203 based on the identified sentence type and the semantic consequence rules of the identified sentence type, predefined in the language object. The computer program product disclosed herein further comprises a fourteenth computer program code for creating a semantic item, or an attribute of the semantic item, or a relation of the semantic item with other semantic items, and storing the created semantic item, or the attribute, or the relation in the discourse context and the system knowledge 203, when the semantic item, or the attribute, or the relation for a root word under a natural language phrase object mapped to a sentence part type is not found in the discourse context and/or the system knowledge 203.

The computer program product disclosed herein further comprises one or more additional computer program codes for performing additional steps that may be required and contemplated for processing textual data. In an embodiment, a single piece of computer program code comprising computer executable instructions performs one or more steps of the method disclosed herein for processing textual data. The computer program codes comprising computer executable instructions are embodied on the non-transitory computer readable storage medium. The processor 401 of the language processing and knowledge building system (LPKBS) 202 retrieves these computer executable instructions and executes them. When the computer executable instructions are executed by the processor 401, the computer executable instructions cause the processor 401 to perform the steps of the method for processing textual data.

Figure 5:
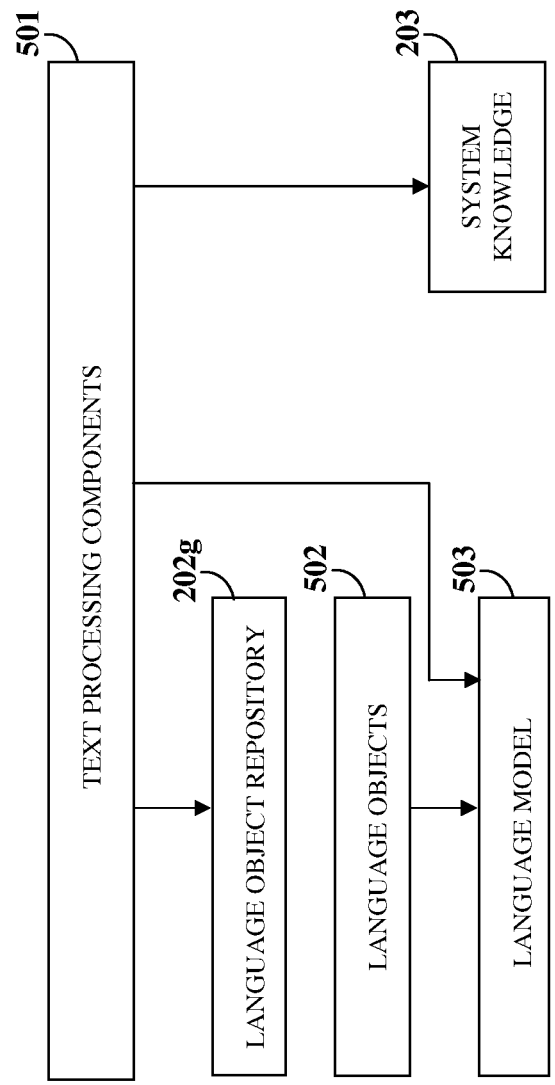
FIG. 5 exemplarily illustrates processing components employed by the language processing and knowledge building system for processing textual data.

FIG. 5 exemplarily illustrates processing components 501 employed by the language processing and knowledge building system (LPKBS) 202 exemplarily illustrated in FIGS. 2-3, for processing textual data. As exemplarily illustrated in FIG. 5, the processing components 501 communicate with the system knowledge 203, a language model 503, one or more language objects 502 obtained as an instance of the language model 503, and the language object repository 202g that stores multiple language objects 502. The LPKBS 202 retrieves a language object 502 from the language object repository 202g based on a natural language used in the textual data, processes the textual data using the retrieved language object 502, and updates the system knowledge 203 with the analysis results obtained from processing the textual data.

The language model 503 of the language processing and knowledge building system (LPKBS) 202 defines a comprehensive interface provided by natural languages. Language components or objects of natural languages comprising, for example, the English language represented as "EnglishLanguage", the Hindi language represented as "HindiLanguage", the Kannada language represented as "KannadaLanguage", the French language represented as "FrenchLanguage", the German language represented as "GermanLanguage", etc., are constructed to provide a complete implementation of such an interface. The processing components 501 query the language objects 502 to obtain information specified by the language model 503 and for processing textual data. For processing textual data in the English language using the EnglishLanguage object, the LPKBS 202 supports comparison degrees and performs derivation of new English words from known English words, for example, derivation of adjectives from nouns and vice versa, derivation of adverbs from adjectives and vice versa, etc. In an embodiment, the LPKBS 202 uses Word-Net® of Trustees of Princeton University for dictionary support for the English language. In another embodiment, the LPKBS 202 supports creation and maintenance of custom dictionaries, for example, the Hindi language dictionary and the Kannada language dictionary, for example, in an extensible markup language (XML) format as per an XML schema that has been specifically designed for creating and maintaining such dictionaries to facilitate language translation. In an embodiment, the LPKBS 202 implements an association manager component based on the processing algorithm defined in the method disclosed herein for analysis of the textual data.

Figure 6:
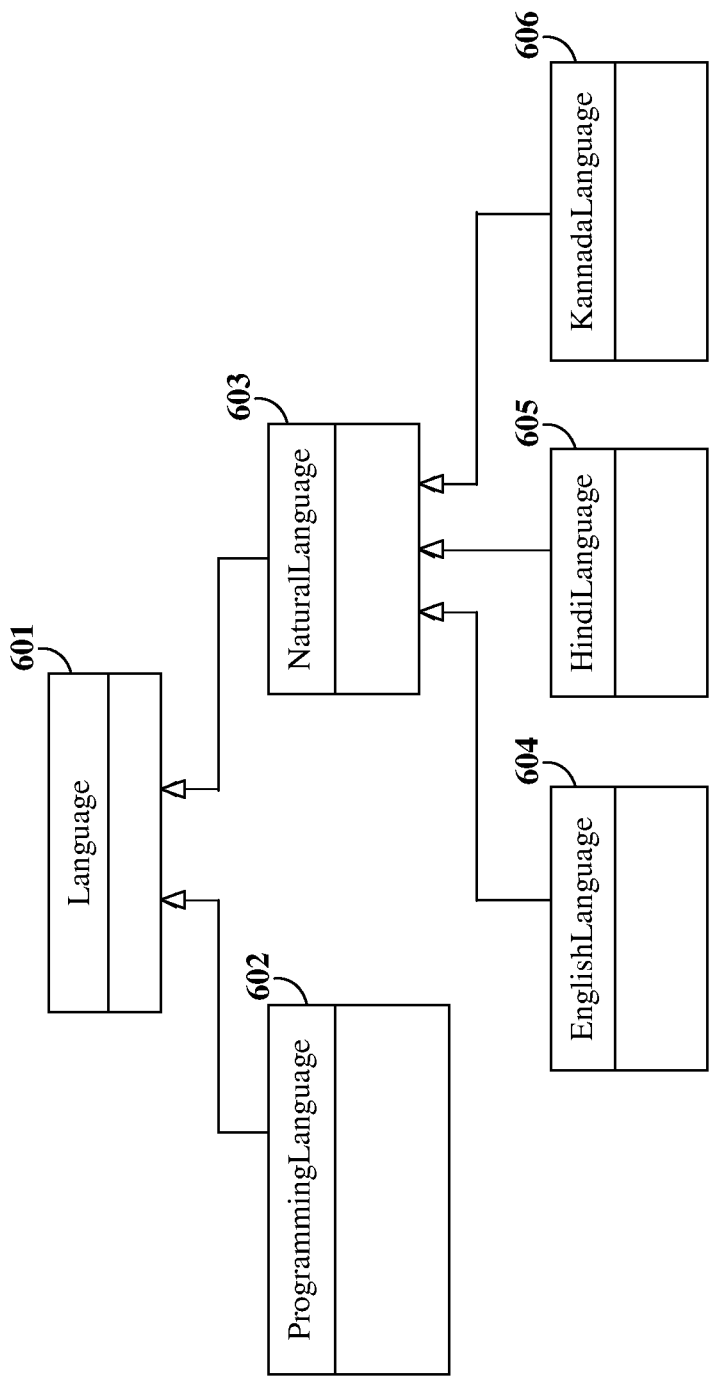
FIG. 6 exemplarily illustrates a language hierarchy employed by the language processing and knowledge building system for processing textual data.

FIG. 6 exemplarily illustrates a language hierarchy employed by the language processing and knowledge building system (LPKBS) 202 exemplarily illustrated in FIGS. 2-3, for processing textual data. The LPKBS 202 employs the language hierarchy comprising, for example, a class "Language" 601 as a base class with subclasses, for example, "NaturalLanguage" 603 and "ProgrammingLanguage" 602. The natural languages represented by the subclass "NaturalLanguage" 603 comprise, for example, the English language represented as "EnglishLanguage" 604, the Hindi language represented as "HindiLanguage" 605, the Kannada language represented as "KannadaLanguage" 606, etc. As exemplarily illustrated in FIG. 6, the language hierarchy is represented as a class diagram conforming to the notation of the Unified Modeling Language (UML), where the arrows indicate class inheritance. The class at the head of the language hierarchy, for example, "NaturalLanguage" 603 is a parent class or a base class, and the class at the tail of the language hierarchy, for example, "EnglishLanguage" 604 is a child class or a subclass. A child class or a subclass extends and specialises the structure and the behaviour of the parent class or the base class. This language model is disclosed in the form of a set theoretic notation in the detailed description of FIG. 1.

Figure 7:
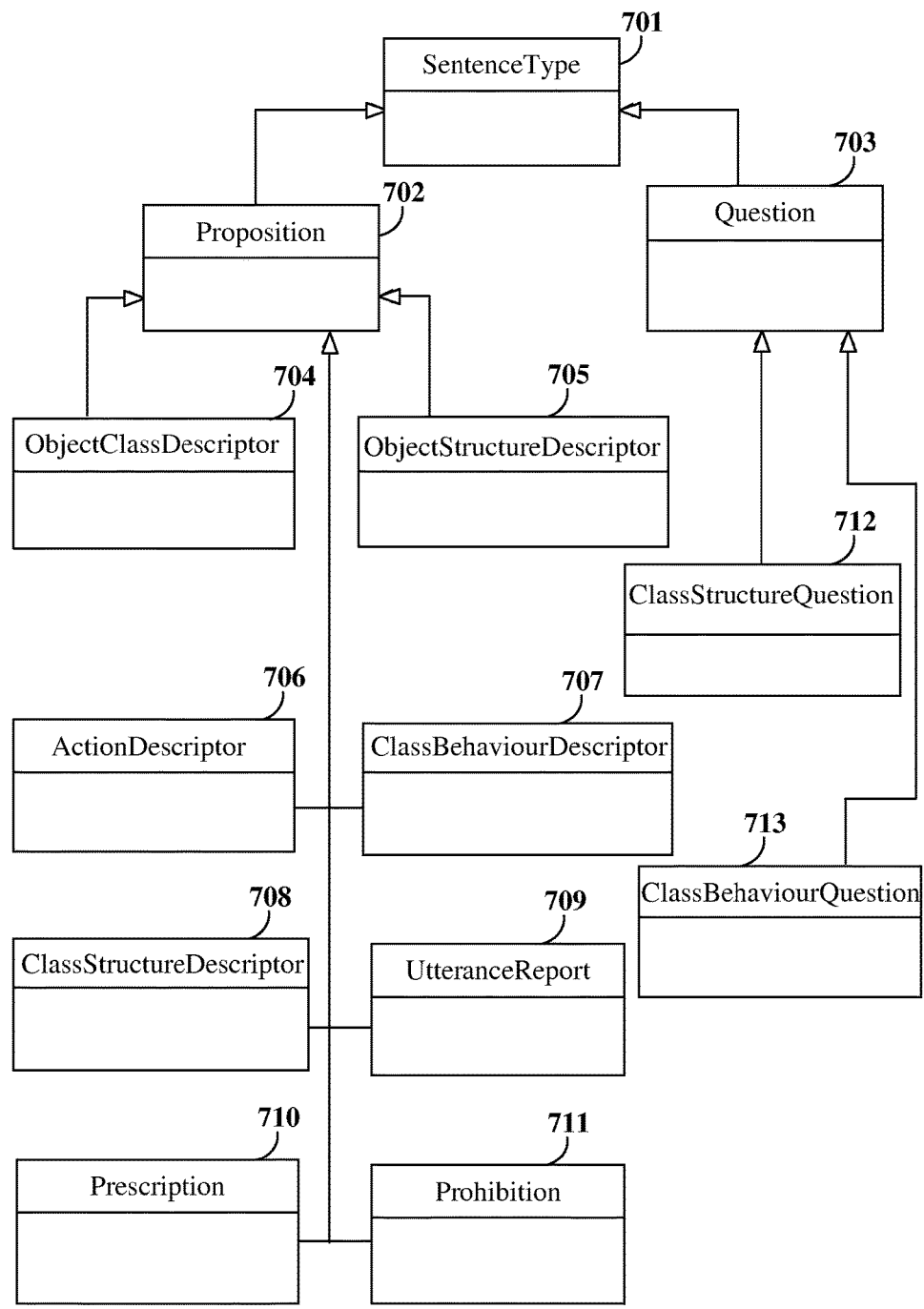
FIG. 7 exemplarily illustrates a subset of a sentence type hierarchy employed by the language processing and knowledge building system for processing textual data.

FIG. 7 exemplarily illustrates a subset of a sentence type hierarchy employed by the language processing and knowledge building system (LPKBS) 202 exemplarily illustrated in FIGS. 2-3, for processing textual data. FIG. 7 exemplarily illustrates a class diagram conforming to the notation of the Unified Modeling Language (UML), where the arrows indicate class inheritance. The class at the head of the sentence type hierarchy, for example, "SentenceType" 701 is a parent class or a base class, and the class at the tail of the sentence type hierarchy, for example, "ClassBehaviorQuestion" 713 is a child class or a subclass. A child class or a subclass extends and specialises the structure and the behaviour of the parent class or the base class. The classification exemplarily illustrated in FIG. 7, is based on the speech acts concept that represents communication semantics. A natural language utterance type or a sentence type represented as "SentenceType" 701 is classified into a "Proposition" sentence type 702 and a "Question" sentence type 703, that is, a query, as subclasses. Further, a specialization or a sub classification of the "Proposition" subclass comprises, for example, an "ObjectClassDescriptor" 704, an "ObjectStructureDescriptor" 705, an "ActionDescriptor" 706, a "ClassBehaviourDescriptor" 707 such as a class behaviour denial, a "ClassStructureDescriptor" 708 such as a class structure denial, an "UtteranceReport" 709, a "Prescription" 710, a "Prohibition" 711, etc., of the parent class "Proposition" sentence type 702. Further, a specialization or a sub classification of the "Question" subclass comprises, for example, a "ClassStructureQuestion" 712 that is a class structure query and a "ClassBehaviourQuestion" 713, that is, a class behaviour query of the parent class "Question" sentence type 703. In an embodiment, the parent class "Proposition" sentence type 702 further comprises an "ObjectBehaviourDescriptor" such as an object behaviour prescription, an object behaviour prohibition, an object behaviour denial, etc. In an embodiment, the parent class "Question" sentence type 703 further comprises an object structure query, an object behaviour query, etc. An object structure query is a question about the structure of an object. A question in English such as "Does your car have automatic gear system?" is an example of the object structure query. An object behaviour query is a question about the behaviour of an object. A question in English such as "Does the roof of this house leak when it rains heavily?" is an example of the object behaviour query.

Figure 8:
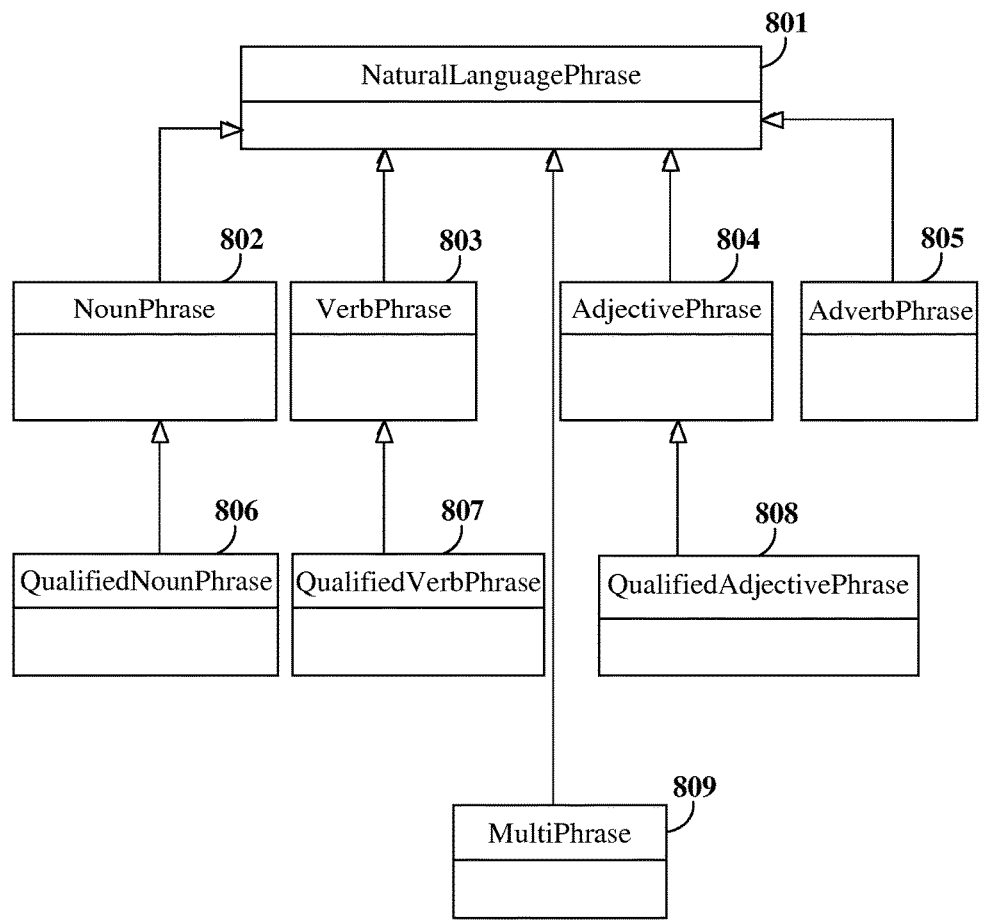
FIG. 8 exemplarily illustrates a subset of a phrase hierarchy employed by the language processing and knowledge building system for processing textual data.
Figure 9A:
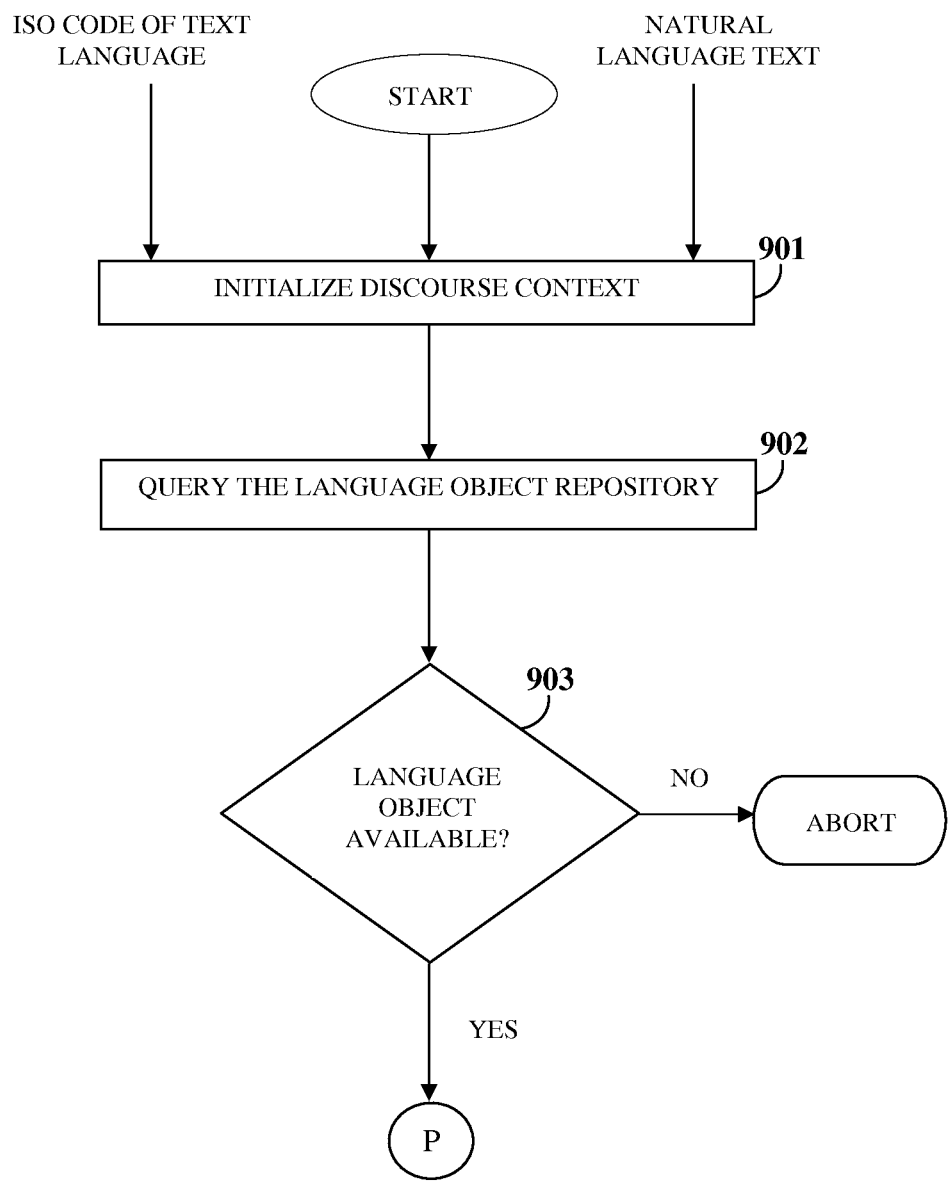
FIGS. 9A-9H exemplarily illustrate a flowchart comprising the steps performed by the language processing and knowledge building system for processing textual data.
Figure 9B:
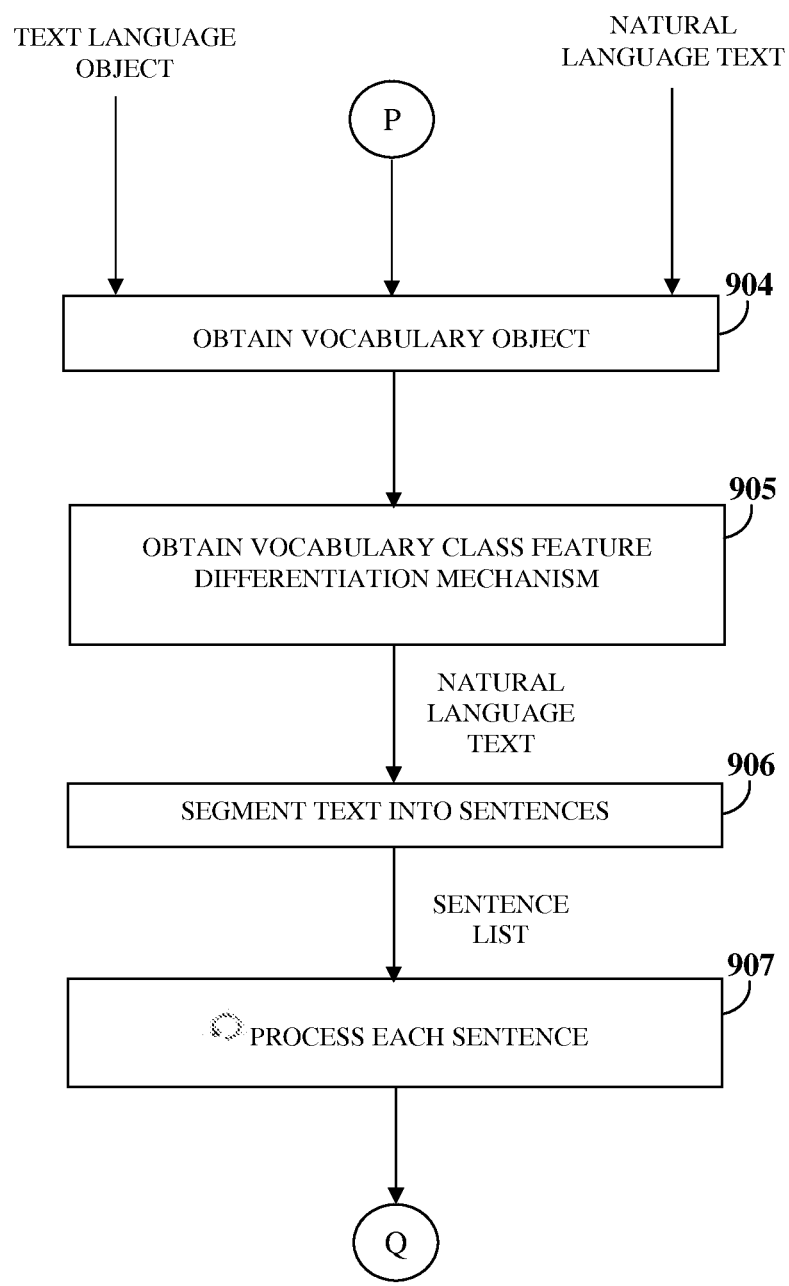
Figure 9C:
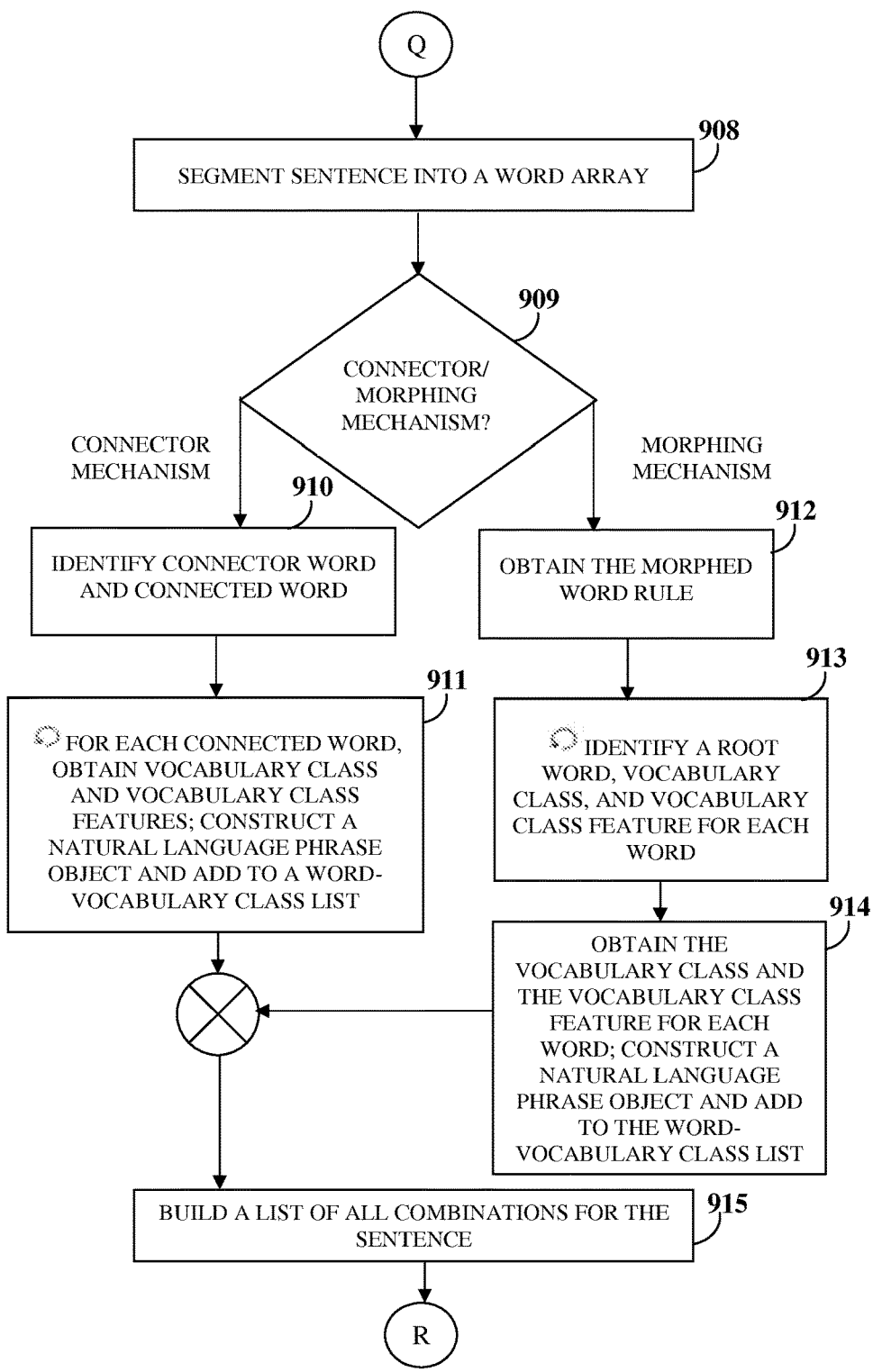
Figure 9D:
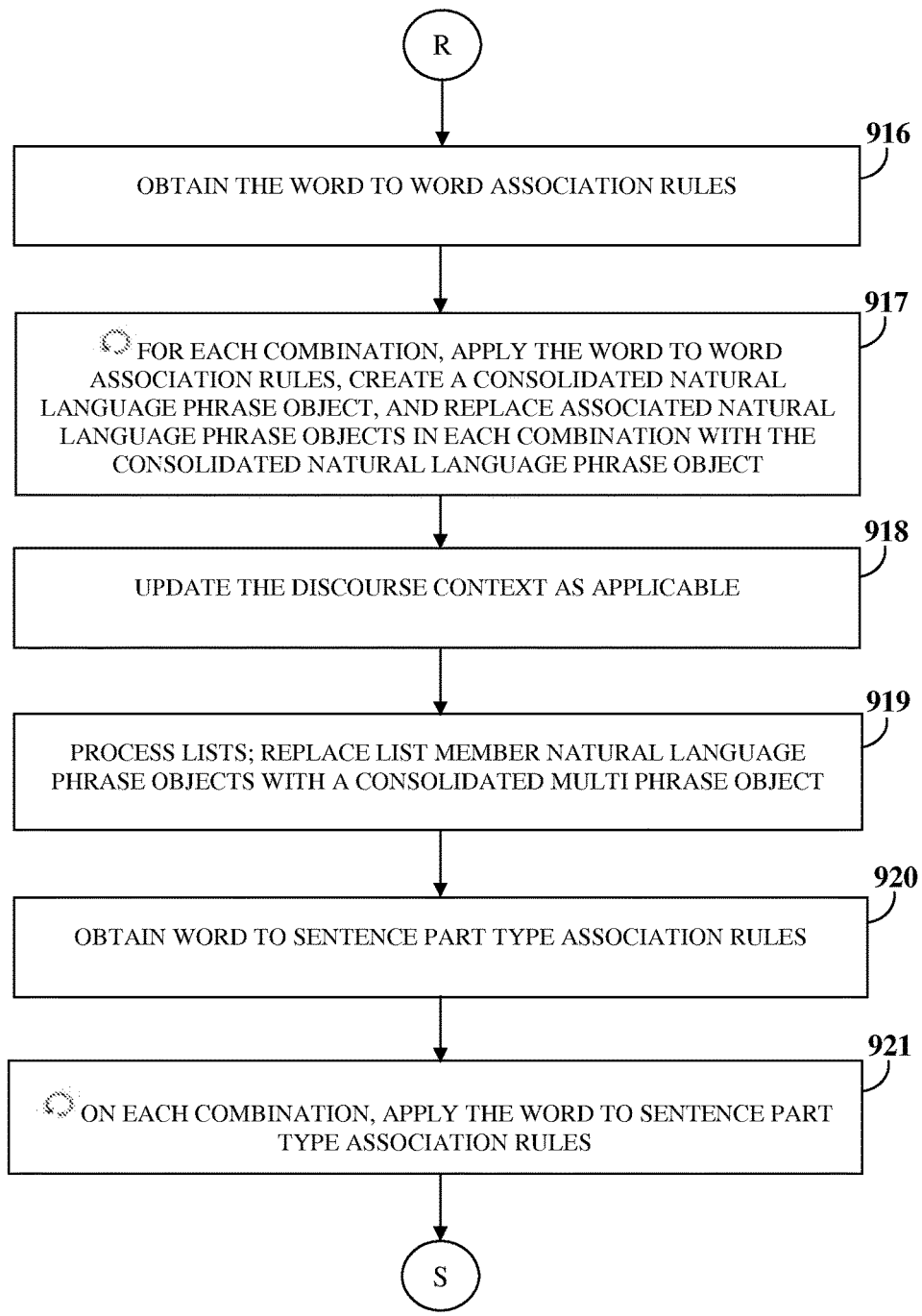
Figure 9E:
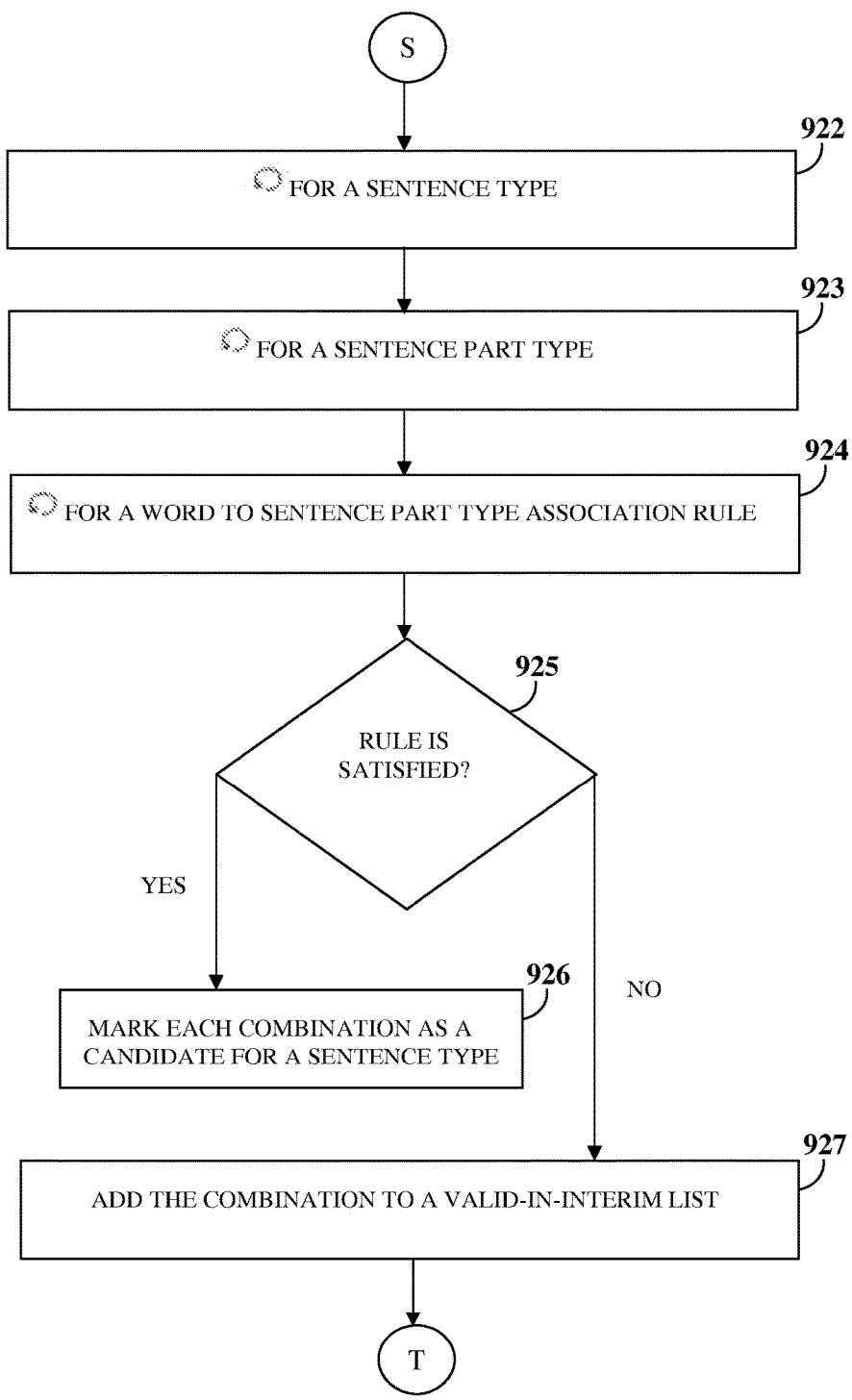
Figure 9F:
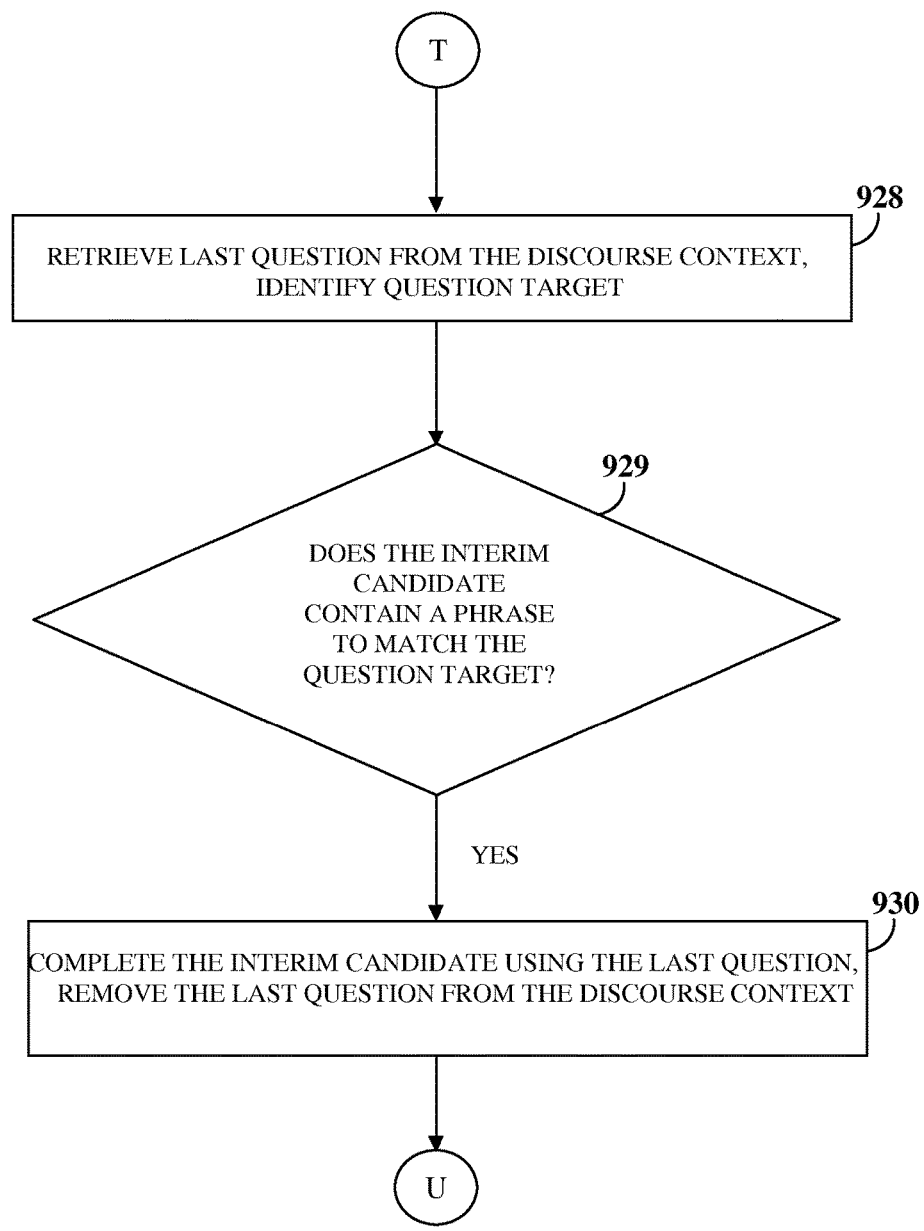
Figure 9G:
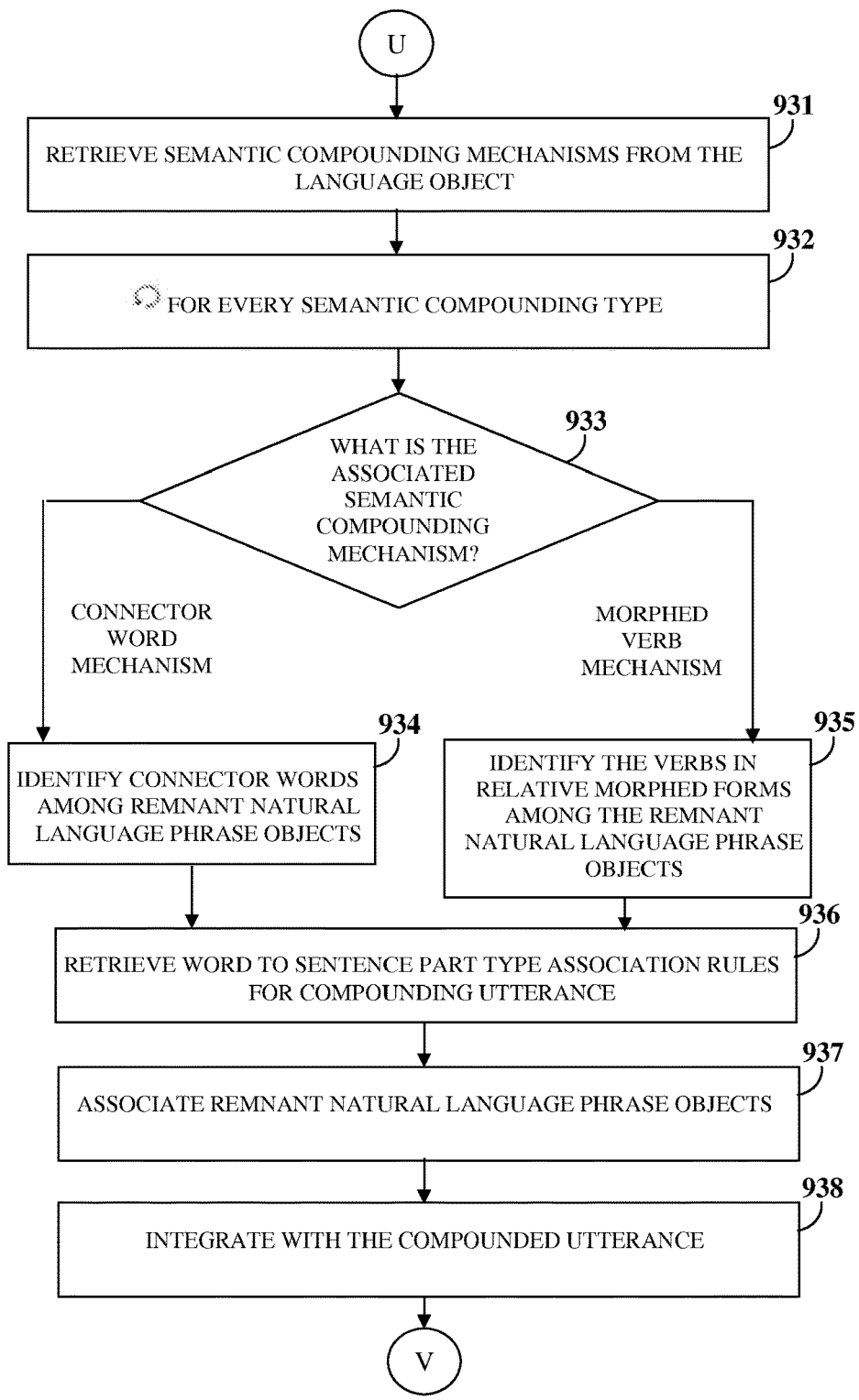
Figure 9H:
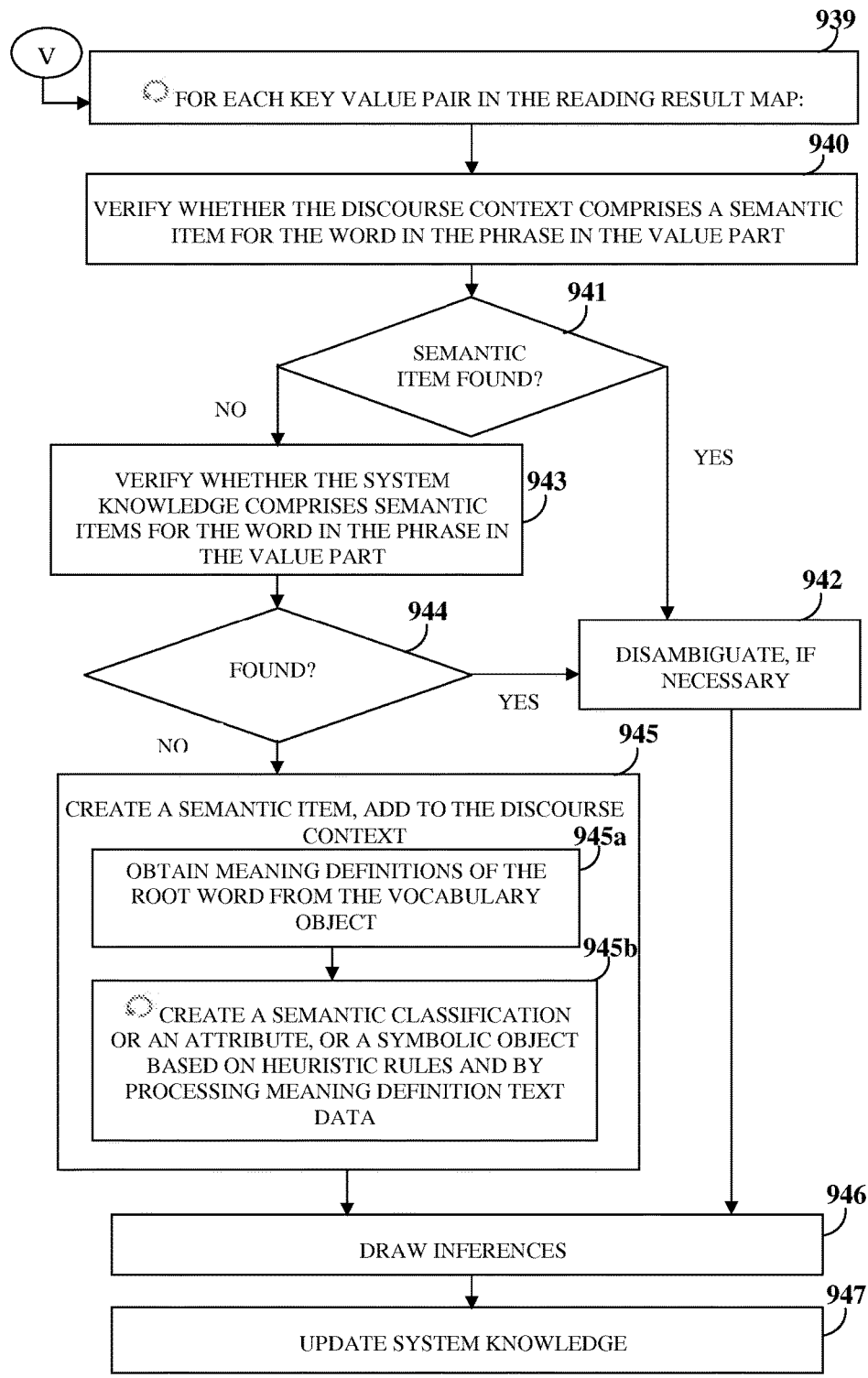

FIG. 8 exemplarily illustrates a subset of a phrase hierarchy employed by the language processing and knowledge building system (LPKBS) 202 exemplarily illustrated in FIGS. 2-3, for processing textual data. FIG. 8 exemplarily illustrates a class diagram conforming to the notation of the Unified Modeling Language (UML), where the arrows indicate class inheritance. The class at the head of the phrase hierarchy, for example, "NaturalLanguagePhrase" 801 is a parent class or a base class, and the class at the tail of the phrase hierarchy, for example, "QualifiedNounPhrase" 806 is a child class or a subclass. A child class or a subclass extends and specialises the structure and the behaviour of the parent class or the base class. In the phrase hierarchy exemplarily illustrated in FIG. 8, the term "phrase" has a richer structure and meaning than a regular phrase comprising a sequence of words. FIG. 8 exemplarily illustrates a comprehensive hierarchy of the "NaturalLanguagePhrase" class 801. The subclasses of the "NaturalLanguagePhrase" class 801 comprise, for example, "NounPhrase" 802, "VerbPhrase" 803, "AdjectivePhrase" 804, and "AdverbPhrase" 805. The subclass "NounPhrase" 802 is further classified into a "QualifiedNounPhrase" 806. The subclass "VerbPhrase" 803 is further classified into a "QualifiedVerbPhrase" 807. The subclass "AdjectivePhrase" 804 is further classified into a "QualifiedAdjectivePhrase" 808. The phrase subclasses "NounPhrase" 802, "VerbPhrase" 803, "AdjectivePhrase" 804, "AdverbPhrase" 805, "QualifiedNounPhrase" 806, "QualifiedVerbPhrase" 807, and "QualifiedAdjectivePhrase" 808 represent noun words, verb words, adjective words, adverb words, nouns qualified by adjectives, verbs qualified by adverbs, and adjectives classified by adverbs respectively. The "QualifiedNounPhrase" 806 as a subtype of the "NounPhrase" 802 has the value "noun" for its vocabulary class. The "QualifiedVerbPhrase" 807 as a subtype of the "VerbPhrase" 803 has the value "verb" for its vocabulary class. The "QualifiedAdjectivePhrase" 808 as a subtype of the "AdjectivePhrase" 804 has the value "adjective" for its vocabulary class.

The language processing and knowledge building system (LPKBS) 202 while processing textual data of a natural language, initially, represents a sentence as a list of natural language phrase objects, that is, one natural language phrase object for each word in the sentence. As processing of the sentence progresses, the LPKBS 202 replaces multiple natural language phrase objects in the sentence by a single natural language phrase object, for example, a "MultiPhrase" object 809 that is richer in structure and meaning. Such a single natural language phrase object replacing multiple natural language phrase objects is herein referred to as a consolidated natural language phrase object. Such a consolidated natural language phrase object typically has an attribute called "basePhrase", the value for which is another natural language phrase object which can belong to a subtype anywhere in the phrase hierarchy. The vocabulary class and the vocabulary class features of the consolidated natural language phrase object are the same as the vocabulary class and the vocabulary class features of the "basePhrase". The "MultiPhrase" object 809 is also a consolidated natural language phrase object as are the "QualifiedNounPhrase" object 806 and the "QualifiedVerbPhrase" 807 object. In an embodiment, the "MultiPhrase" object 809 comprises multiple "NounPhrase" objects, some of which may be "QualifedNounPhrase" objects. The "qualifierPhrase" within the "QualifiedNounPhrase" object 806 may itself be a "MultiPhrase" object 809 comprising multiple "AdjectivePhrase" objects, some of which may be "QualifiedAdjectivePhrase" objects. The "qualifierPhrase" within the "QualifiedAdjectivePhrase" object 808 may itself be a "MultiPhrase" object 809 comprising multiple "AdverbPhrase" objects.

Since action phrases contain object phrases, when the language processing and knowledge building system (LPKBS) 202 processes a simple sentence, at the end of processing of the sentence, the sentence becomes a "PropositionPhrase" object that contains a subject phrase and an action phrase. A graphic analogy for this textual data processing and the results generated is, for example, butter emerging from churning of curd. The language model thus facilitates construction of a comprehensive hierarchy of phrase types to facilitate reading, analysis, and understanding of sentences in the textual data. A base phrase type is called the "NaturalLanguagePhrase" 801. At the first level of the phrase hierarchy, subtypes are introduced, based on the vocabulary classes, comprising the "NounPhrase" 802, the "VerbPhrase" 803, the "AdjectivePhrase" 804, and the "AdverbPhrase" 805 as exemplarily illustrated in FIG. 8, for a natural language whose vocabulary class set comprises nouns, verbs, adjectives, and adverbs. For such a language, the second level of phrase hierarchy comprises the "QualifiedNounPhrase" 806, the "QualifiedVerbPhrase" 807, the "QualifiedAdjectivePhrase" 808, and the "QualifiedAdverbPhrase" types, and further subtypes for the "VerbPhrase" 803 based on the objects they associate with. For a complete sentence or an utterance, the phrase hierarchy comprises a "PropositionPhrase" that has attributes, for example, an action phrase and a doer phrase, either of which may, sometimes, have to be inferred from the discourse context, for example, when the utterance is an answer to a question or a part of a semi-structured text. For example, in semantic compounding, for the subject or an object of an action, the "PropositionPhrase" that represents the compounding sentence is provided.

FIGS. 9A-9H exemplarily illustrate a flowchart comprising the steps performed by the language processing and knowledge building system (LPKBS) 202 exemplarily illustrated in FIGS. 2-3, for processing textual data. Consider an example where the LPKBS 202 receives textual data of a natural language, that is, natural language text, and the International Organization for Standardization (ISO) code for the natural language in that chunk of textual data. Consider the textual data comprises two sentences, for example, "John is an adult. He and Mary are married." in the English language. The LPKBS 202 initializes 901 the discourse context for the current reading session of the textual data to update the discourse context as each successive sentence in the received textual data is analysed. The discourse context at this point in the processing will be empty. As and when the LPKBS 202 processes the textual data, the LPKBS 202 updates the discourse context with "John" as the "LastEncounteredSingularMasculineNounPhrase". The LPKBS 202 queries 902 the language object repository 202g exemplarily illustrated in FIG. 3, using the input ISO code and determines 903 whether a language object for the English language is available. If such a language object is not found or is not available, the LPKBS 202 aborts or terminates the reading session. If the LPKBS 202 finds the language object, that is, the English language object, the LPKBS 202 retrieves the language object and obtains 904 a vocabulary object from the retrieved language object. This language object comprises, for example, alphabets such as A-Z used in English, the vocabulary such as a dictionary of words in English along with their meanings, punctuation marks such as a period, a comma, a colon, a semicolon, a question mark, etc., sentence types, sentence part types, association rules, etc. The vocabulary object comprises, for example, multiple words used in English and meaning definitions of each of the words along with the vocabulary classes such as noun, verb, etc., of each of the words. The LPKBS 202 obtains 905 the vocabulary class feature differentiation mechanism from the language object to identify the vocabulary class features of the words in the textual data.

The language processing and knowledge building system (LPKBS) 202 segments 906 the received textual data into two sentences using a sentence terminator, for example, the period. The two segmented sentences are S1: "John is an adult" and S2: "He and Mary are married." The LPKBS 202 processes 907 each of the sentences S1 and S2 and segments 908 each of sentences into a word array W1 {"John", "is", "an", "adult"} and W2 {"He", "and", "Mary", "are", "married"}. For each word from each of the word arrays W1 and W2, the LPKBS 202 determines 909 whether each word is a connector word or a morphed word. The word "and" from the word array W2 is a connector word and the word "married" from word array "W2" is a morphed word. The LPKBS 202 identifies 910 the connector word "and" and the words connected by the connector word, that is, "He" and "Mary". For each of the connected words, the LPKBS 202 obtains 911 a vocabulary class (VC) and the vocabulary class features (VCFs) based on the obtained vocabulary class feature differentiators and constructs a natural language phrase object (NLPO) for each word as follows:
For sentence S1:

NLPO1: {(Word, John), (root word, John), (VC, Noun), (VCF(gender), Male), (VCF(number), singular)}
NLPO2: {(Word, is), (root word, be), (VC, Verb), (VCF (tense), Present)}
NLPO3: {(Word, an), (root word, an), (VC, article-noun), (VCF(number), Singular)}
NLPO4_1: {(Word, adult), (root word, adult), (VC, Adjective), (VCF(gender), Neuter), (VCF(number), singular)}
NLPO4_2: {(Word, adult), (root word, adult), (VC, Noun), (VCF(gender), Neuter), (VCF(number), singular)}

The language processing and knowledge building system (LPKBS) 202 adds the constructed natural language phrase objects to a word-vocabulary class list. If the LPKBS 202 identifies a morphed word, then the LPKBS 202 obtains 912 the morphed word rule and identifies 913 a root word of the morphed word. In this example, the morphed word "married" has a root word "marry". The LPKBS 202 also identifies 913 the vocabulary class and the vocabulary class feature for each word. The LPKBS 202 obtains 914 the vocabulary class (VC) and the vocabulary class features (VCFs) based on the obtained vocabulary class feature differentiators and constructs a natural language phrase object (NLPO) for each word as follows:
For sentence S2:

NLPO5: {(Word, He), (root word, He), (VC, Pronoun), (VCF(gender), Male), (VCF(number), singular)}
NLPO6: {(Word, and), (root word, and), (VC, conjunction-noun)}
NLPO7: {(Word, Mary), (root word, Mary), (VC, Noun), (VCF(gender), Female), VCF(number), Singular)}
NLPO8: {(Word, are), (root word, be), (VC, Verb), (VCF (tense), Present), (VCF(number), plural)}
NLPO9_1: {(Word, married), (root word, marry), (VC, Verb), (VCF(tense), Past)}
NLPO9_2: {(Word, married), (root word, marry), (VC, Adjective), (VCF(number), plural)}

In the NLPOs created above, there are two possible vocabulary classes that each of the words "adult" and "married" can be classified into and therefore, for each of these words, the language processing and knowledge building system (LPKBS) 202 constructs two NLPOs for each of the words "adult" and "married". Since the word "adult" can be a noun and an adjective, the LPKBS 202 constructs two NLPOs, for example, NLPO4_1 and NLPO4_2 for the word "adult". Since the word "married" can be a verb and an adjective, the LPKBS 202 constructs two NLPOs, for example, NLPO9_1 and NLPO9_2 for the word "married". The LPKBS 202 adds the constructed natural language phrase objects to the word-vocabulary class list. Thus, a word-vocabulary class list of NLPOs is constructed per word. The LPKBS 202 builds 915 a list of all possible combinations of the NLPOs for each of the sentences S1 and S2. The combinations represent a sentence as a whole and can therefore be called a sentence phrase list. For example, the combinations possible for the sentence S1 are: S1-1={NLPO1, NLPO2, NLPO3, NLPO4_1} and S1-2={NLPO1, NLPO2, NLPO3, NLPO4_2}, and for the sentence S2 are: S2-1={NLPO5, NLPO6, NLPO7, NLPO8, NLPO9_1} and S2-2={NLPO5, NLPO6, NLPO7, NLPO8, NLPO9_2}.

The language processing and knowledge building system (LPKBS) 202 obtains 916 the word to word association rules from the language object. The LPKBS 202 applies 917 the obtained word to word association rules for each of the four combinations, that is, for each of the sentence phrase lists of each of the sentences S1 and S2, creates consolidated, that is, grouped NLPOs, and replaces the associated phrase objects in each of the combinations with the consolidated NLPOs. In this example, using the word to word association rules, the LPKBS 202 groups NLPO3 and NLPO4_1, or NLPO3 and NLPO4_2, in the sentence S1 to group the phrase "an adult". Similarly, in the sentence S2, the LPKBS 202 groups NLPO8 and NLPO9_1, or NLPO8 and NLPO9_2 to group the phrase "are married". The LPKBS 202 removes each of individual words that resulted in the grouped phrases from the combinations and replaces the removed words with the grouped phrases. The sentences can now be represented as S1: John is "an adult" and S2: He and Mary "are married". The LPKBS 202 updates 918 the discourse context with the grouped phrases represented by the grouped NLPOs.

The LPKBS 202 processes 919 each of the sentence phrase lists and replaces the NLPOs in the each of the sentence phrase lists with consolidated multi-phrase objects for grouping the grouped NLPOs. In this example, the NLPOs with the noun vocabulary class that occur sequentially with list item separators and/or list terminators are grouped to form the multi-phrase object. Therefore, in the sentence S2 {John Mary} form one multi-phrase object. The LPKBS 202 obtains 920 the word to sentence part type association rules (W2SPTARs) from the language object. The language object inherits from the parent class "NaturalLanguage", the following example sentence types, inter alia:

ST_OCD=ObjectClassDescriptor with sentence part types {ObjectIdentifier, ExistenceDenoter, ClassDenoter}

ST_OSD=ObjectStateDescriptor with sentence part types {ObjectIdentifier, ExistenceDenoter, StateDenoter}

The language object, for English, defines the following example word to sentence part type association rules:

ST_OCD_W2SPTAR={{ObjectIdentifier, Noun or Pronoun, {position in sentence, BEGIN}}, {ExistenceDenoter, Verb, {position in sentence, AFTER_BEGIN}}, {ClassDenoter, Noun, {position in sentence, AFTER_ExistenceDenoter}}}

ST_OSD_W2SPTAR={{ObjectIdentifier, Noun or Pronoun, {position in sentence, BEGIN}}, {ExistenceDenoter, Verb, {position in sentence, AFTER_BEGIN}}, {StateDenoter, Adverb or Adjective, {position in sentence, AFTER_ExistenceDenoter}}}

The language processing and knowledge building system (LPKBS) 202, for each combination, applies 921 the obtained word to sentence part type association rules to make word to sentence part type associations permissible. In this example, for the sentence S1 "John is an adult", the combination S1-1 fails because the article "an" cannot be associated with an adjective; for the combination S1-2 against ST_OCD-NLP01 is mapped to ObjectIdentifier, NLP02 is mapped to ExistenceDenoter, NLP03+NLP04_2 is mapped to a sentence part type ClassDenoter and therefore the association succeeds. Similarly, for the sentence S2, the combination S2-1 fails against both ST_OCD and ST_OSD because, in that combination, there is no noun or pronoun or adjective or adverb after the verb; the combination S2-2 fails against ST_OCD, because there is no noun after the verb, but succeeds against ST_OSD with the mapping: NLP05+NLP06+NLP07 for the ObjectIdentifier, NLP08 for the ExistenceDenoter, and NLP09_2 for the StateDenoter. As both the sentences S1 and S2 are not identified as questions and are, therefore propositions, the LPKBS 202 selects only subtypes of "Proposition" as sentence types; for each sentence part type 923 of every sentence type 922 predefined in the language object, determines 925 whether each word to sentence part type association rule 924 is satisfied. If a mapping between each of the NLPOs of the sentences S1 and S2 and each of the sentence part types of a sentence type is satisfied, the LPKBS 202 marks 926 each combination as a candidate for a sentence type. If a mapping between each of the NLPOs of the sentences S1 and S2 and each of the sentence part types of a sentence type is not satisfied, then the LPKBS 202 adds 927 the combination for that sentence to a valid-in-interim list.

If one or more sentence part types in a sentence type remain unmapped, the LPKBS 202 retrieves 928 the last question from the discourse context and identifies a question target. For example, if the last question stored in the discourse context was "Who are married?", the LPKBS 202 identifies 929 whether the combination marked valid-in-interim, referred to as "interim candidate" contains one or more natural language phrase objects (NLPOs) that can be mapped to the question target "who" in the last question. In this example, the LPKBS 202 associates "He Mary" with the "QuestionTarget" sentence part type and completes 930 or validates the interim candidate using the last question and removes the last question from the discourse context. If one or more NLPOs are unmapped to the sentence part types, then the LPKBS 202 retrieves 931 the semantic compounding mechanisms from the language object, and for every semantic compounding type 932, the LPKBS 202 determines 933 the semantic compounding mechanism, that is, a connector word mechanism or a morphed verb mechanism used in the combination, that is, the sentence phrase list. For a connector word mechanism, the LPKBS 202 identifies 934 connector words among remnant NLPOs. In English, the word "and" is used both as a list terminator and a connector for multiple independent utterances. In the sentence S2, the connector word "and" is used as a list terminator. In this example, there are no list item delimiters as there are only two items in the list. The LPKBS 202 has the required code and ability to distinguish between the two types of use of the connector word "and". For a morphed verb mechanism, the LPKBS 202 identifies 935 the verbs in relative morphed forms among the remnant NLPOs.

The language processing and knowledge building system (LPKBS) 202 retrieves 936 the word to sentence part type association rules for each compounding utterance, that is, the combination with connector or morphed words, and associates 937 the remnant or unmapped natural language phrase objects (NLPOs) with the sentence part types. The LPKBS 202 integrates 938 the compounding utterance with the compounded utterance and generate a bidirectional reading result map of word phrases associated with sentence part types. For each key value pair in the generated reading result map 939, the LPKBS 202 verifies 940 whether the discourse context comprises one or more semantic items for the word in the phrase in the value part of the map. The LPKBS 202 determines 941 whether the semantic items are found. If the semantic items are found, the LPKBS 202 disambiguates 942, that is, selects one of the semantic items for the word phrase based on semantic disambiguation rules. If the semantic items are not found, the LPKBS 202 verifies 943 whether the system knowledge 203 exemplarily illustrated in FIGS. 2-3, comprises semantic items from the previous processing sessions. If the semantic items are found 944, the LPKBS 202 disambiguates 942 the word phrase for selecting a single semantic item.

If the language processing and knowledge building system (LPKBS) 202 fails to find a semantic item in the system knowledge 203, the LPKBS 202 creates 945 a semantic item using the predefined semantic item creation rules and adds the created semantic item to the discourse context. For a root word which is a verb, the LPKBS 202 creates an action category. For a root word that is an adjective or an adverb, the LPKBS 202 creates a symbolic object. For a natural language phrase object with a common noun root word, the LPKBS 202 creates 945b one of: a symbolic object, an object class or a semantic classification of objects, and an attribute of an object class. To determine which one to create, the LPKBS 202 first applies heuristic rules based on the context. For example, if the noun word is the root word of a "basePhrase" in a "QualifiedNounPhrase", then the noun word is unlikely to be an attribute semantic item or a symbolic object and likely to be an object class semantic item; if the noun word is the root word of a doer phrase or an object phrase, the noun word is unlikely to be an attribute or a symbolic object and likely to be an object class semantic item. The LPKBS 202 saves this conclusion. The LPKBS 202 then obtains 945a meaning definitions of the noun root word from the vocabulary object.

The LPKBS 202 then processes each lexical meaning definition text as described in the foregoing paragraphs. Noting that lexicon meaning definitions for nouns commence typically with an article, for each meaning definition of a noun word, the result of processing is, for example, an instance of the "ObjectMarkedPhrase", which is a subtype of the "NaturalLanguagePhrase" and which has two attributes: "theMarker" attribute and "basePhrase" attribute, both duly populated by the processing. The LPKBS 202 checks whether the value for "theMarker" attribute is a definite article. If the value for "theMarker" attribute is a definite article, the LPKBS 202 analyses the value for the "basePhrase" attribute: if that value for the "basePhrase" attribute is an instance of "PossessionPhrase" which has two attributes, for example, "possessedPart" and "possessorPart", the values for these attributes would have been set by the processing. The LPKBS 202 creates a "SymbolicObject" semantic item for the root word if the creation does not clash with the conclusion of the heuristic analysis step. The LPKBS 202 creates an "Attribute" semantic item for the "possessedPart" and sets that "Attribute" semantic item as the value for the "forAttribute" attribute on the "SymbolicObject" semantic item for the root word. If the value for "theMarker" attribute is not the definite article, the LPKBS 202 analyses the value for the "basePhrase" attribute: if that value for the basePhrase is a "QualifiedNounPhrase" which has two attributes, for example, "baseNounPhrase" and "qualifierPhrase", values for which would have been set by the processing, the LPKBS 202 creates an "ObjectClass" semantic item for the word or phrase underlying the "baseNounPhrase" if such a semantic item is not already there, creates an "ObjectClass" semantic item for the root word if the creation does not clash with the conclusion of the heuristic analysis step, and sets up this latter object class as a subclass of the former object class. If the value for the "basePhrase" is a simple "NounPhrase", the LPKBS 202 treats the current root word under processing and the root word in the simple "NounPhrase" basePhrase as being semantically equivalent and, if needed, takes up processing of the lexical meaning definitions for the root word in the simple "NounPhrase" basePhrase to identify the semantic item.

The LPKBS 202 draws 946 inferences from the semantic items selected and/or created and updates 947 the system knowledge 203 with the inferences. That is, the LPKBS 202 identifies attributes comprising, for example, age, for the word "adult", of the selected semantic item and also identifies relations between the selected semantic item and other semantic items, and adds the identified attributes to the selected semantic item and further adds the identified relations to the discourse context and the system knowledge 203 based on the identified sentence type and semantic consequence rules of the identified sentence type, predefined in the language object.

It will be readily apparent that the various methods, algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language that supports procedural logic. Examples of programming languages that can be used comprise C, C++, C#, Java, JavaScript®, Fortran, Ruby, Perl®, Python®, Visual Basic®, hypertext preprocessor (PHP), Microsoft® .NET etc. Other object-oriented, functional, scripting, and/or logical programming languages may also be used. The computer program codes or software programs may be stored on or in one or more mediums as object code. Certain aspects of the method and the language processing and knowledge building system 202 exemplarily illustrated in FIGS. 2-3, disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program.

Various aspects of the method and the language processing and knowledge building system 202 disclosed herein may be implemented as programmed elements, or non-programmed elements, or any suitable combination thereof. The computer program product disclosed herein comprises one or more computer program codes for implementing the processes of various embodiments.

Where databases are described, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviours of a database can be used to implement various processes such as those disclosed herein. In addition, the databases may, in a known manner, be stored locally or remotely from a device that accesses data in such a database. In embodiments where there are multiple databases in the language processing and knowledge building system 202, the databases may be integrated to communicate with each other for enabling simultaneous updates of data linked across the databases, when there are any updates to the data in one of the databases.

The method and the language processing and knowledge building system 202 exemplarily illustrated in FIGS. 2-3, disclosed herein can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the language processing and knowledge building system (LPKBS) 202 exemplarily illustrated in FIGS. 2-3, disclosed herein are not limited to a particular computer system platform, processor, operating system, or network. One or more aspects of the method and the LPKBS 202 disclosed herein may be distributed among one or more computer systems, for example, servers configured to provide one or more services to one or more client computers, or to perform a complete task in a distributed system. For example, one or more aspects of the method and the LPKBS 202 disclosed herein may be performed on a client-server system that comprises components distributed among one or more server systems that perform multiple functions according to various embodiments. These components comprise, for example, executable, intermediate, or interpreted code, which communicate over a network using a communication protocol. The method and the LPKBS 202 disclosed herein are not limited to be executable on any particular system or group of systems, and is not limited to any particular distributed architecture, network, or communication protocol.

The foregoing examples have been provided merely for the purpose of explanation and are in no way to be construed as limiting of the method and the language processing and knowledge building system (LPKBS) 202 exemplarily illustrated in FIGS. 2-3, disclosed herein. While the method and the LPKBS 202 have been described with reference to various embodiments, it is understood that the words, which have been used herein, are words of description and illustration, rather than words of limitation. Further, although the method and the LPKBS 202 have been described herein with reference to particular means, materials, and embodiments, the method and the LPKBS 202 are not intended to be limited to the particulars disclosed herein; rather, the method and the LPKBS 202 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and LPKBS 202 disclosed herein in their aspects.

I claim:

1. A method for processing textual data, said method employing a language processing and knowledge building system comprising at least one processor configured to execute computer program instructions for performing said method, said method comprising:

receiving by said language processing and knowledge building system at least two portions of said textual data and, for each of the two portions of said textual data, a different corresponding language object each said language object corresponding to a text language of said corresponding portion of textual data and comprising an alphabet, a vocabulary, a vocabulary class for each word, punctuation, sentence types, sentence part types, word association rules, semantic item creation rules and semantic consequence rules for the text language;

for each said portion of textual data, without user intervention:
  a) segmenting said received portion of textual data into one or more sentences by said language processing and knowledge building system based on a plurality of sentence terminators predefined in said language object;
  b) segmenting each of said one or more sentences into a plurality of words by said language processing and knowledge building system based on a plurality of word separators predefined in said language object;
  c) generating a list of one or more natural language phrase objects for each of said words by said language processing and knowledge building system by identifying vocabulary classes and vocabulary class features for said each of said words based on vocabulary class feature differentiators predefined in said language object, said vocabulary class comprising a multivalued mapping from the vocabulary to a vocabulary class set of a language model predefined by the language object;

d) creating one or more sentence phrase lists by said language processing and knowledge building system using each said generated list of one or more natural language phrase objects, wherein each of said created one or more sentence phrase lists comprises a combination of one natural language phrase object selected for said each of said words from said each said generated list of one or more natural language phrase objects;

e) grouping two or more natural language phrase objects in said each of said created one or more sentence phrase lists by said language processing and knowledge building system based on word to word association rules predefined in said language object, said identified vocabulary classes, said identified vocabulary class features, and a position of each natural language phrase object in said each of said created one or more sentence phrase lists, and replacing each said grouped two or more natural language phrase objects in said each of said created one or more sentence phrase lists with a consolidated natural language phrase object;

f) mapping said segmented each of said one or more sentences to a sentence type by:
 mapping each natural language phrase object present in said each of said created one or more sentence phrase lists at a current point in said processing of said received portion of textual data to a sentence part type in a sentence type selected iteratively from a plurality of sentence types predefined in said language object by said language processing and knowledge building system, based on word to sentence part type association rules predefined in said language object, using said identified vocabulary classes, said identified vocabulary class features, and said position of said each natural language phrase object in said each of said created one or more sentence phrase lists at said current point in said processing of said received portion of textual data, wherein said each natural language phrase object at said current point in said processing of said received portion of textual data is one of: one from said generated list of one or more natural language phrase objects and said consolidated natural language phrase object; and
 identifying said sentence type of said segmented each of said one or more sentences by said language processing and knowledge building system from a sentence type with a highest number of successfully mapped sentence part types;

g) verifying, by said language processing and knowledge building system, for said mapped each natural language phrase object in said each of said created one or more sentence phrase lists mapped successfully to said identified sentence type, that a root word of said mapped each natural language phrase object in said each of said created one or more sentence phrase lists mapped successfully to said identified sentence type was not encountered earlier in a discourse and that a discourse context does not already have an earlier created matching semantic item whose expressions attribute contains the root word;

h) creating, by said language processing and knowledge building system, for said mapped each natural language phrase object in said each of said created one or more sentence phrase lists mapped successfully to said identified sentence type, one or more semantic items corresponding to the root word of said mapped each natural language phrase object in said each of said created one or more sentence phrase lists mapped successfully to said identified sentence type and adding the root word to the expressions attribute of the created semantic item;

i) creating attributes of one or more of created semantic items, and further creating relations between said created semantic items, based on said identified sentence type and semantic consequence rules of said identified sentence type, predefined in said language object, and adding said created attributes and created relations to said one of said created semantic items and further storing said created semantic items, attributes and said created relations in said discourse context and optionally in a system knowledge by said language processing and knowledge building system; and j) transforming said portion of textual data into data structures and making the data structures available for use by software applications, said data structures comprising for each said sentence a corresponding said sentence type and said sentence phrase lists associated with said sentence, each comprising an array of one of said natural language phrase objects associated with each of said words of said sentence, said natural language phrase objects in said array thereof each comprising an array of said associated word and grammatical attributes of said associated word;

whereby textual data is processed for ease of analysis and use in computer application software;

said method further comprising identifying the sentence part type for each of unmapped natural language phrase objects by said language processing and knowledge building system based on a semantic compounding mechanism predefined in said language object, wherein said semantic compounding mechanism comprises rules for associating sentence part types with natural language phrase objects based on one or more of a plurality of semantic compounding types, wherein said semantic compounding types comprise a concurrency semantic compounding type, a cause-effect relationship semantic compounding type, a condition semantic compounding type, and a shared object semantic compounding type between two sentences, wherein semantic compounding is combining multiple propositions into a single sentence to achieve overall economy of expression, wherein the concurrency semantic compounding type specifies that the multiple propositions describe actions or events that are happening or happened or can happen at the same time, wherein the cause-effect relationship semantic compounding type specifies that one or some of the multiple propositions describe or depict things that serve as the cause for things that are described or depicted by the other or others among the multiple propositions, wherein the condition semantic compounding type specifies that one or some of the multiple propositions describe or depict conditions that need to be satisfied, or state that needs to be realized, or actions or events that should occur, before what is described or depicted as a promise or a possibility by the other or others among the multiple propositions can actually become a reality, wherein the shared object semantic compounding type specifies that an entity or some entities participating in one or more of the multiple propositions also participates or participate in another or many others among the multiple propositions.

2. The method of claim 1, wherein said discourse context is configured as a mere template to store data at multiple meta-levels, wherein said data can be semantic items, and also to store additional information such as the last occurring question, a dereferencing-aid-map which is a map with a defined, fixed set of keys, wherein each key is a specific combination of vocabulary class feature values, and corresponding values would be initially null and would be repeatedly updated to hold the last occurring phrase objects with the vocabulary class feature values.

3. The method of claim 1, wherein said system knowledge is configured as a mere template to store data at multiple meta-levels, wherein said data can be semantic items.

4. The method of claim 1, wherein said semantic item is one of a semantic classification, a relation between two semantic classifications, an action category, a specific object, a link between two specific objects as an instance of the relation between the semantic classifications to which the specific objects belong, a symbolic object, and an attribute of a semantic classification.

5. The method of claim 1, further comprising creating semantic items, by said language processing and knowledge building system, and storing said created semantic items, in said discourse context and optionally in said system knowledge, wherein said creation of said semantic items is based on predefined semantic item creation rules.

6. The method of claim 5, further comprising recursive application of rules for creation of semantic items, in respect of consolidated language phrase objects, on each language phrase object of the consolidated language phrase objects.

7. The method of claim 1, further comprising determining whether to create one of a semantic classification, a class attribute, and a symbolic object for a mapped natural language phrase object with a common noun root word by said language processing and knowledge building system using heuristic rules on context and by processing lexical meaning definition text data for said common noun root word obtained from a vocabulary object predefined in said language object.

8. The method of claim 1, wherein said language object is predefined for a natural language used in said received textual data.

9. The method of claim 1, wherein said vocabulary classes comprise parts of speech comprising a noun, a pronoun, a verb, an adjective, and an adverb.

10. The method of claim 1, wherein said vocabulary class features comprise a case, a gender, a number, and a tense of said each of said words.

11. The method of claim 1, further comprising identifying or deriving one or more root words and semantic variations for said each of said words by said language processing and knowledge building system based on connector word rules and morphed word rules predefined in said language object for vocabulary class feature differentiation and sense differentiation.

12. The method of claim 11, further comprising validating said identified or derived vocabulary classes and each of said identified or derived one or more root words for said each of said words by said language processing and knowledge building system by querying the vocabulary object predefined in said language object.

13. The method of claim 1, wherein each of said one or more natural language phrase objects comprises said identified vocabulary class, said identified vocabulary class features, and the root word of said each of said words, wherein the root word is derived by either reverse application of morphological rules defined in the language object or is identified by lookup in a table defined in the language object.

14. The method of claim 1, wherein said word to word association rules comprise rules for associating noun collocations, a word of article vocabulary class with a word of noun vocabulary class, a word of an adjective vocabulary class with a word of a noun vocabulary class, a word of an adverb vocabulary class with a word of a verb vocabulary class, and a word of an adverb vocabulary class with a word of an adjective vocabulary class.

15. The method of claim 1, further comprising grouping one of said grouped two or more natural language phrase objects and ungrouped natural language phrase objects in said each of said created one or more sentence phrase lists based on said identified vocabulary classes, said identified vocabulary class features, list item separators, and list terminators predefined in said language object.

16. The method claim 2, further comprising, for each language phrase object in the sentence phrase list, a value, for the key that matches the vocabulary class features of the language phrase object, in the dereferencing-aid-map in said discourse context with said language phrase object to facilitate dereferencing of a word of a pronoun vocabulary class in subsequent sentences.

17. The method of claim 1, wherein said sentence part type comprises an action denoter, a doer denoter, a class denoter, a behaviour denoter, and a part denoter.

18. The method of claim 1, wherein said word to sentence part type association rules comprise syntactic feature-based non-semantic rules specifying a mapping of a natural language phrase object to the sentence part type in the sentence type based on vocabulary classes, vocabulary class features in said natural language phrase object, and a position of said natural language phrase object in said sentence phrase list, independent of the specific meanings of the word(s) making up the language phrase object.

19. The method of claim 1, further comprising identifying, for said each of said one or more sentences, preliminarily, a sentence type based on sentence terminators and question terminators predefined in said language object by language processing and knowledge building system, wherein said preliminary sentence type comprises one of a proposition and a question and finally, a refined sentence type (or proposition type) or a refined query type, based on the matching of the language phrase objects in the sentence phrase list to the sentence part types defined for the candidate refined sentence type or query type, wherein said refined sentence type or proposition type comprise of ObjectClassDescriptor, ClassStructureDescriptor, ClassBehaviourDescriptor, ObjectStructureDescriptor, ActionDescriptor and wherein said refined query type comprise of ClassStructureQuery, ClassBehaviourQuery, ObjectStructureQuery, ObjecyBehaviourQuery, ActionQuery, wherein the refined sentence types and refined query types constitute a communication ontology valid for the language and are independent of the domain-specific semantics or contextual semantics or meanings of the individual words in the sentence or query.

20. The method of claim 19, further comprising updating a last question attribute in said discourse context by said language processing and knowledge building system when said identified sentence type is said question, to facilitate processing of a possible answer in a subsequent sentence even if said subsequent sentence omits or lacks words for one or more sentence part types normally expected for sentence types.

21. The method of claim 1, further comprising identifying natural language phrase objects for each unmapped sentence part type by said language processing and knowledge building system using a value for the last question attribute in the discourse context and valid-in-interim association rules.

22. The method of claim 1, wherein the textual data may be input by way of any of: i) text meant to be read and understood by the system for building up the knowledge to be used in other computer applications such as question-answering-systems, ii) text meant to be read and understood by the system for building an abstractive summary of the text in a summarization-system, iii) user's question, meant to be answered by the system, in a question-answering-system, or iv) user's observations, questions, requests, commands or comments in the course of a conversation in computer applications such as conversation-systems.

23. The method of claim 1, wherein the textual data may be a single word or a short phrase or a full sentence or a question or a paragraph consisting of multiple sentences and/or questions or a chunk of text consisting of multiple paragraphs or may be the content of an entire text file.

24. The method of claim 1, wherein the textual data is received in one shot and constitutes the entire first input, apart from the language object, for one complete operation of the method and system, on which the system is able to complete and completes all the steps of the method without any further interaction with the user or intervention from the user or any further input from the user.

25. The method of claim 1, wherein the textual data may be any of: A) textual data interactively input by a user of the system using a computer system's keyboard, B) transcript or transformed form of what is spoken by a user of the system using the computer system's voice input device, C) transcript, howsoever prepared, of the conversation between two or more humans, D) textual data present in a text file on non-transitory storage device of the computer system, or E) textual data received on a communication link to which the computer system is connected.

26. A language processing and knowledge building system for processing textual data, said language processing and knowledge building system comprising:
a non-transitory computer readable storage medium configured to store computer program instructions defined by modules of said language processing and knowledge building system;
at least one processor communicatively coupled to said non-transitory computer readable storage medium, said at least one processor configured to execute said defined computer program instructions; and
said modules of said language processing and knowledge building system comprising:
a data reception module configured to receive at least two portions of said textual data and, for each of the two portions of said textual data, a different corresponding language object, each said language object corresponding to a text language of said corresponding portion of textual data and comprising an alphabet, a vocabulary, a vocabulary class for each word, punctuation, sentence types, sentence part types, word association rules for the language of the text, semantic item creation rules and semantic consequence rules for the text language;
a data segmentation module configured to segment each said received portion of textual data into one or more sentences based on a plurality of sentence terminators predefined in said language object;
said data segmentation module further configured to segment each of said one or more sentences into a plurality of words based on a plurality of word separators predefined in said language object;
a phrase object processing module configured to generate a list of one or more natural language phrase objects for each of said words by identifying vocabulary classes and vocabulary class features for said each of said words based on vocabulary class feature differentiators predefined in said language object, said vocabulary class comprising a multivalued mapping from the vocabulary to a vocabulary class set of a language model predefined by the language object;
said phrase object processing module further configured to create one or more sentence phrase lists using each said generated list of one or more natural language phrase objects, wherein each of said created one or more sentence phrase lists comprises a combination of one natural language phrase object selected for said each of said words from said each said generated list of one or more natural language phrase objects;
said phrase object processing module further configured to group two or more natural language phrase objects in said each of said created one or more sentence phrase lists based on word to word association rules predefined in said language object, said identified vocabulary classes, said identified vocabulary class features, and a position of each natural language phrase object in said each of said created one or more sentence phrase lists, and to replace each said grouped two or more natural language phrase objects in said each of said created one or more sentence phrase lists with a consolidated natural language phrase object, to reduce the sentence phrase lists;
a mapping module configured to map said segmented each of said one or more sentences to a sentence type by:
mapping each natural language phrase object present in said each of said created one or more sentence phrase lists at a current point in said processing of each said received portion of textual data to a sentence part type in a sentence type selected iteratively from a plurality of sentence types predefined in said language object, based on word to sentence part type association rules predefined in said language object, using said identified vocabulary classes, said identified vocabulary class features, and said position of said each natural language phrase object in said each of said created one or more sentence phrase lists at said current point in said processing of each said received portion of textual data, wherein said each natural language phrase object at said current point in said processing of each said received portion of textual data is one of: one from said generated list of one or more natural language phrase objects and said consolidated natural language phrase objects; and identifying said sentence type of said segmented each of said one or more sentences from a sentence type with a highest number of successfully mapped sentence part types; and a semantic item creation module configured to verify, for said mapped each natural language phrase object in said each of said created one or more sentence phrase lists mapped successfully to said identified sentence type, that a root word of said mapped each natural language phrase object in said each of said created one or more sentence phrase lists mapped successfully to said identified sentence type was not encountered earlier in a discourse and that a discourse context does not already have an earlier created matching semantic item whose expressions attribute contains the root word and to create, for said mapped each natural language phrase object in said each of said created one or more sentence phrase lists mapped successfully to said identified sentence type, a semantic item corresponding to a root word of said mapped each natural language phrase object in said each of said created one or more sentence phrase lists mapped successfully to said identified sentence type and to add the root word to the expressions attribute of the created semantic item;

said semantic item creation module further configured to create attributes of one or more of created semantic items, and further to create relations between said created semantic items, based on said identified sentence type and semantic consequence rules of said identified sentence type, predefined in said language object, and to add said created attributes and created relations to said created semantic items and further to store said created semantic items, created attributes and said created relations in said discourse context;

whereby said language processing and knowledge building system is configured to process textual data and transform said textual data without user intervention into data structures and make the data structures available for use by software applications, said data structures comprising for each said sentence a corresponding said sentence type and said sentence phrase lists associated with said sentence, each comprising an array of one of said natural language phrase objects associated with each of said words of said sentence, said natural language phrase objects in said array thereof each comprising an array of said associated word and grammatical attributes of said associated word;

wherein said phrase object processing module is further configured to identify the sentence part type for each of unmapped natural language phrase objects based on a semantic compounding mechanism predefined in said language object, wherein said semantic compounding mechanism comprises rules for associating sentence part types with natural language phrase objects based on one or more of a plurality of semantic compounding types, wherein said semantic compounding types comprise a concurrency semantic compounding type, a cause-effect relationship semantic compounding type, a condition semantic compounding type, and a shared object semantic compounding type between two sentences, wherein semantic compounding is combining multiple propositions into a single sentence to achieve overall economy of expression, wherein the concurrency semantic compounding type specifies that the multiple propositions describe actions or events that are happening or happened or can happen at the same time, wherein the cause-effect relationship semantic compounding type specifies that one or some of the multiple propositions describe or depict things that serve as the cause for things that are described or depicted by the other or others among the multiple propositions, wherein the condition semantic compounding type specifies that one or some of the multiple propositions describe or depict conditions that need to be satisfied, or state that needs to be realized, or actions or events that should occur, before what is described or depicted as a promise or a possibility by the other or others among the multiple propositions can actually become a reality, wherein the shared object semantic compounding type specifies that an entity or some entities participating in one or more of the multiple propositions also participates or participate in another or many others among the multiple propositions.

27. The language processing and knowledge building system of claim 26, wherein said discourse context is configured as mere template to store data at multiple meta-levels, wherein said data can be semantic items, and also to store additional information such as the last occurring question, a dereferencing-aid-map which is a map with a defined, fixed set of keys, wherein each key is a specific combination of vocabulary class feature values, and values would be initially null and would be updated repeatedly to hold the last occurring phrase objects with the vocabulary class feature values.

28. The language processing and knowledge building system of claim 26, wherein said system knowledge is configured as mere template to store data at multiple meta-levels, wherein said data can be semantic items.

29. The language processing and knowledge building system of claim 26, wherein said semantic item is one of a semantic classification, a relation between two semantic classifications, an action category, a specific object, a link between two specific objects as an instance of the relation between the semantic classifications to which the specific objects belong, a symbolic object, and an attribute of a semantic classification.

30. The language processing and knowledge building system of claim 26, wherein said semantic item creation module is further configured to create semantic items, and store said created semantic items, in said discourse context and optionally in said system knowledge, wherein said creation of said semantic items is based on predefined semantic item creation rules.

31. The language processing and knowledge building system of claim 30 is further configured for recursive application of rules for creation of semantic items, in respect of consolidated language phrase objects, on each language phrase object of the consolidated language phrase objects.

32. The language processing and knowledge building system of claim 26, wherein said semantic item processing module is further configured to determine whether to create one of a semantic classification, a class attribute, and a symbolic object for a mapped natural language phrase object with a common noun root word using heuristic rules on context and by processing lexical meaning definition text data for said common noun root word obtained from a vocabulary object predefined in said language object.

33. The language processing and knowledge building system of claim 26, wherein said language object is predefined for a natural language used in said received textual data.

34. The language processing and knowledge building system of claim 26, wherein said vocabulary classes comprise parts of speech comprising a noun, a pronoun, a verb, an adjective, and an adverb.

35. The language processing and knowledge building system of claim 26, wherein said vocabulary class features comprise a case, a gender, a number, and a tense of said each of said words.

36. The language processing and knowledge building system of claim 26, wherein said phrase object processing module is further configured to identify or derive one or more root words and semantic variations for said each of said words based on connector word rules and morphed word rules predefined in said language object for vocabulary class feature differentiation and sense differentiation.

37. The language processing and knowledge building system of claim 36, wherein said phrase object processing module is further configured to validate said identified or derived vocabulary classes and each of said identified or derived one or more root words for said each of said words by querying the vocabulary object predefined in said language object.

38. The language processing and knowledge building system of claim 26, wherein each of said one or more natural language phrase objects comprises said identified vocabulary class, said identified vocabulary class features, and the root word of said each of said words, wherein the root word is derived by either reverse application of morphological rules defined in the language object or is identified by lookup in a table defined in the language object.

39. The language processing and knowledge building system of claim 26, wherein said word to word association rules comprise rules for associating noun collocations, a word of article vocabulary class with a word of noun vocabulary class, a word of an adjective vocabulary class with a word of a noun vocabulary class, a word of an adverb vocabulary class with a word of a verb vocabulary class, and a word of an adverb vocabulary class with a word of an adjective vocabulary class.

40. The language processing and knowledge building system of claim 26, wherein said phrase object processing module is further configured to group one of said grouped two or more natural language phrase objects and ungrouped natural language phrase objects in said each of said created one or more sentence phrase lists based on said identified vocabulary classes, said identified vocabulary class features, list item separators, and list terminators predefined in said language object.

41. The language processing and knowledge building system of claim 27, wherein said phrase object processing module is further configured to update, for each language phrase object in the sentence phrase list, a value, for the key that matches the vocabulary class features of the language phrase object, in the dereferencing-aid-map in said discourse context with said language phrase object to facilitate dereferencing of a word of a pronoun vocabulary class in subsequent sentences.

42. The language processing and knowledge building system of claim 26, wherein said sentence part type comprises an action denoter, a doer denoter, a class denoter, a behaviour denoter, and a part denoter.

43. The language processing and knowledge building system of claim 26, wherein said word to sentence part type association rules comprise syntactic, feature-based non-semantic rules specifying a mapping of a natural language phrase object to the sentence part type in the sentence type based on said vocabulary classes, said vocabulary class features in said natural language phrase object, and a position of said natural language phrase object in said sentence phrase lists, independent of the specific meanings of the word(s) making up the language phrase object.

44. The language processing and knowledge building system of claim 26, wherein said phrase object processing module is further configured to identify, for said each of said one or more sentences, preliminarily, a sentence type based on sentence terminators and question terminators predefined in said language object, wherein said sentence type comprises one of a proposition and a question and finally, a refined sentence type (or proposition type) or a refined query type, based on the matching of the language phrase objects in the sentence phrase list to the sentence part types defined for the candidate refined sentence type or query type, wherein said refined sentence type or proposition type comprise of ObjectClassDescriptor, ClassStructureDescriptor, ClassBehaviourDescriptor, ObjectStructureDescriptor, ActionDescriptor and wherein said refined query type comprise of ClassStructureQuery, ClassBehaviourQuery, ObjectStructureQuery, ObjecyBehaviourQuery, ActionQuery, wherein the refined sentence types and refined query types constitute a communication ontology valid for the language and are independent of the domain-specific semantics or contextual semantics or meanings of the individual words in the sentence or query.

45. The language processing and knowledge building system of claim 25, wherein said phrase object processing module is further configured to update a last question attribute in said discourse context when said identified sentence type is said question, to facilitate processing of a possible answer in a subsequent sentence even if said subsequent sentence omits or lacks words for one or more sentence part types normally expected for sentence types.

46. The language processing and knowledge building system of claim 26, wherein said phrase object processing module is further configured to identify natural language phrase objects for each unmapped sentence part type using a value for the last question attribute in the discourse context and valid-in-interim association rules.

47. The system of claim 26, wherein the textual data may be input by way of any of: i) text meant to be read and understood by the system for building up the knowledge to be used in other computer applications such as question-answering-systems, ii) text meant to be read and understood by the system for building an abstractive summary of the text in a summarization-system, iii) user's question, meant to be answered by the system, in a question-answering-system, or iv) user's observations, questions, requests, commands or comments in the course of a conversation in computer applications such as conversation-systems.

48. The system of claim 26, wherein the textual data may be a single word or a short phrase or a full sentence or a question or a paragraph consisting of multiple sentences and or questions or a chunk of text consisting of multiple paragraphs or may be the content of an entire text file.

49. The system of claim 26, wherein the textual data is received in one shot and constitutes the entire first input apart, from the language object, for the complete operation of the method or system, on which the system is able to complete and completes all the steps of the method without any further interaction with the user or intervention from the user or any further input from the user.

* * * * *